US011370407B2

(12) United States Patent
Kawahara et al.

(10) Patent No.: US 11,370,407 B2
(45) Date of Patent: Jun. 28, 2022

(54) POWER APPARATUS

(71) Applicant: Honda Motor Co., Ltd., Tokyo (JP)

(72) Inventors: Kazutaka Kawahara, Saitama (JP);
Noriyuki Abe, Saitama (JP);
Shigemitsu Akutsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1073 days.

(21) Appl. No.: 15/985,710

(22) Filed: May 22, 2018

(65) Prior Publication Data

US 2018/0339695 A1   Nov. 29, 2018

(30) Foreign Application Priority Data

May 26, 2017   (JP) .............................. JP2017-104576

(51) Int. Cl.
*B60W 20/00*   (2016.01)
*B60K 1/02*   (2006.01)
(Continued)

(52) U.S. Cl.
CPC .............. *B60W 20/00* (2013.01); *B60K 1/02* (2013.01); *B60K 6/26* (2013.01); *B60K 6/448* (2013.01); *B60K 6/52* (2013.01); *B60K 17/08* (2013.01); *B60K 17/12* (2013.01); *B60K 17/165* (2013.01); *B60K 17/356* (2013.01); *B60W 10/08* (2013.01); *B62D 11/001* (2013.01); *F16H 48/36* (2013.01); *H02K 7/006* (2013.01); *H02K 7/116* (2013.01); *B60K 17/046* (2013.01); *B60K 2001/001* (2013.01); *B60K 2007/0061* (2013.01); *B60L 2240/421* (2013.01); *B60L 2240/441* (2013.01);
(Continued)

(58) Field of Classification Search
None
See application file for complete search history.

(56) References Cited

U.S. PATENT DOCUMENTS 10,065,527 B2 * 9/2018 Honda ................. B60K 17/348
11,110,805 B2 * 9/2021 Hirata .................... B60K 17/16

FOREIGN PATENT DOCUMENTS

CN       101678776       3/2010
CN       103958928       7/2014
(Continued)

OTHER PUBLICATIONS

Office Action of China Counterpart Application, with English translation thereof, dated Nov. 3, 2020, pp. 1-10.

*Primary Examiner* — Dirk Wright
(74) *Attorney, Agent, or Firm* — JCIPRNET

(57) ABSTRACT

A collinear relationship is satisfied in which rotation speeds of first to third rotation elements and rotation speeds of fourth to sixth rotation elements are arranged respectively in this sequence on a single straight line in a collinear diagram. The first and fourth rotation elements are connected with first and second power sources respectively. The second and fifth rotation elements are connected with first and second driven units respectively. The second and sixth rotation elements are connected with each other by a first connecting mechanism in a way that rotating directions thereof are the same, and rotation speed of the former is greater than that of the later. The third and fifth rotation elements are connected with each other by a second connecting mechanism in a way that rotating directions thereof are the same, and rotation speed of the former is greater than that of the later.

4 Claims, 42 Drawing Sheets

(51) Int. Cl.
*B60K 17/356* (2006.01)
*B60W 10/08* (2006.01)
*B60K 6/26* (2007.10)
*B60K 6/448* (2007.10)
*B60K 6/52* (2007.10)
*B62D 11/00* (2006.01)
*F16H 48/36* (2012.01)
*H02K 7/00* (2006.01)
*B60K 17/12* (2006.01)
*H02K 7/116* (2006.01)
*B60K 17/16* (2006.01)
*B60K 17/08* (2006.01)
*B60K 17/04* (2006.01)
*B60K 1/00* (2006.01)
*B60K 7/00* (2006.01)

(52) U.S. Cl.
CPC . *B60W 2510/081* (2013.01); *F16H 2048/364* (2013.01)

(56) References Cited

FOREIGN PATENT DOCUMENTS

| | | | |
|---|---|---|---|
| CN | 205632082 | 10/2016 | |
| CN | 106555857 | 4/2017 | |
| DE | 102015213146 | 1/2017 | |
| JP | 2008215519 A * | 9/2008 | .......... B60L 15/2054 |
| JP | 2008295173 A * | 12/2008 | ........... B60K 17/356 |
| JP | 4637136 | 2/2011 | |
| JP | 4637136 B2 * | 2/2011 | ............. H02K 16/00 |
| JP | 2017145874 A * | 8/2017 | ............. F16H 57/04 |

* cited by examiner

POWER APPARATUS

CROSS-REFERENCE TO RELATED APPLICATION

This application claims the priority of Japan patent application serial no. 2017-104576, filed on May 26, 2017. The entirety of the above-mentioned patent application is hereby incorporated by reference herein and made a part of this specification.

BACKGROUND

1. Technical Field

The disclosure relates to a power apparatus which drives a first driven unit and a second driven unit.

2. Description of Related Art

Conventionally, the apparatus disclosed in patent literature 1 for example is known as this kind of power apparatus. The power apparatus is used to drive the left wheel and the right wheel of a vehicle, and comprises a first rotary electric machine and a second rotary electric machine serving as power sources, and a first single-pinion planet gear unit and a second single-pinion planet gear unit. A first carrier of the first planet gear unit and a second sun gear of the second planet gear unit are connected with each other to rotate integrally, and a first sun gear of the first planet gear unit and a second carrier of the second planet gear unit are connected with each other to rotate integrally. In this way, four rotation elements are constituted by the first planet gear unit and the second planet gear unit, and rotation speeds of these four rotation elements are positioned in a single straight line in a collinear diagram.

Among the four rotation elements, the first ring gear and the second ring gear, which are rotation elements whose rotation speeds are positioned respectively on two external sides in the collinear diagram, are respectively connected with the first rotary electric machine and the second rotary electric machine via a decelerating gear mechanism. Besides, the first carrier and the second ring gear being integral with each other, which are rotation elements whose rotation speeds are positioned next to the first sun gear in the collinear diagram, are connected with right wheels of the vehicle via the decelerating gear mechanism; and the second carrier and the first ring gear being integral with each other, which are rotation elements positioned next to the second sun gear, are connected with left wheels of the vehicle via the decelerating gear mechanism. In the power apparatus with this structure, torques of the first rotary electric machine and the second rotary electric machine are transferred to the left wheel and the right wheel via the first planet gear unit and the second planet gear unit, and the torques of the left wheel and the right wheel are controlled by adjusting the torques of the two rotary electric machines.

[Patent Document 1]: Japanese Patent No. 4637136

As mentioned above, in the conventional power apparatus, among the four rotation elements whose rotation speeds are positioned on a single straight line in the collinear diagram, the first rotary electric machine and the second rotary electric machine are connected respectively with the two rotation elements whose rotation speeds are positioned on two outer sides in the collinear diagram, and the left wheel and the right wheel are connected respectively with the two rotation elements positioned on inner sides, so that a difference in the rotation speeds of the first rotary electric machine and the second rotary electric machine is definitely greater than a difference in the rotation speeds of the left wheel and the right wheel. Therefore, if the difference in rotation speeds of the left wheel and the right wheel becomes relatively great as the vehicle revolves, the difference in rotation speeds of the first rotary electric machine and the second rotary electric machine will become extremely great, as a result, a rotating direction inversion of either the first rotary electric machine or the second rotary electric machine may occur. Therefore, the first rotary electric machine and the second rotary electric machine must be controlled in accordance with such situation, so that the control becomes complicated.

SUMMARY

The disclosure provides a power apparatus which can prevent inversion of the rotating direction of either the first power source or the second power source caused by a differential rotation of the first driven unit and the second driven unit.

An embodiment of the invention provides power apparatus 1 and 1A to 1J, which drives a first driven unit (for example, a left wheel WL in the embodiment (the same hereinafter in this item)) and a second driven unit (a right wheel WR), comprising: a first power source (a first rotary electric machine 3), which can output rotation power; a second power source (a second rotary electric machine 4), which can output rotation power; a first differential unit (a first planet gear unit PS1), which comprises a first rotation element (one of a first sun gear S1 and a first ring gear R1), a second rotation element (a first carrier C1) and a third rotation element (the other of the first sun gear S1 and the first ring gear R1), wherein a collinear relationship is satisfied in which rotation speeds of the first rotation element to the third rotation element are arranged in this sequence on a single straight line in a collinear diagram, and the first rotation element is mechanically connected with the first power source; a second differential unit (a second planet gear unit PS2), which comprises a fourth rotation element (one of a second sun gear S2 and a second ring gear R2), a fifth rotation element (a second carrier C2) and a sixth rotation element (the other of the second sun gear S2 and the second ring gear R2), wherein a collinear relationship is satisfied in which rotation speeds of the fourth rotation element to the sixth rotation element are arranged in this sequence on a single straight line in a collinear diagram, and the fourth rotation element is mechanically connected with the second power source; a first connecting mechanism 5, which mechanically connects the second rotation element with the sixth rotation element in a way that a rotating direction of the second rotation element is the same as a rotating direction of the sixth rotation element, and the rotation speed of the second rotation element is greater than the rotation speed of the sixth rotation element; and a second connecting mechanism 6, which mechanically connects the third rotation element with the fifth rotation element in a way that a rotating direction of the third rotation element is the same as a rotating direction of the fifth rotation element, and the rotation speed of the fifth rotation element is greater than the rotation speed of the third rotation element; wherein either the second rotation element and the fifth rotation element or the third rotation element and the sixth rotation element are mechanically connected with the first driven unit and the second driven unit respectively.

According to this structure, the first differential unit is formed in a way that a collinear relationship is satisfied in which rotation speeds of the first rotation element to the third rotation element are arranged in this sequence on a single straight line in a collinear diagram, and the second differential unit is formed in a way that a collinear relationship is satisfied in which rotation speeds of the fourth rotation element to the sixth rotation element are arranged in this sequence on a single straight line in a collinear diagram. The first rotation element and the fourth rotation element are mechanically connected with the first power source and the second power source respectively, both of which can output rotation power.

In addition, the second rotation element and the sixth rotation element are mechanically connected with each other by the first connecting mechanism, in a way that the rotating direction of the second rotation element is the same as the rotating direction of the sixth rotation element, and the rotation speed of the second rotation element is greater than the rotation speed of the sixth rotation element. Furthermore, the third rotation element and the fifth rotation element are mechanically connected with each other by the second connecting mechanism, in a way that the rotating direction of the third rotation element is the same as a rotating direction of the fifth rotation element, and the rotation speed of the fifth rotation element is greater than the rotation speed of the third rotation element. Besides, the second rotation element and the fifth rotation element or the third rotation element and the sixth rotation element are mechanically connected with the first driven unit and the second driven unit respectively.

According to the above structure, when the second rotation element and the fifth rotation element are connected with the first driven unit and the second driven unit respectively, a relationship of rotation speeds among the various rotation elements of the power apparatus and a balancing relationship of torques are as shown in the collinear diagram in FIG. 38 for example. In FIG. 38 and other following collinear diagrams, a distance from a horizontal line representing the value of 0 to a white circle on a vertical line corresponds to the rotation speed of each rotation element shown at an end of the vertical line, and a black circle means that the value is always 0.

In addition, in FIG. 38 and other following collinear diagrams, arrows with hatching, shown near the white circle representing the rotation speed, stand for input torques or reactive torques acting on each rotation element, and among these input torques and reactive torques, the torques with the same kind of hatchings (hatching of negative-slope lines, positive-slope lines, vertical lines, and horizontal lines) are balanced. Furthermore, T1 and T2 are the respective torques of the first power source and the second power source, R11 and R12 are the respective reactive torques of the first driven unit caused by the torques T1 and T2 of the first power source and the second power source, and R21 and R22 are the respective reactive torques of the second driven unit caused by the torques T1 and T2 of the first power source and the second power source.

As seen from FIG. 38, the rotation power of the first power source and the second power source can be transferred to the first driven unit and the second driven unit via the first differential unit and the second differential unit to drive the two driven units. Therefore, by adjusting the torques T1 and T2 of the first power source and the second power source for example, the torques of the first driven unit and the second driven unit can be controlled in a way that the torques have the same magnitude or in a way that the torques have different magnitudes (a torque difference is generated).

Besides, as shown in FIG. 38, a ratio between the difference in rotation speeds of the first rotation element and the second rotation element and the difference in rotation speeds of the second rotation element and the third rotation element is set to $\alpha:1$, and a ratio between the difference in rotation speeds of the fourth rotation element and the fifth rotation element and the difference in rotation speeds of the fifth rotation element and the sixth rotation element is also set to $\alpha:1$. A ratio between the rotation speed of the second rotation element and the rotation speed of the sixth rotation element is set to 1:RM, and a ratio between the rotation speed of the fifth rotation element and the rotation speed of the third rotation element is also set to 1:RM. As seen from the structure of the first connecting mechanism and the second connecting mechanism, $0<RM<1.0$. Furthermore, when the respective rotation speed of the first power source and the second power source is set to NP1 and NP2, and the respective rotation speed of the first driven unit and the second driven unit is set to N1 and N2, the rotation speeds NP1 and NP2 of the first power source and the second power source are represented by following formulas (1) and (2) respectively.

$$NP1=(1+\alpha)N1-\alpha \times RM \times N2 \quad (1)$$

$$NP2=(1+\alpha)N2-\alpha \times RM \times N1 \quad (2)$$

According to the formulas (1) and (2), the conditions, under which the rotation speeds NP1 and NP2 of the first power source and the second power source become smaller than 0, are represented by following formulas (3) and (4) using the rotation speeds N1 and N2 of the first driven unit and the second driven unit.

$$N1<\alpha \times RM \times N2/(1+\alpha) \quad (3)$$

$$N2<\alpha \times RM \times N1/(1+\alpha) \quad (4)$$

Besides, when the third rotation element and the sixth rotation element are connected with the first driven unit and the second driven unit respectively, the relationship of rotation speeds among various rotation elements of the power apparatus and the balancing relationship of torques are as shown in the collinear diagram in FIG. 39 for example. Various parameters (T1, T2, R11, R12, R21, R22, $\alpha$ and RM) in FIG. 39 are as mentioned in the above.

As seen from FIG. 39, in this situation, the rotation power of the first power source and the second power source can also be transferred to the first driven unit and the second driven unit via the first differential unit and the second differential unit to drive the two driven units. Therefore, by adjusting the torques T1 and T2 of the first power source and the second power source for example, the torques of the first driven unit and the second driven unit can be controlled in a way that the torques have the same magnitude or in a way that the torques have different magnitudes (a torque difference is generated).

And in the situation of FIG. 39, the rotation speeds NP1 and NP2 of the first power source and the second power source are represented by following formulas (5) and (6) respectively.

$$NP1=(1+\alpha)(1/RM)N2-\alpha \times N1 \quad (5)$$

$$NP2=(1+\alpha)(1/RM)N1-\alpha \times N2 \quad (6)$$

According to these formulas (5) and (6), the conditions, under which the rotation speeds NP1 and NP2 of the first power source and the second power source become smaller than 0 (become a negative value), are represented by the above formulas (4) and (3) using the rotation speeds N1 and N2 of the first driven unit and the second driven unit.

On the other hand, FIG. 40 shows the relationship of rotation speeds among various rotation elements of the conventional power apparatus. In order to make the difference from the disclosure easy to understand, in the conventional power apparatus, a ratio between the difference in rotation speeds of the first sun gear and the first carrier and the difference in rotation speeds of the first carrier and the first ring gear is set to 1:α, and a ratio between the difference in rotation speeds of the second sun gear and the second carrier and the difference in rotation speeds of the second carrier and the second ring gear is also set to 1:α. Besides, when the respective rotation speed of the first rotary electric machine and the second rotary electric machine is set to Nm1 and Nm2, and the respective rotation speed of the left wheel and the right wheel is set to Nwl and Nwr, the rotation speeds Nm1 and Nm2 of the first rotary electric machine and the second rotary electric machine are represented by following formulas (7) and (8) respectively.

$$Nm1=(1+\alpha)Nwl-\alpha \times Nwr \quad (7)$$

$$Nm2=(1+\alpha)Nwr-\alpha \times Nwl \quad (8)$$

According to these formulas (7) and (8), for the conventional power apparatus, the conditions, under which the rotation speeds Nm1 and Nm2 of the first rotary electric machine and the second rotary electric machine become smaller than 0 (become a negative value) are represented by following formulas (9) and (10) using the rotation speeds Nwl and Nwr of the left wheel and the right wheel.

$$Nwl<\alpha \times Nwr/(1+\alpha) \quad (9)$$

$$Nwr<\alpha \times Nwl/(1+\alpha) \quad (10)$$

As seen from a comparison of the formulas (3) and (4) with the formulas (9) and (10) and the fact that the RM in the formulas (3) and (4) satisfies the relationship of 0<RM<1.0, for the power apparatus according to the disclosure, when compared with the conventional power apparatus, even if the rotation speed N1 of the first driven unit is smaller than the rotation speed N2 of the second driven unit for the amount of RM, the rotation speed NP1 of the first power source is not lower than 0, and even if the rotation speed N2 of the second driven unit is smaller than the rotation speed N1 of the first driven unit, the rotation speed NP2 of the second power source is not lower than 0. Therefore, according to the disclosure, a rotating direction inversion of either the first power source or the second power source caused by the differential rotation of the first driven unit and the second driven unit can be prevented. In this way, the first power source and the second power source can be easily controlled.

Besides, as seen from FIG. 38, the reactive torque R12 of the first driven unit caused by the torque T2 of the second power source, and the reactive torque R21 of the second driven unit caused by the torque T1 of the first power source act on the driving direction of the first driven unit and the second driven unit respectively. The second rotation element and the sixth rotation element are connected by the first connecting mechanism in the above-mentioned way, and the third rotation element and the fifth rotation element are connected by the second connecting mechanism in the above-mentioned way, by which the reactive torques R12 and R21 can be reduced when compared with the situation in which the second rotation element and the sixth rotation element are connected with the third rotation element and the fifth rotation element respectively to rotate integrally as in the related art. Therefore, the torque transferred to the first driven unit and the second driven unit can be increased accordingly, so that the miniaturization of the first power source and the second power source can be achieved.

Furthermore, as seen from FIG. 39, the reactive torque R12 of the first driven unit caused by the torque T2 of the second power source, and the reactive torque R21 of the second driven unit caused by the torque T1 of the first power source act on directions opposite to the driving direction of the first driven unit and the second driven unit respectively. The second rotation element and the sixth rotation element are connected by the first connecting mechanism in the above-mentioned way, and the third rotation element and the fifth rotation element are connected by the second connecting mechanism in the above-mentioned way, by which the reactive torque R12 and R21 can be increased when compared with the situation of the related art. Therefore, the torque transferred to the first driven unit and the second driven unit can be increased, so that the miniaturization of the first power source and the second power source can be achieved.

In addition, FIG. 38 and FIG. 39 show the relationship of rotation speeds among various rotation elements with regard to the situation in which the first rotation element and the second rotation element are connected with the first power source and the second power source respectively to rotate integrally, and either the second rotation element and the fifth rotation element or the third rotation element and the sixth rotation element are connected with the first driven unit and the second driven unit respectively to rotate integrally; however, the connection is not necessarily done to rotate integrally and may be done via a gear. The effect of the disclosure can also be achieved even in such situations.

In an exemplary embodiment, power apparatuses 1K to 1P, which drive a first driven unit (for example, a left wheel WL in the embodiment (the same hereinafter in this item)) and a second driven unit (a right wheel WR), comprise: a first power source (a first rotary electric machine 3), which can output rotation power; a second power source (a second rotary electric machine 4), which can output rotation power; a first differential unit (a first planet gear unit PS1), which comprises a first rotation element (one of a first sun gear S1 and a first ring gear R1), a second rotation element (a first carrier C1) and a third rotation element (the other of the first sun gear S1 and the first ring gear R1), wherein a collinear relationship is satisfied in which rotation speeds of the first rotation element to the third rotation element are arranged in this sequence on a single straight line in a collinear diagram, and the first rotation element is mechanically connected with the first power source; a second differential unit (a second planet gear unit PS2), which comprises a fourth rotation element (one of a second sun gear S2 and a second ring gear R2), a fifth rotation element (a second carrier C2) and a sixth rotation element (the other of the second sun gear S2 and the second ring gear R2), a collinear relationship is satisfied in which rotation speeds of the fourth rotation element to the sixth rotation element are arranged in this sequence on a single straight line in a collinear diagram, and the fourth rotation element is mechanically connected with the second power source; a first connecting mechanism 13, which mechanically connects the second rotation element with the sixth rotation element in a way that a rotating direction of the second rotation element is opposite to a rotating direction of the sixth rotation element; and a second connecting mechanism 14, which mechanically connects the third rotation element with the fifth rotation element in a way that a rotating direction of the third rotation element is opposite to a rotating direction of the fifth rotation element; wherein either the second rotation element and the fifth rotation element or the third rotation element and the sixth rotation element are mechanically connected with the first driven unit and the second driven unit respectively.

According to this structure, the first differential unit is formed in a way that a collinear relationship is satisfied in which rotation speeds of the first rotation element to the third rotation element are arranged in this sequence on a single straight line in a collinear diagram, and the second differential unit is formed in a way that a collinear relationship is satisfied in which rotation speeds of the fourth rotation element to the sixth rotation element are arranged in this sequence on a single straight line in a collinear diagram. The first rotation element and the fourth rotation element are mechanically connected with the first power source and the second power source respectively, both of which can output rotation power.

In addition, the second rotation element and the sixth rotation element are mechanically connected with each other by the first connecting mechanism, in a way that the rotating directions of these rotation elements are opposite to each other, and the third rotation element and the fifth rotation element are mechanically connected with each other by the second connecting mechanism, in a way that the rotating direction of these rotation elements are opposite to each other. Furthermore, the second rotation element and the fifth rotation element or the third rotation element and the sixth rotation element are mechanically connected with the first driven unit and the second driven unit respectively.

According to the above structure, when the second rotation element and the fifth rotation element are connected with the first driven unit and the second driven unit respectively, a relationship of rotation speeds among the various rotation elements of the power apparatus and a balancing relationship of torques are as shown in the collinear diagram in FIG. 41 for example. As described in the disclosure, arrows with hatching, which are shown near the white circle representing the rotation speed, stand for input torques or reactive torques acting on each rotation element, and among these input torques and reactive torques, the torques with the same kind of hatchings are balanced. Furthermore, T1 and T2 are the torques of the first power source and the second power source respectively, R11 and R12 are the respective reactive torques of the first driven unit caused by the torques T1 and T2 of the first power source and the second power source, and R21 and R22 are the respective reactive torque of the second driven unit caused by the torques T1 and T2 of the first power source and the second power source.

As seen from FIG. 41, the rotation power of the first power source and the second power source can be transferred to the first driven unit and the second driven unit via the first differential unit and the second differential unit to drive the two driven units. Therefore, by adjusting the torques T1 and T2 of the first power source and the second power source for example, the torques of the first driven unit and the second driven unit can be controlled in a way that the torques have the same magnitude or in a way that the torques have different magnitudes (a torque difference is generated).

Besides, the second rotation element and the sixth rotation element are connected by the first connecting mechanism in the above-mentioned way, and the third rotation element and the fifth rotation element are connected by the second connecting mechanism in the above-mentioned way; therefore, if the rotating directions of the second rotation element and the fifth rotation element respectively connected with the first driven unit and the second driven unit are the same, the first rotation element connected with the first power source rotates in the same rotating direction as the second rotation element at a rotation speed greater than that of the second rotation element, and the fourth rotation element connected with the second power source rotates in the same rotating direction as the fifth rotation element at a rotation speed greater than that of the fifth rotation element. Therefore, a rotating direction inversion of either the first power source or the second power source caused by the differential rotation of the first driven unit and the second driven unit can be prevented. In this way, the first power source and the second power source can be easily controlled.

Besides, when the third rotation element and the sixth rotation element are connected with the first driven unit and the second driven unit respectively, the relationship of rotation speeds among various rotation elements of the power apparatus and the balancing relationship of torques are as shown in the collinear diagram in FIG. 42 for example. Various parameters (T1, T2, R11, R12, R21, R22, a and RM) in FIG. 42 are as mentioned in the above.

As seen from FIG. 42, even in this situation, the rotation power of the first power source and the second power source can be transferred to the first driven unit and the second driven unit via the first differential unit and the second differential unit to drive the two driven units. Therefore, by adjusting the torques T1 and T2 of the first power source and the second power source for example, the torques of the first driven unit and the second driven unit can be controlled in a way that the torques have the same magnitude or in a way that the torques have different magnitudes (a torque difference is generated).

Besides, the second rotation element and the sixth rotation element are connected by the first connecting mechanism in the above-mentioned way, and the third rotation element and the fifth rotation element are connected by the second connecting mechanism in the above-mentioned way; therefore, if the rotating directions of the third rotation element and the sixth rotation element respectively connected with the first driven unit and the second driven unit are the same, the first rotation element connected with the first power source rotates in the same rotating direction as the second rotation element at a rotation speed greater than that of the second rotation element, and the fourth rotation element connected with the second power source rotates in the same rotating direction as the fifth rotation element at a rotation speed greater than that of the fifth rotation element. Therefore, even in this situation, a rotating direction inversion of either the first power source or the second power source caused by the differential rotation of the first driven unit and the second driven unit can be prevented. In this way, the first power source and the second power source can be easily controlled.

Besides, as seen from FIG. 41 and FIG. 42, the reactive torque R11 of the first driven unit caused by the torque T1 of the first power source and the reactive torque R12 of the first driven unit caused by the torque T2 of the second power source both act on the direction opposite to the driving direction of the first driven unit, and the reactive torque R21 of the second driven unit caused by the torque T1 of the first power source and the reactive torque R22 of the second driven unit caused by the torque T2 of the second power source both act on the direction opposite to the driving direction of the second driven unit. Therefore, the torque transferred to the first driven unit and the second driven unit can be increased when compared with the situation in which the second rotation element and the sixth rotation element are connected with the third rotation element and the fifth rotation element respectively to rotate integrally, so that the miniaturization of the first power source and the second power source can be achieved.

In addition, FIG. 41 and FIG. 42 show the relationship of rotation speeds among various rotation elements with regard to the situation in which the first rotation element and the second rotation element are connected with the first power source and the second power source respectively to rotate integrally, and either the second rotation element and the fifth rotation element or the third rotation element and the sixth rotation element are connected with the first driven unit and the second driven unit respectively to rotate integrally; however, the connection is not necessarily done in the way of integral rotation but may be done via a gear. The effect of the disclosure can also be achieved even in such situations.

In the power apparatus 1, 1A to 1G, and 1K to 1N provided in an exemplary embodiment, the first differential unit is a single-pinion planet gear unit, and comprises a first sun gear S1 serving as the first rotation element, a first carrier C1 serving as the second rotation element, and a first ring gear R1 serving as the third rotation element; and the second differential unit is a single-pinion planet gear unit, and comprises a second sun gear S2 serving as the fourth rotation element, a second carrier C2 serving as the fifth rotation element, and a second ring gear R2 serving as the sixth rotation element.

According to this structure, the first differential unit is a single-pinion planet gear unit, and the first rotation element, the second rotation element and the third rotation element are the first sun gear, the first carrier and the first ring gear of this planet gear unit, respectively. Besides, the second differential unit is a single-pinion planet gear unit, and the fourth rotation element, the fifth rotation element and the sixth rotation element are the second sun gear, the second carrier and the second ring gear of this planet gear unit. According to the above, the first rotation element to the third rotation element and the fourth rotation element to the sixth rotation element, whose rotation speeds satisfy a collinear relationship, can be properly formed. Besides, because the first sun gear and the second sun gear are connected with the first power source and the second power source respectively, compared with the situation in which the first ring gear and the second ring gear are connected with the first power source and the second power source respectively, the torque transferred from the first power source and the second power source to the first driven unit and the second driven unit can be increased, and the rotation speeds of the first power source and the second power source can be raised.

In the power apparatus 1 and 1A to 1G provided in an exemplary embodiment, the first connecting mechanism 5 comprises a first gear 5a connected with the first carrier C1 in an integrally rotating manner, a second gear 5b engaging with the first gear 5a, a third gear 5c connected with the second gear 5b in an integrally rotating manner, and a fourth gear 5d which engages with the third gear 5c and is disposed integrally with a periphery surface of the second ring gear R2; and the second connecting mechanism 6 comprises a fifth gear 6a connected with the second carrier C2 in an integrally rotating manner, a sixth gear 6b engaging with the fifth gear 6a, a seventh gear 6c connected with the sixth gear 6b in an integrally rotating manner, and an eighth gear 6d which engages with the seventh gear 6c and is disposed integrally with a periphery surface of the first ring gear R1.

According to this structure, the first connecting mechanism includes the first gear to the fourth gear. The first gear is connected with the first carrier in an integrally rotating manner, the second gear engages with the first gear and is connected with the third gear in an integrally rotating manner, and the fourth gear engages with the third gear and is disposed integrally with the periphery surface of the second ring gear. By the first gear to the fourth gear, the first carrier serving as the second rotation element and the second ring gear serving as the sixth rotation element can be connected with each other in a way that the rotating direction of both is the same direction, and the rotation speed of the second rotation element is greater than that of the sixth rotation element. Besides, the fourth gear can be compactly disposed on the periphery surface of the second ring gear.

Besides, the second connecting mechanism includes the fifth gear to the eighth gear. The fifth gear is connected with the second carrier in an integrally rotating manner, the sixth gear engages with the fifth gear and is connected with the seventh gear in an integrally rotating manner, and the eighth gear engages with the seventh gear and is disposed integrally with the periphery surface of the first ring gear. By the fifth gear to the eighth gear, the second carrier serving as the fifth rotation element and the first ring gear serving as the third rotation element are connected with each other in a way that the rotating direction of both is the same direction, and the rotation speed of the fifth rotation element is greater than that of the third rotation element. Besides, the eighth gear can be compactly disposed on the periphery surface of the first ring gear.

In the power apparatus 1K to 1N provided in an exemplary embodiment, the first connecting mechanism 13 comprises a first gear 13a connected with the first carrier C1 in an integrally rotating manner, a second gear 13b corresponding to the first gear 13a, a third gear 13c connected with the second gear 13b in an integrally rotating manner, a fourth gear 13d which corresponds to the third gear 13c and is disposed integrally with a periphery surface of the second ring gear R2, and a first middle gear 13e rotating freely; one of the first gear and the third gear (the third gear 13c) engages with one of the corresponding second and fourth gear (the fourth gear 13d) via the first middle gear 13e, while the other of the first gear and the third gear (the first gear 13a) directly engages with the other of the second gear and the fourth gear (the second gear 13b); the second connecting mechanism 14 comprises a fifth gear 14a connected with the second carrier C2 in an integrally rotating manner, a sixth gear 14b corresponding to the fifth gear 14a, a seventh gear 14c connected with the sixth gear 14b in an integrally rotating manner, an eighth gear 14d which corresponds to the seventh gear 14c and is disposed integrally with a periphery surface of the first ring gear R1, and a second middle gear 14e rotating freely; one of the fifth gear and the seventh gear (the seventh gear 14c) engages with one of the corresponding sixth gear and the eighth gear (the eighth gear 14d) via the second middle gear 14e, while the other of the fifth gear and the seventh gear (the fifth gear 14a) directly engages with the corresponding sixth gear and the eighth gear (the sixth gear 14b).

According to this structure, the first connecting mechanism includes the first gear to the fourth gear and the first middle gear rotating freely. The first gear is connected with the first carrier in an integrally rotating manner, the second gear corresponds to the first gear and is connected with the third gear in an integrally rotating manner, and the fourth gear corresponds to the third gear and is disposed integrally with the periphery surface of the second ring gear. One of the first gear and the third gear engages with the corresponding second gear and fourth gear via the first middle gear, while the other of the first gear and the third gear directly engages with the other of the second gear and the fourth gear. By the first gear to the fourth gear and the first middle gear, the first carrier serving as the second rotation element and the second ring gear serving as the sixth rotation element can be connected with each other in a way that the rotating direction of both is opposite. Besides, the fourth gear can be compactly disposed on the periphery surface of the second ring gear.

Besides, the second connecting mechanism includes the fifth gear to the eighth gear and the second middle gear. The fifth gear is connected with the second carrier in an integrally rotating manner, the sixth gear corresponds to the fifth gear and is connected with the seventh gear in an integrally rotating manner, and the eighth gear corresponds to the seventh gear and is disposed integrally with the periphery surface of the first ring gear. One of the fifth gear and the seventh gear engages with one of the corresponding sixth gear and eighth gear via the second middle gear, and the other of the fifth gear and the seventh gear directly engages with the sixth gear and the eighth gear. By the fifth gear to the eighth gear and the second middle gear, the second carrier serving as the fifth rotation element and the first ring gear serving as the third rotation element can be connected with each other in a way that the rotating direction of both is opposite. Besides, the eighth gear can be compactly disposed on the periphery surface of the first ring gear.

In an exemplary embodiment, the power apparatus 1, 1A to 1I and 1K to 1O may further comprise a transferring mechanism (the first gear 5a, the fifth gear 6a, a first output gear 7, a second output gear 8, the eighth gear 6d, the fourth gear 5d, a first input gear 9, a second input gear 10, a first input gear 11, a second input gear 12, the first gear 13a, the fifth gear 14a, the eighth gear 14d, the fourth gear 13d, the left driving axis and the right driving axis SL and SR) which transfers the rotation power from the second rotation element and the fifth rotation element or the third rotation element and the sixth rotation element to the first driven unit and the second driven unit respectively in a state of variable speed.

According to this structure, the rotation power from the second rotation element and the fifth rotation element or the third rotation element and the sixth rotation element can be transferred to the first driven unit and the second driven unit by the transferring mechanism in a state of variable speed.

In the power apparatus 1C, 1D, 1G, 1M and 1N provided in an exemplary embodiment, the first power source and the second power source is hollow-shaped; the transferring mechanism comprises a first driving axis and a second driving axis (the left driving axis and the right driving axis SL and SR) connected with the first driven unit and the second driven unit respectively in an integrally rotating manner, a first output gear 7 and a second output gear 8 disposed integrally with the first driving axis and the second driving axis, and first input gears 9 and 11 and second input gears 10 and 12 engaging with the first output gear and the second output gear 7 and 8 respectively; the first power source and the second power source, the first driving axis and the second driving axis, and the first differential unit and the second differential unit are disposed coaxially with each other, and the first driving axis and the second driving axis are relatively rotatably disposed on an inner side of the first power source and the second power source respectively; the first input gears 9 and 11 are disposed coaxially either the second gear and the third gear 5b, 5c, 13b and 13c or the sixth gear and the seventh gear 6b, 6c, 14b and 14c; and the second input gears 10 and 12 are disposed coaxially with the other of the second gear and the third gear 5b, 5c, 13b and 13c or the sixth gear and the seventh gear 6b, 6c, 14b and 14c.

According to this structure, the first driving axis and the second driving axis of the transferring mechanism are connected with the first driven unit and the second driven unit respectively in an integrally rotating manner, and the first output gear and the second output gear disposed integrally with the first driving axis and the second driving axis respectively engage with the first input gear and the second input gear respectively. Besides, the first power source and the second power source, the first driving axis and the second driving axis, and the first differential unit and the second differential unit are disposed coaxially with each other, and in the inner side of the hollow-shaped first power source and second power source, the first driving axis and the second driving axis are relatively rotatably disposed, so that the whole power apparatus can be miniaturized in a radial direction.

Furthermore, the first input gear is disposed coaxially with either the second gear and the third gear of the first connecting mechanism or the sixth gear and the seventh gear of the second connecting mechanism, and the second input gear is disposed coaxially with the other of the second gear and the third gear or the sixth gear and the seventh gear, so that the whole power apparatus can be further miniaturized in the radial direction.

DESCRIPTION OF THE EMBODIMENTS

Figure 1:
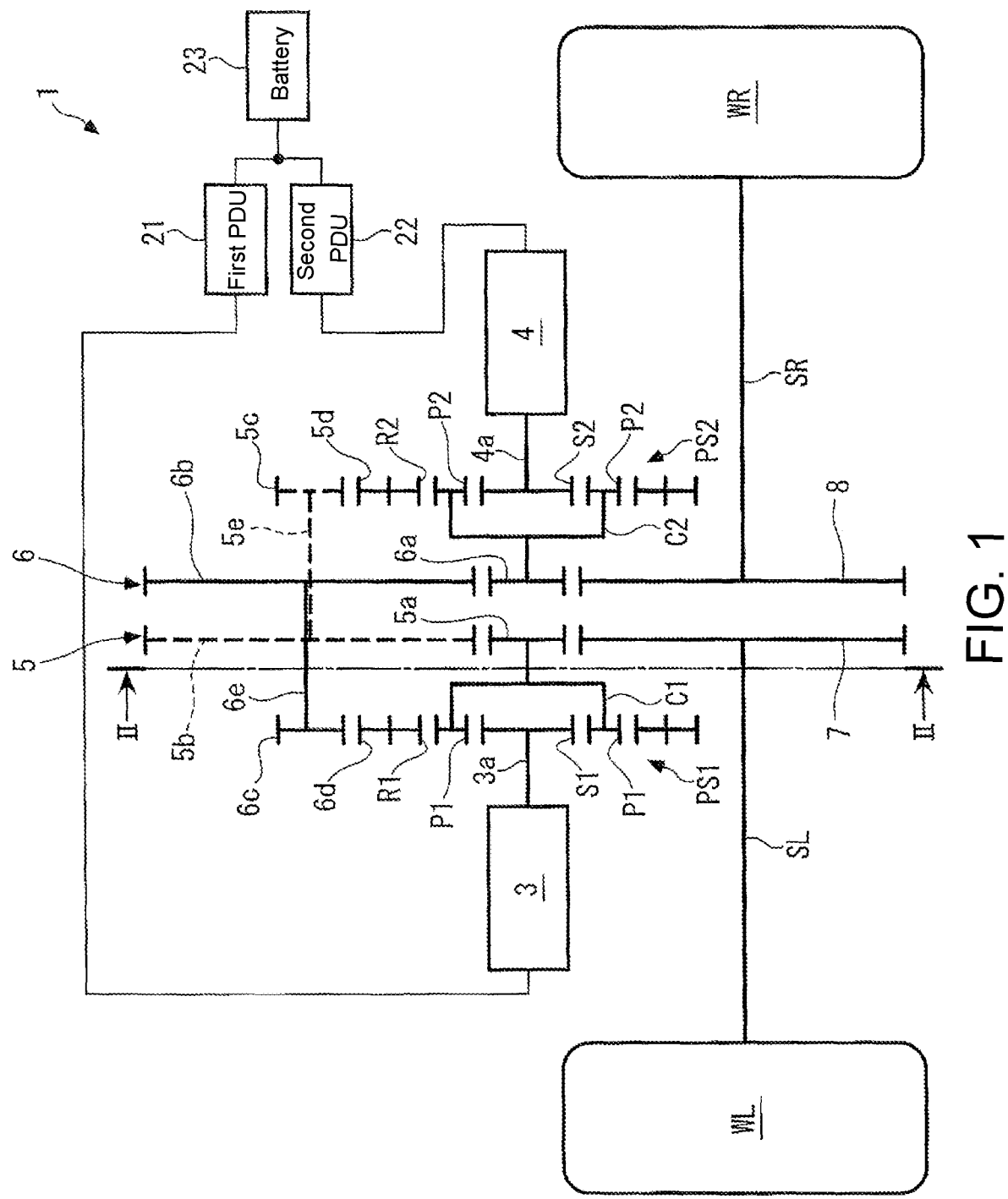
FIG. 1 is a skeleton diagram showing a power apparatus according to a first embodiment of the disclosure as well as the left wheel and the right wheel of a vehicle to which the power apparatus is applied.

In the following part, embodiments of the disclosure are described in detail with reference to the drawings. FIG. 1 schematically shows a power apparatus 1 according to a first embodiment of the disclosure as well as the left wheel and the right wheel WL and WR of a vehicle (not shown) to which the power apparatus 1 is applied. The vehicle is a hybrid four-wheel vehicle for example, and the left wheel and the right wheel WL and WR are either left and right front wheels or left and right rear wheels. Besides, engines serving as power sources are disposed on the vehicle, and the other of the left and right front wheels and the left and right rear wheels (both of which are not shown) are driven by the engines. A left driving axis and a right driving axis SL and SR are connected with the left wheel and the right wheel WL and WR respectively, and the SL and SR are disposed coaxially with each other between the left wheel and the right wheel WL and WR.

As shown in FIG. 1, the power apparatus 1 comprises a first rotary electric machine and a second rotary electric machine 3 and 4, and a first planet gear unit and a second planet gear unit PS1 and PS2. The first rotary electric machine 3, the first planet gear unit PS1, the second planet gear unit PS2, and the second rotary electric machine 4 are disposed coaxially with each other between the left wheel and the right wheel WL and WR and are arranged in this sequence from the left side.

The first rotary electric machine 3 is an AC motor for example, and has a plurality of first stators formed by iron cores or coils and so on, a plurality of first rotors (none of which is shown) formed by magnets and so on, and a first output axis 3a integral with the first rotors. In the first rotary electric machine 3, when electric power is supplied to the first stator, the supplied electric power is converted to rotation power and is output to the first rotor and the first output axis 3a. Besides, when the rotation power is input to the first output axis 3a, the rotation power is converted to electric power (generation of electric power) and is output to the first stator. The first rotor and the first output axis 3a are capable of clockwise rotation and counterclockwise rotation.

Figure 3:
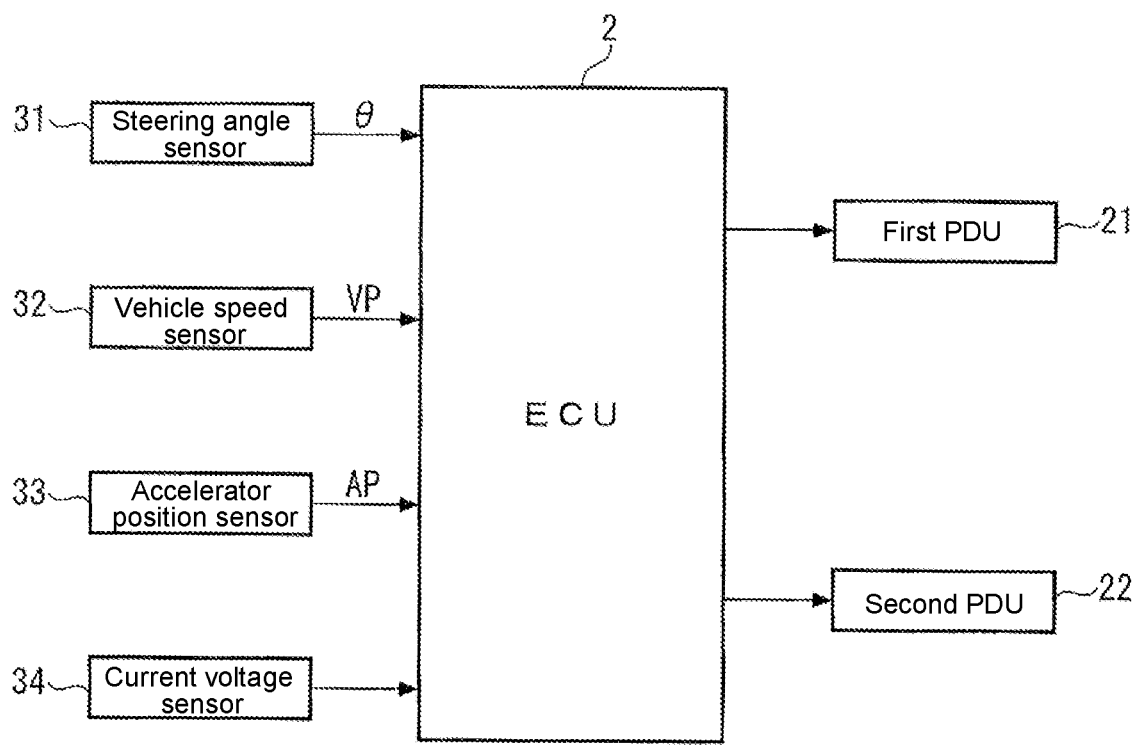
FIG. 3 is a block diagram showing an ECU and the like which are used to control a first rotary electric machine and a second rotary electric machine of the power apparatus.

Besides, the first stator of the first rotary electric machine 3 is fixed to a case (not shown) and electrically connected with a battery 23 capable of charging and discharging via a first power drive unit (referred to as "the first PDU" hereinafter) 21, realizing the transferring and receiving of electric energy with the battery 23. The case is fixed to a chassis of the vehicle. The first PDU 21 is formed by electric circuits such as an inverter. As shown in FIG. 3, an ECU 2 described below is electrically connected with the first PDU 21. The ECU 2 controls electric power supplied to the first stator, electric power generated by the first stator and the rotation speed of the first rotary electric machine 3 (the rotation speed of the first output axis 3a) by controlling the first PDU 21.

Similar to the first rotary electric machine 3, the second rotary electric machine 4 is also an AC motor, and has a second stator, a second rotor and a second output axis 4a. The second stator and the second rotor are formed similar to the first stator and the first rotor respectively. Similar to the first rotary electric machine 3, the second rotary electric machine 4 can convert the electric power which is supplied to the second stator to rotation power and output the rotation power to the second rotor and the second output axis 4a; and the second rotary electric machine 4 can convert the rotation power which is input to the second output axis 4a to electric power and output the electric power to the second stator. Besides, the second rotor and the second output axis 4a are capable of clockwise rotation and counterclockwise rotation.

Besides, the second stator of the second rotary electric machine 4 is electrically connected with the battery 23 via a second power drive unit (referred to as "the second PDU" hereinafter) 22, realizing the transferring and receiving of electric energy with the battery 23. Similar to the first PDU 21, the second PDU 22 is formed by electric circuits such as an inverter, and the ECU 2 is electrically connected with the second PDU 22. The ECU 2 controls electric power supplied to the second stator, electric power generated by the second stator, and the rotation speed of the second rotary electric machine 4 (the rotation speed of the second output axis 4a) by controlling the second PDU 22.

In the following part, the behavior of converting the electric power supplied to the first rotary electric machine 3 (the second rotary electric machine 4) to power and outputting the power from the first output axis 3a (the second output axis 4a) is referred to as "power running" for convenience. Besides, the situation is referred to as "regeneration" for convenience, in which electric power is generated by the first output axis 3a (the second output axis 4a) using the power input to the first rotary electric machine 3 (the second rotary electric machine 4), and is charged to the battery 23 or supplied to other electric machines.

The first planet gear unit PS1 is a common single-pinion planet gear unit and has a first sun gear S1, a first ring gear R1 disposed on an outer periphery of the first sun gear S1, a plurality of (3 for example) first pinion gears P1 engaging with the two gears S1 and R1, and a first carrier C1 supporting the first pinion gear P1 to facilitate free rotation and revolution of the first pinion gear P1. As is known, the first sun gear S1 and the first pinion gear P1 are formed by external gears, and the first ring gear R1 is formed by an internal gear. Besides, the first sun gear S1 is disposed integrally with the first output axis 3a of the first rotary electric machine 3. The first carrier C1 has a plurality of spindles supporting the first pinion gear P1 and a plate-shaped flange integral with the spindles, and the flange is disposed on the side near the second planet gear unit PS2.

Similar to the first planet gear unit PS1, the second planet gear unit PS2 is a common single-pinion planet gear unit and has a second sun gear S2, a second ring gear R2 disposed on an outer periphery of the second sun gear S2, a plurality of (3 for example) second pinion gears P2 engaging with the two gears S2 and R2, and a second carrier C2 supporting the second pinion gear P2 to facilitate free rotation and revolution of the second pinion gear P2. A gear ratio of the second sun gear S2 to the second ring gear R2 is the same as a gear ratio of the first sun gear S1 to the first ring gear R1. Besides, the second sun gear S2 is disposed integrally with the second output axis 4a of the second rotary electric machine 4. The second carrier C2 has a plurality of spindles supporting the second pinion gear P2 and a plate-shaped flange integral with the spindles, and the flange is disposed on the side near the first planet gear unit PS1.

Furthermore, the power apparatus 1 comprises a first connecting mechanism 5 which connects the first carrier C1 and the second ring gear R2 with each other, and a second connecting mechanism 6 which connects the second carrier C2 and the first ring gear R1 with each other. The first connecting mechanism 5 has a first gear 5a connected with the first carrier C1 in an integrally rotating manner, a second gear 5b engaging with the first gear 5a, a third gear 5c, a fourth gear 5d which engages with the third gear 5c and is disposed integrally with a periphery surface of the second ring gear R2, and a first rotation axis 5e which connects the second gear and the third gear 5b and 5c with each other to rotate integrally.

The first gear to the fourth gear 5a to 5d are all formed by external gears, and the first gear 5a is disposed between the first planet gear unit PS1 and the second planet gear unit PS2. Besides, the first rotation axis 5e is rotatably supported to the case via a bearing (not shown), and extends in parallel with axis lines of the first planet gear unit and the second planet gear unit PS1 and PS2, and in parallel with the left driving axis and the right driving axis SL and SR.

Besides, the teeth number of the first gear 5a is smaller than the teeth number of the second gear 5b, and the teeth number of the third gear 5c is smaller than the teeth number of the fourth gear 5d. According to the above structure, the first carrier C1 and the second ring gear R2 are connected with each other by the first connecting mechanism 5 in a way that the rotating directions of C1 and R2 are the same, and the rotation speed of C1 is greater than that of R2.

The second connecting mechanism 6 has a fifth gear 6a connected with the second carrier C2 in an integrally rotating manner, a sixth gear 6b engaging with the fifth gear 6a, a seventh gear 6c, an eighth gear 6d which engages with the seventh gear 6c and is disposed integrally with a periphery surface of the first ring gear R1, and a second rotation axis 6e which connects the sixth gear and the seventh gear 6b and 6c with each other to rotate integrally. The fifth gear to the eighth gear 6a to 6d are all formed by external gear, and the fifth gear 6a is disposed between the first gear 5a and the second planet gear unit PS2.

Besides, similar to the first rotation axis 5e, the second rotation axis 6e is rotatably supported to the case via a bearing (not shown), and extends in parallel with the first planet gear unit and the second planet gear unit PS1 and PS2, and in parallel with the left driving axis and the right driving axis SL and SR. Furthermore, the teeth number of the fifth gear 6a is smaller than the teeth number of the sixth gear 6b, and the teeth number of the seventh gear 6c is smaller than the teeth number of the eighth gear 6d. According to the above structure, the second carrier C2 and the first ring gear R1 are connected with each other by the second connecting mechanism 6 in a way that the rotating directions of C2 and R1 are the same, and the rotation speed of C2 is greater than that of R1.

Besides, a gear ratio of the first gear 5a to the second gear 5b and a gear ratio of the fifth gear 6a to the sixth gear 6b are set to a same value, and a gear ratio of the third gear 5c to the fourth gear 5d and a gear ratio of the seventh gear 6c to the eighth gear 6d are set to a same value.

Figure 2:
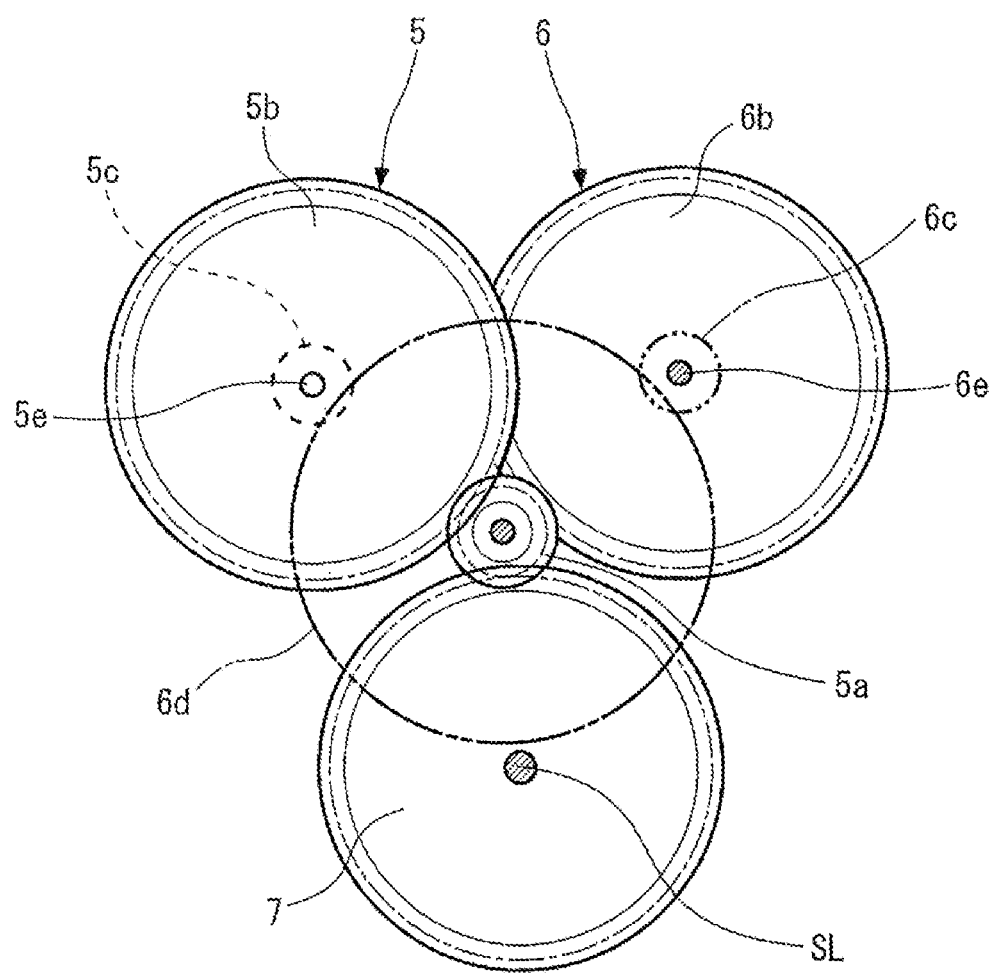
FIG. 2 is a sectional view along a II-II line in FIG. 1.

Furthermore, as seen in FIG. 1 and FIG. 2, the first rotation axis and the second rotation axis 5e and 6e are disposed at different positions on outer peripheral circles of the first planet gear unit and the second planet gear unit PS1 and PS2. Besides, seen from the direction of the axis line, the first rotation axis 5e is disposed without overlapping with the sixth gear and the seventh gear 6b and 6c, and the second rotation axis 6e is disposed without overlapping with the second gear and the third gear 5b and 5c.

Moreover, in FIG. 2, in order to show the position relationship of the seventh gear and the eighth gear 6c and 6d which are not shown in the cross section along the II-II line in FIGS. 1, 6c and 6d are represented by imaginary line (two-dot chain line), and the second ring gear R2 or the right wheel WR is omitted for the sake of convenience. Besides, in FIG. 1, in order to show that the first rotation axis and the second rotation axis 5e and 6e are disposed at different positions on the outer peripheral circle, the first rotation axis 5e, the second gear and the third gear 5b and 5c are represented by dashed lines, and the second rotation axis 6e is drawn deviating the first rotation axis 5e and being eccentric to the sixth gear and the seventh gear 6b and 6c which are integral with the second rotation axis 6e, but these gears 6b and 6c are actually disposed coaxially and integrally with the second rotation axis 6e. The same is true with skeleton diagrams below of the second embodiment to the eighth embodiment (FIG. 7, FIG. 11, FIG. 12, and FIG. 15 to FIG. 18).

Besides, the first output gear 7 engages with the first gear 5a of the first connecting mechanism 5, the second output gear 8 engages with the fifth gear 6a of the second connecting mechanism 6, and the first output gear and the second output gear 7 and 8 are disposed integrally with a right end of the left driving axis SL and a left end of the right driving axis SR respectively. Besides, the teeth numbers of the first output gear and the second output gear 7 and 8 are greater than the teeth numbers of the first gear and the fifth gear 5a and 6a respectively, and a gear ratio of the first gear 5a to the first output gear 7 and a gear ratio of the fifth gear 6a to the second output gear 8 are set to the same value.

According to the above, the rotation power transferred to the first gear and the fifth gear 5a and 6a which are integral with the first carrier and the second carrier C1 and C2 respectively is transferred to the left driving axis and the right driving axis SL and SR respectively via the first output gear and the second output gear 7 and 8 in a decelerating state, and is further transferred to the left wheel and the right wheel WL and WR. The deceleration ratio in this situation is the same between the left wheel and the right wheel WL and WR.

In addition, the teeth numbers of the first gear and the fifth gear 5a and 6a are set to be greater than the teeth numbers of the first output gear and the second output gear 7 and 8 respectively, so that that the rotation power transferred to the first gear and the fifth gear 5a and 6a are transferred to the first output gear and the second output gear 7 and 8 respectively in an accelerating state.

Besides, as is known, the first sun gear S1, the first carrier C1 and the first ring gear R1 of the single-pinion first planet gear unit PS1 can transfer power to each other, and the rotation speeds of the first sun gear S1, the first carrier C1 and the first ring gear R1 satisfy a collinear relationship in which the rotation speeds are arranged on a single straight line in a collinear diagram representing these rotation speeds. Similarly, the second sun gear S2, the second carrier C2 and the second ring gear R2 of the second planet gear unit PS2 can transfer power to each other, and the rotation speeds of the second sun gear S2, the second carrier C2 and the second ring gear R2 satisfy a collinear relationship in which the rotation speeds are arranged on a single straight line in a collinear diagram representing these rotation speeds. Besides, the first sun gear and the second sun gear S1 and S2 are disposed integrally with the first output axis 3a of the first rotary electric machine 3 and the second output axis 4a of the second rotary electric machine 4 respectively.

Furthermore, the first carrier C1 and the second ring gear R2 are connected with each other by the first connecting mechanism 5 in a way that the rotating directions of C1 and R2 are the same and the rotation speed of C1 is greater than the rotation speed of R2. Furthermore, the second carrier C2 and the first ring gear R1 are connected with each other by the second connecting mechanism 6 in a way that the rotating directions of C2 and R1 are the same and the rotation speed of C2 is greater than the rotation speed of R1.

Besides, the first carrier C1 is connected with the left wheel WL via the first gear 5a, the first output gear 7 and the left driving axis SL, and the second carrier C2 is connected with the right wheel WR via the fifth gear 6a, the second output gear 8 and the right driving axis SR. Without regard for the speed variation and shift of rotating direction caused by the first gear 5a and the first output gear 7 as well as the fifth gear 6a and the second output gear 8, the rotation speed of the first carrier C1 is equal to the rotation speed of the left wheel WL, and the rotation speed of the second carrier C2 is equal to the rotation speed of the right wheel WR.

Figure 4:
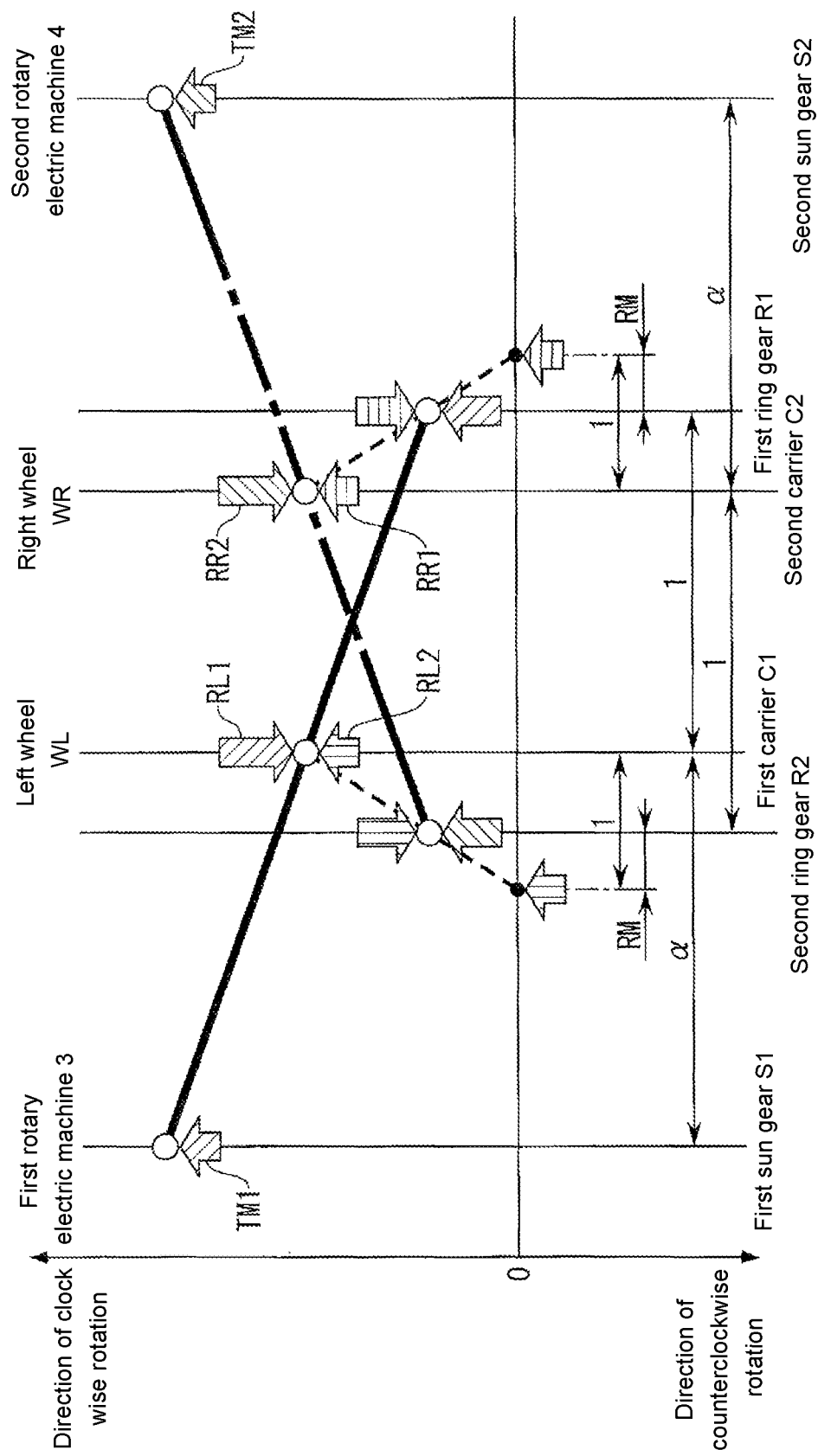
FIG. 4 is a collinear diagram showing a relationship of rotation speeds among various rotation elements of the power apparatus in FIG. 1 and a balancing relationship of torques with regard to a motor-assisted control.

According to the above, the relationship of rotation speeds among various rotation elements such as the first sun gear S1 in the power apparatus 1 is as shown in FIG. 4 for example. In FIG. 4 and other collinear diagrams below, the distance from a horizontal line representing the value of 0 to a white circle on a vertical line corresponds to the rotation speed of each rotation element (the same is true with all collinear diagrams in the embodiments below). In FIG. 4, $\alpha$ stands for the ratio of the teeth number of the first ring gear R1/the teeth number of the first sun gear S1, as well as the ratio of the teeth number of the second ring gear R2/the teeth number of the second sun gear S2. RM stands for the ratio of (the teeth number of the first gear 5a×the teeth number of the third gear 5c)/(the teeth number of the second gear 5b×the teeth number of the fourth gear 5d), as well as the ratio of (the teeth number of the fifth gear 6a×the teeth number of the seventh gear 6c)/(the teeth number of the sixth gear 6b×the teeth number of the eighth gear 6d), and satisfies 0<RM<1.0. The same is true with other collinear diagrams below (the same is true with the second embodiment to the seventh embodiment below). As seen from FIG. 4, the left wheel and the right wheel WL and WR can be in a reciprocal differential rotation.

Besides, a detection signal representing a steering angle $\theta$ of a handle of the vehicle (not shown) is input to the ECU 2 from a steering angle sensor 31, a detection signal representing a vehicle speed is input to the ECU 2 from a vehicle speed sensor 32, and a detection signal representing an operation degree of an accelerator pedal of the vehicle (not shown) (referred to as "accelerator position" hereinafter) AP to the ECU 2 from an accelerator position sensor 33. Moreover, a detection signal representing a current and voltage value input to and output from the battery 23 is input to the ECU 2 from a current voltage sensor 34. The ECU 2 calculates the charging state of the battery 23 based on the detection signal from the current voltage sensor 34.

The ECU 2 is formed by a microcomputer comprising an I/O interface, a CPU, a RAM and a ROM and so on. In accordance with detection signals from the above-mentioned various sensors 31 to 34, the ECU 2 controls the first rotary electric machine and the second rotary electric machine 3 and 4 by a controlling program stored in the ROM. In this way, various operations of the power apparatus 1 are performed. In the following part, the operations of the power apparatus 1 during straight running and revolving of the vehicle are described with reference to FIG. 4 to FIG. 6.

[During the Straight Running]

During the straight running of the vehicle, motor-assisted control, EV driving control or zero torque control are performed. The motor-assisted control is performed to assist the engine by the first rotary electric machine and the second rotary electric machine 3 and 4. In the motor-assisted control, power running is performed in both the first rotary electric machine and the second rotary electric machine 3 and 4, and the electric power (supplied electric power) supplied from the battery 23 to the first rotary electric machine and the second rotary electric machine 3 and 4 is controlled. FIG. 4 shows an example of the relationship of rotation speeds among various rotation elements and the balancing relationship of torques during the motor-assisted control. As shown in FIG. 4, the rotating directions of the first rotary electric machine and the second rotary electric machine 3 and 4 are the same as the rotating directions of the first carrier and the second carrier C1 and C2 connected with the left wheel and the right wheel WL and WR respectively.

In FIG. 4 and other collinear diagrams below, arrows with hatching, shown near the white circle representing the rotation speed, stand for input torques or reactive torques acting on each rotation element, and among these input torques and reactive torques, the torques with the same kind of hatchings (hatchings of negative-slope lines, positive-slope lines, vertical lines, and horizontal lines) are balanced. Besides, TM1 and TM2 are respective output torque of the first rotary electric machine and the second rotary electric machine 3 and 4 (referred to as "the first motor output torque" and "the second motor output torque" respectively hereinafter), which are generated accompanying the power running in the first rotary electric machine and the second rotary electric machine 3 and 4. RL1 and RL2 are respective reactive torque of the left wheel WL caused by the first motor output torque and the second motor output torque TM1 and TM2, and RR1 and RR2 are respective reactive torque of the right wheel WR caused by the first motor output torque and the second motor output torque TM1 and TM2.

As seen from the balancing relationship of torques shown in FIG. 4, the torque transferred to the left wheel WL (referred to as "the left wheel transferred torque" hereinafter) TWL is represented by the following formula (11), and the torque transferred to the right wheel WR (referred to as "the right wheel transferred torque") TWR is represented by the following formula (12).

$$TWL = |RL1| - |RL2| = (1+\alpha)TM1 - \alpha \times RM \times TM2 \qquad (11)$$

$$TWR = |RR2| - |RR1| = (1+\alpha)TM2 - \alpha \times RM \times TM1 \qquad (12)$$

Besides, according to the formulas (11) and (12), the first motor output torque and the second motor output torque TM1 and TM2 are represented by following formulas (13) and (14) respectively.

$$TM1 = \{-(1+\alpha)TWL + \alpha \times RM \times TWR\}/\{(1+\alpha)^2 - \alpha^2 \times RM^2\} \qquad (13)$$

$$TM2 = \{-(1+\alpha)TWR + \alpha \times RM \times TWL\}/\{(1+\alpha)^2 - \alpha^2 \times RM^2\} \qquad (14)$$

The electric power supplied to the first rotary electric machine and the second rotary electric machine 3 and 4 is controlled based on the formulas (13) and (14) so that the left wheel transferred torque and the right wheel transferred torque TWL and TWR become the same required torque. The required torque is calculated by searching for a predetermined map (not shown) in accordance with the detected accelerator position AP. According to the above, the rotation power of the first rotary electric machine and the second rotary electric machine 3 and 4 is transferred to the left wheel and the right wheel WL and WR via the first planet gear unit and the second planet gear unit PS1 and PS2, by which the left wheel and the right wheel WL and WR are driven.

In addition, FIG. 4 is an example of the situation in which by controlling the rotating direction of the first rotary electric machine and the second rotary electric machine 3 and 4, the left wheel and the right wheel WL and WR are driven in a direction of clockwise rotation to make the vehicle run forward; on the contrary, the left wheel and the right wheel WL and WR can also be driven in a direction of counterclockwise rotation to make the vehicle run backward. In addition, during the situation in which power running is performed in the first rotary electric machine and/or the second rotary electric machine 3 and/or 4, including the straight running and revolving described below of the vehicle, the rotating direction of the first rotary electric machine and/or the second rotary electric machine 3 and/or 4 is controlled in accordance with the driving directions of the left wheel and the right wheel WL and WR.

The EV driving control is performed to take only the first rotary electric machine and the second rotary electric machine 3 and 4 as a power source of the vehicle; in the EV driving control, the engine is stopped, and the first rotary electric machine and the second rotary electric machine 3 and 4 are controlled in the same way as in the motor-assisted control.

The zero torque control is performed to avoid drag loss caused by the regeneration done in the first rotary electric machine and the second rotary electric machine 3 and 4, and in the zero torque control, the first motor torque and the second motor torque TM1 and TM2 are controlled to the value of 0.

The above motor-assisted control, EV driving control and zero torque control are implemented selectively in accordance with the calculated charging state of the battery 23, or the load of the vehicle represented by the accelerator position AP.

Besides, during the straight running and the decelerating running (the fuel-cut operation of the engine) of the vehicle, when the charging state of the battery 23 is smaller than a predetermined upper limit, a decelerating regeneration control is performed. During the decelerating regeneration control, the regeneration is performed in both the first rotary electric machine and the second rotary electric machine 3 and 4 using the inertial energy of the vehicle, and the electric power that is regenerated (regenerated electric power) is controlled.

Braking torques based on the first motor output torque and the second motor output torque TM1 and TM2 which are generated respectively accompanying the regeneration in the first rotary electric machine and the second rotary electric machine 3 and 4 act on the left wheel and the right wheel WL and WR, by which the vehicle is decelerated. Besides, the left wheel transferred torque and the right wheel transferred torque TWL and TWR are represented by the following formulas (15) and (16) respectively, and the regenerated electric power in the first rotary electric machine and the second rotary electric machine 3 and 4 is controlled in a way that the braking torques acting on the left wheel and the right wheel WL and WR are the same to each other.

$$TWL = -(1+\alpha)|TM1| + \alpha \times RM \times |TM2| \quad (15)$$

$$TWL = -(1+\alpha)|TM2| + \alpha \times RM \times |TM1| \quad (16)$$

[During Revolving]

When a clockwise direction yaw moment (referred to as "the right-yaw moment" hereinafter), which makes the vehicle revolve rightward during the rightward revolving in the advancing of the vehicle, is increased, a torque distribution control for increasing the right-yaw moment is performed, and a first torque distribution control to a fourth torque distribution control are prepared as the torque distribution control. In the following part, the first torque distribution control to the fourth torque distribution control for increasing the right-yaw moment are described in sequence.

In the first torque distribution control, power running is performed in both the first rotary electric machine and the second rotary electric machine 3 and 4, and the electric power supplied to the first rotary electric machine and the second rotary electric machine 3 and 4 is controlled in a way that the first motor output torque TM1 is greater than the second motor output torque TM2.

In this way, as seen from FIG. 4 and the formulas (11) and (12), the left wheel transferred torque TWL is greater than the right wheel transferred torque TWR, as a result, the right-yaw moment of the vehicle increases. In this situation, the electric power supplied to the first rotary electric machine and the second rotary electric machine 3 and 4 is controlled in accordance with the detected steering angle θ, the vehicle speed VP, or the accelerator position AP.

Next, the second torque distribution control for increasing the right-yaw moment is described. In the second torque distribution control, the regeneration is performed in both the first rotary electric machine and the second rotary electric machine 3 and 4. In this situation, the regenerated electric power in the first rotary electric machine and the second rotary electric machine 3 and 4 are controlled in a way that the absolute value |TM2| of the second motor output torque is greater than the absolute value TM of the first motor output torque. In this way, as seen from the formulas (15) and (16), the braking torque of the right wheel WR is greater than the braking torque of the left wheel WL, as a result, the right-yaw moment of the vehicle increases. In this situation, the regenerated electric power in the first rotary electric machine and the second rotary electric machine 3 and 4 is controlled in accordance with the steering angle θ or the vehicle speed VP and so on.

Figure 5:
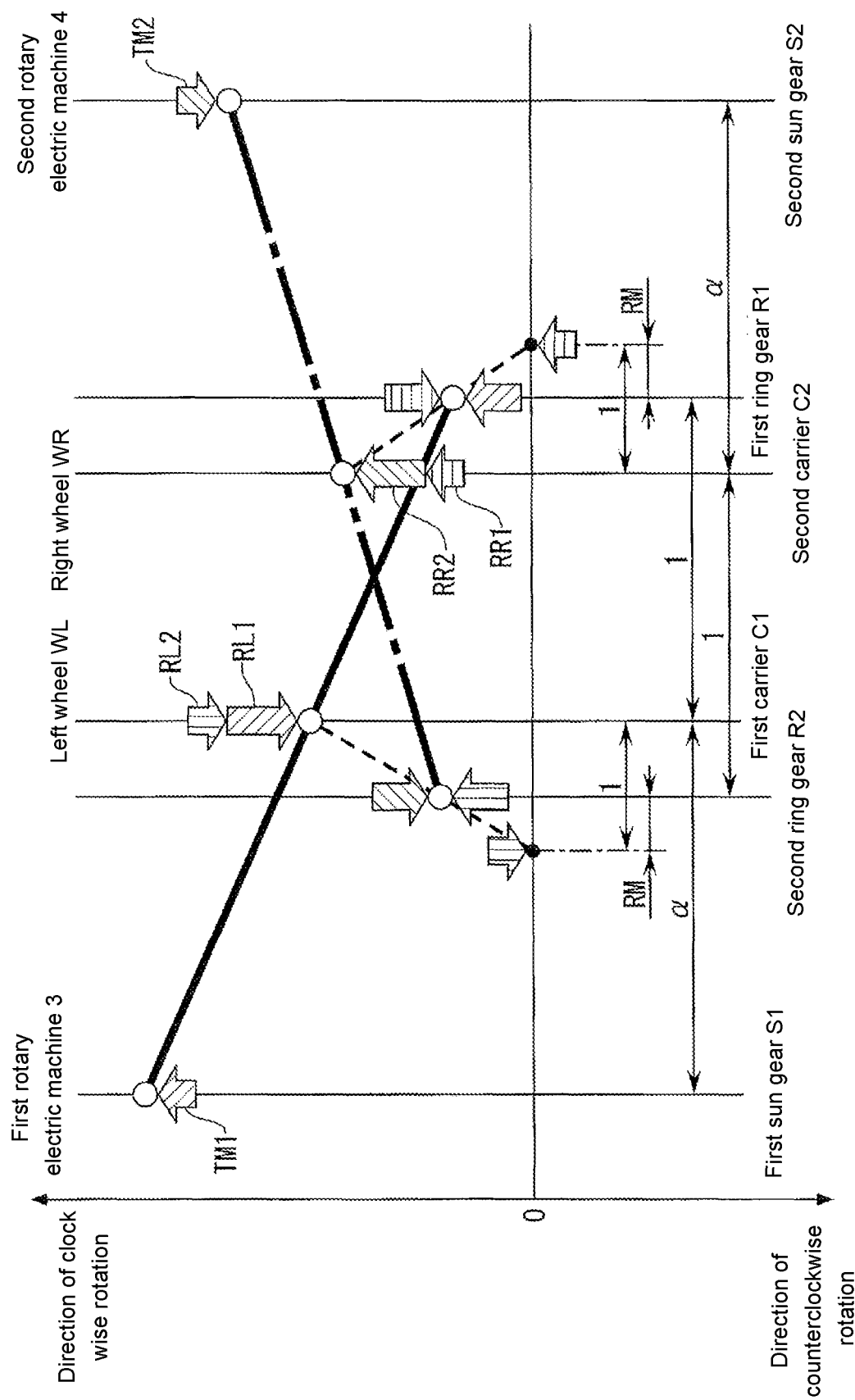
FIG. 5 is a collinear diagram showing a relationship of rotation speeds among various rotation elements of the power apparatus in FIG. 1 and a balancing relationship of torques with regard to a third torque distribution control used for increasing right-yaw moment.

Next, the third torque distribution control for increasing the right-yaw moment is described. In the third torque distribution control, power running is performed in the first rotary electric machine 3, and regeneration is performed in the second rotary electric machine 4. FIG. 5 shows the relationship of rotation speeds among various rotation elements and the balancing relationship of torques in this situation. In this situation, the left wheel transferred torque and the right wheel transferred torque TWL and TWR are represented by the following formulas (17) and (18) respectively.

$$TWL = |RL1| + |RL2| \quad (17)$$
$$= (1+\alpha)TM1 + \alpha \times RM \times |TM2|$$

$$TWR = -|RR2| - |RR1| \quad (18)$$
$$= -(1+\alpha)|TM2| - \alpha \times RM \times TM1$$

As seen from the formulas (17) and (18), the driving torque acts on the left wheel WL, and the braking torque acts on the right wheel WR, as a result, the right-yaw moment of the vehicle increases. In this situation, the electric power supplied to the first rotary electric machine 3 and the regenerated electric power in the second rotary electric machine 4 are also controlled in accordance with the steering angle θ, the vehicle speed VP, or the accelerator position AP.

Next, the fourth torque distribution control for increasing the right-yaw moment is described. In the fourth torque distribution control, a zero torque control is performed on the first rotary electric machine 3, and regeneration is performed in the second rotary electric machine 4. In this situation, only the second motor output torque TM2 serving as the braking torque is generated, so that as seen from the formulas (15) and (16), the left wheel transferred torque TWL is α×RM×|TM2|, and the right wheel transferred torque TWR is −(1+α)|TM2|. In this way, the driving torque acts on the left wheel WL, and the braking torque acts on the right wheel WR, as a result, the right-yaw moment of the vehicle increases. In this situation, the regenerated electric power in the second rotary electric machine 4 is also controlled in accordance with the steering angle θ, the vehicle speed VP, or the accelerator position AP.

The first torque distribution control to the fourth torque distribution control for increasing the right-yaw moment are performed selectively in accordance with, for example, the steering angle θ, the vehicle speed VP, the vehicle load represented by the accelerator position AP, or the charging state of the battery 23.

In addition, in order to increase the right-yaw moment, power running is performed in the first rotary electric machine 3, and a zero torque control may be performed on the second rotary electric machine 4. In this situation, only the first motor output torque TM1 is generated, so that as seen from the formulas (11) and (12), the left wheel transferred torque TWL is TWL=(1+α)TM1, and the right wheel transferred torque TWR is TWR=−α×RM×TM1. In this way, the driving torque acts on the left wheel WL, and the braking torque acts on the right wheel WR, as a result, the right-yaw moment of the vehicle increases. In this situation, the electric power supplied to the first rotary electric machine 3 is also controlled in accordance with the steering angle θ, the vehicle speed VP, or the accelerator position AP.

Besides, when the right-yaw moment of the vehicle is decreased in the rightward revolving of the vehicle, a torque distribution control for decreasing the right-yaw moment is performed, and a first torque distribution control to a fourth torque distribution control are prepared as the torque distribution control for decreasing the right-yaw moment. In the following part, the first torque distribution control to the fourth torque distribution control for decreasing the right-yaw moment are described in sequence. In the first torque distribution control, power running is performed in both the first rotary electric machine and the second rotary electric machine 3 and 4, and the electric power supplied to the first rotary electric machine and the second rotary electric machine 3 and 4 is controlled in a way that the second motor output torque TM2 is greater than the first motor output torque TM1.

In this way, as seen from the formulas (11) and (12), the right wheel transferred torque TWR is greater than the left wheel transferred torque TWL, as a result, the right-yaw moment of the vehicle is decreased. In this situation, the electric power supplied to the first rotary electric machine and the second rotary electric machine 3 and 4 is controlled in accordance with the steering angle θ, the vehicle speed VP, or the accelerator position AP.

Next, the second torque distribution control for decreasing the right-yaw moment is described. In the second torque distribution control, regeneration is performed in both the first rotary electric machine and the second rotary electric machine 3 and 4, and the regenerated electric power in the first rotary electric machine and the second rotary electric machine 3 and 4 is controlled in a way that the absolute value |TM1| of the first motor output torque is greater than the absolute value TM2 of the second motor output torque. In this way, as seen from the formulas (15) and (16), the braking torque of the left wheel WL is greater than the braking torque of the right wheel WR, as a result, the right-yaw moment of the vehicle is decreased. In this situation, the regenerated electric power in the first rotary electric machine and the second rotary electric machine 3 and 4 is controlled in accordance with the steering angle θ or the vehicle speed VP.

Figure 6:
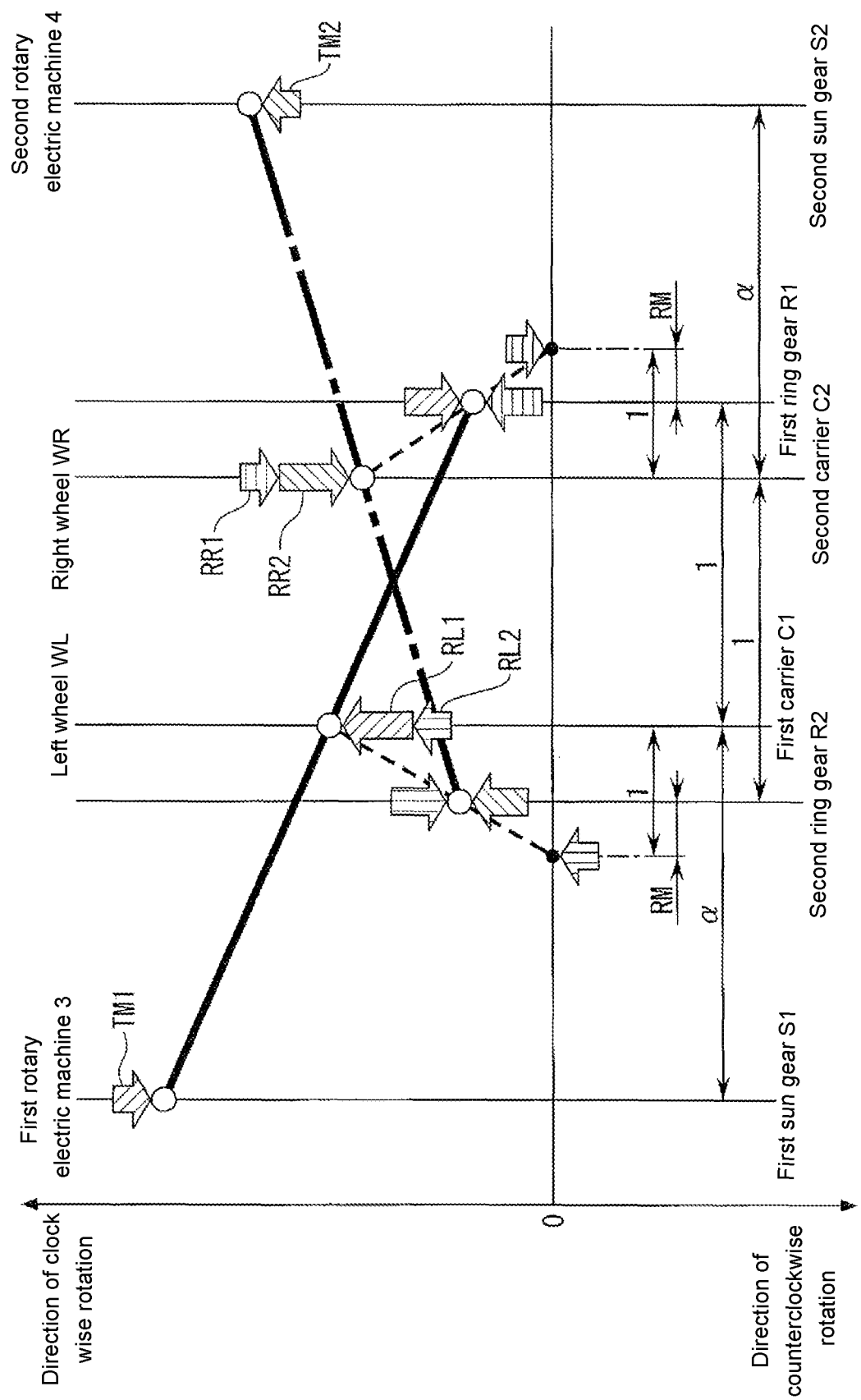
FIG. 6 is a collinear diagram showing a relationship of rotation speeds among various rotation elements of the power apparatus in FIG. 1 and a balancing relationship of torques with regard to a third torque distribution control used for decreasing right-yaw moment.
Figure 7:
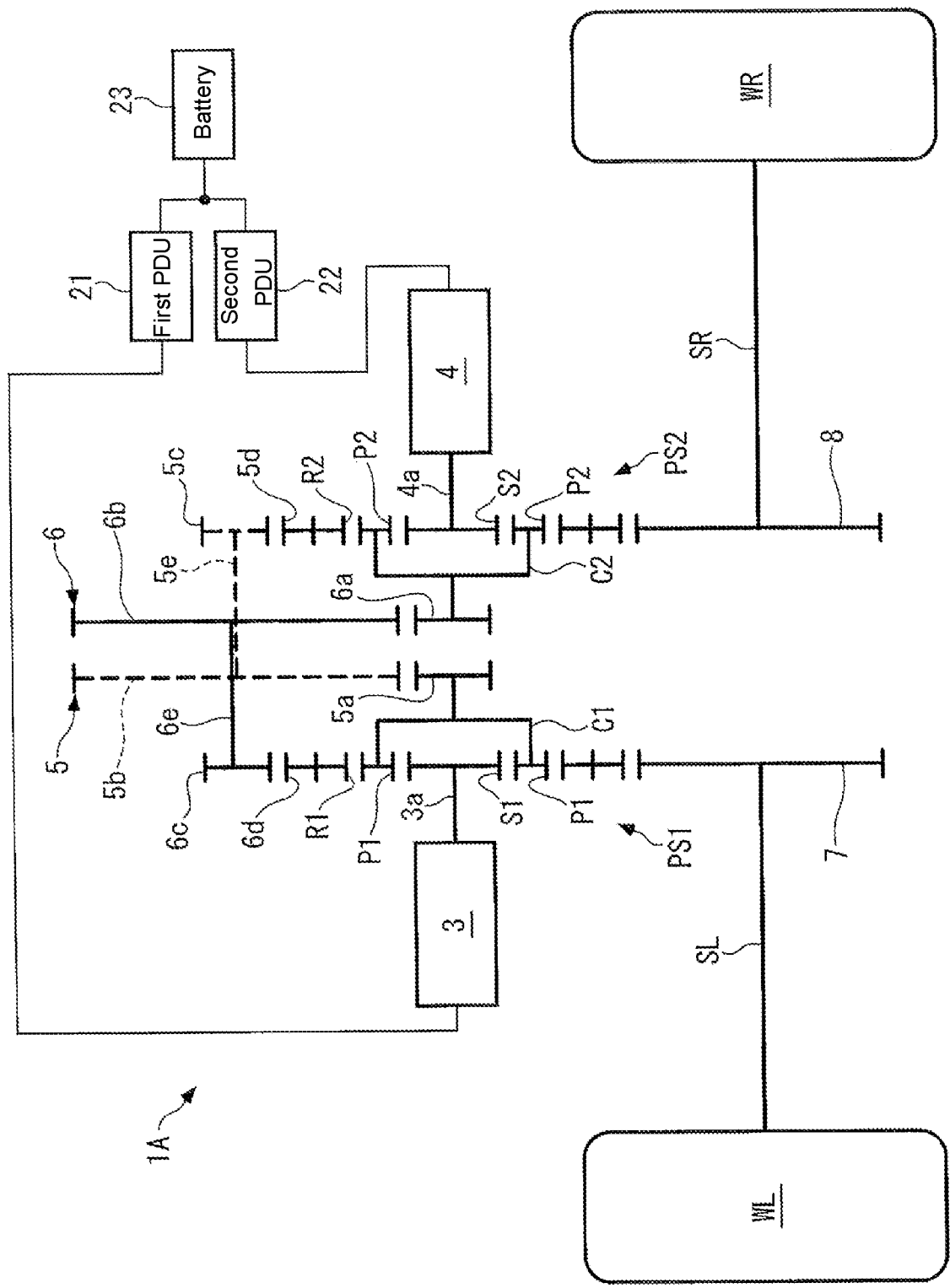
FIG. 7 is a skeleton diagram showing a power apparatus according to a second embodiment of the disclosure as well as the left wheel and the right wheel of a vehicle to which the power apparatus is applied.

Next, the third torque distribution control for decreasing the right-yaw moment is described. In the third torque distribution control, regeneration is performed in the first rotary electric machine 3, and power running is performed in the second rotary electric machine 4. FIG. 6 shows a relationship of rotation speeds among various rotation elements and a balancing relationship of torques in this situation. In this situation, as seen from the comparison of FIG. 5 and FIG. 6, the left wheel transferred torque and the right wheel transferred torque TWL and TWR are represented by the following formulas (19) and (20) respectively.

$$TWL = -|RL1| - |RL2| \quad (19)$$
$$= -(1 + \alpha)|TM1| - \alpha \times RM \times TM2$$

$$TWR = |RR2| + |RR1| \quad (20)$$
$$= (1 + \alpha)TM2 + \alpha \times RM \times |TM1|$$

As seen from the formulas (19) and (20), the braking torque acts on the left wheel WL, and the driving torque acts on the right wheel WR, as a result, the right-yaw moment of the vehicle decreases. In this situation, the regenerated electric power in the first rotary electric machine 3 and the electric power supplied to the second rotary electric machine 4 are controlled in accordance with the steering angle θ, the vehicle speed VP, or the accelerator position AP.

Next, the fourth torque distribution control for decreasing the right-yaw moment is described. In the fourth torque distribution control, regeneration is performed in the first rotary electric machine 3, and a zero torque control is performed on the second rotary electric machine 4. In this situation, only the first motor output torque TM1 serving as the braking torque is generated, so that as seen from the formulas (15) and (16), the left wheel transferred torque TWL is −(1+α)|TM1|, and the right wheel transferred torque TWR is α×RM×|TM|. In this way, the braking torque acts on the left wheel WL, and the driving torque acts on the right wheel WR, as a result, the right-yaw moment of the vehicle is decreased. In this situation, the regenerated electric power in the first rotary electric machine 3 is also controlled in accordance with the steering angle θ or the vehicle speed VP.

The first torque distribution control to the fourth torque distribution control for decreasing the right-yaw moment are performed selectively in accordance with, for example, the steering angle θ, the vehicle speed VP, the vehicle load represented by the accelerator position AP, or the charging state of the battery 23.

In addition, in order to decrease the right-yaw moment, a zero torque control may be performed on the first rotary electric machine 3, and power running may be performed on the second rotary electric machine 4. In this situation, only the second motor output torque TM2 is generated, so that as seen from the formulas (11) and (12), the left wheel transferred torque TWL is −α×RM×TM2, and the right wheel transferred torque TWR is (1+α)TM2. In this way, the braking torque acts on the left wheel WL, and the driving torque acts on the right wheel WR, as result, the right-yaw moment of the vehicle is decreased. In this situation, the electric power supplied to the second rotary electric machine 4 is also controlled in accordance with the steering angle θ, the vehicle speed VP, or the accelerator position AP.

In addition, when a counterclockwise direction yaw moment (referred to as "the left-yaw moment" hereinafter), which makes the vehicle revolve leftward during the leftward revolving in the advancing of the vehicle, is increased, the first torque distribution control to the fourth torque distribution control for increasing the left-yaw moment during the leftward revolving are performed, and when the left-yaw moment is decreased, the first torque distribution control to the fourth torque distribution control for decreasing the left-yaw moment during the leftward revolving are performed. The first torque distribution control to the fourth torque distribution control for increasing or decreasing the left-yaw moment during the leftward revolving are performed in a way similar to the way of the first torque distribution control to the fourth torque distribution control for increasing or decreasing the right-yaw moment during the rightward revolving, so that detailed description is omitted here.

Besides, the corresponding relationship of various elements in the first embodiment to various elements in the disclosure is as described below. That is, the first rotary electric machine and the second rotary electric machine 3 and 4 in the first embodiment correspond respectively to the first power source and the second power source in the disclosure, and the first planet gear unit and the second planet gear unit PS1 and PS2 in the first embodiment correspond respectively to the first differential unit and the second differential unit in the disclosure. Besides, the first gear 5a, the first output gear 7, the fifth gear 6a, the second output gear 8, and the left driving axis and the right driving axis SL and SR in the first embodiment correspond to the transferring mechanism in the disclosure, and the left wheel and the right wheel WL and WR in the first embodiment correspond to the first driven unit and the second driven unit in the disclosure.

As described above, according to the first embodiment, the rotation power of the first rotary electric machine and the second rotary electric machine 3 and 4 can be transferred to the left wheel and the right wheel WL and WR via the first planet gear unit and the second planet gear unit PS1 and PS2 to drive the WL and WR, as described with reference to FIG. 4 and so on. Besides, the torque of the left wheel and the right wheel WL and WR can be controlled in a way that the torques have the same magnitude or in a way that the torques have different magnitudes (a torque difference is generated).

Figure 38:
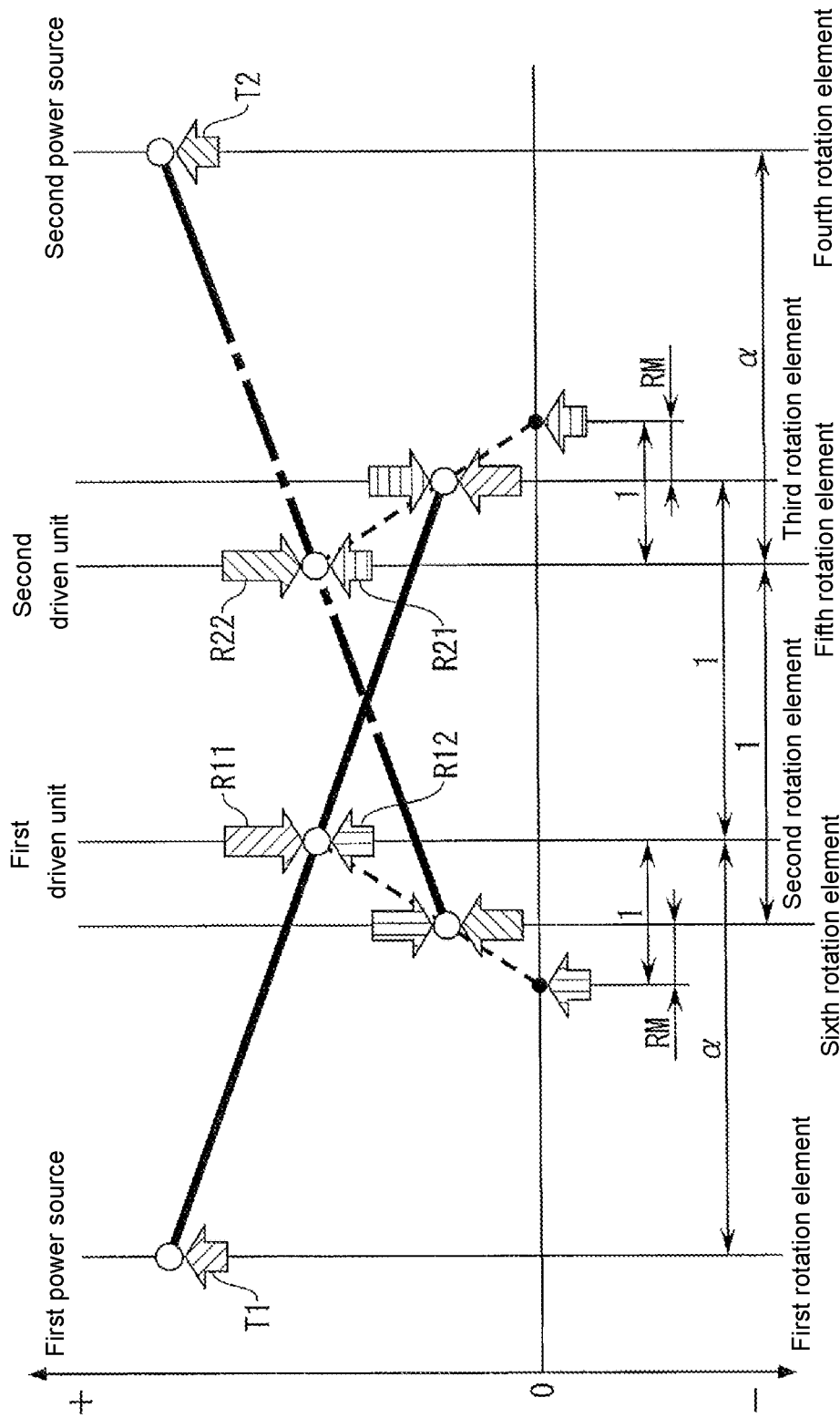
FIG. 38 is a collinear diagram showing a relationship of rotation speeds among various rotation elements of the power apparatus according to the invention of claim 1 and a balancing relationship of torques, with regard to a situation in which the second rotation element and the fifth rotation element are connected with the first driven unit and the second driven unit respectively.
Figure 40:
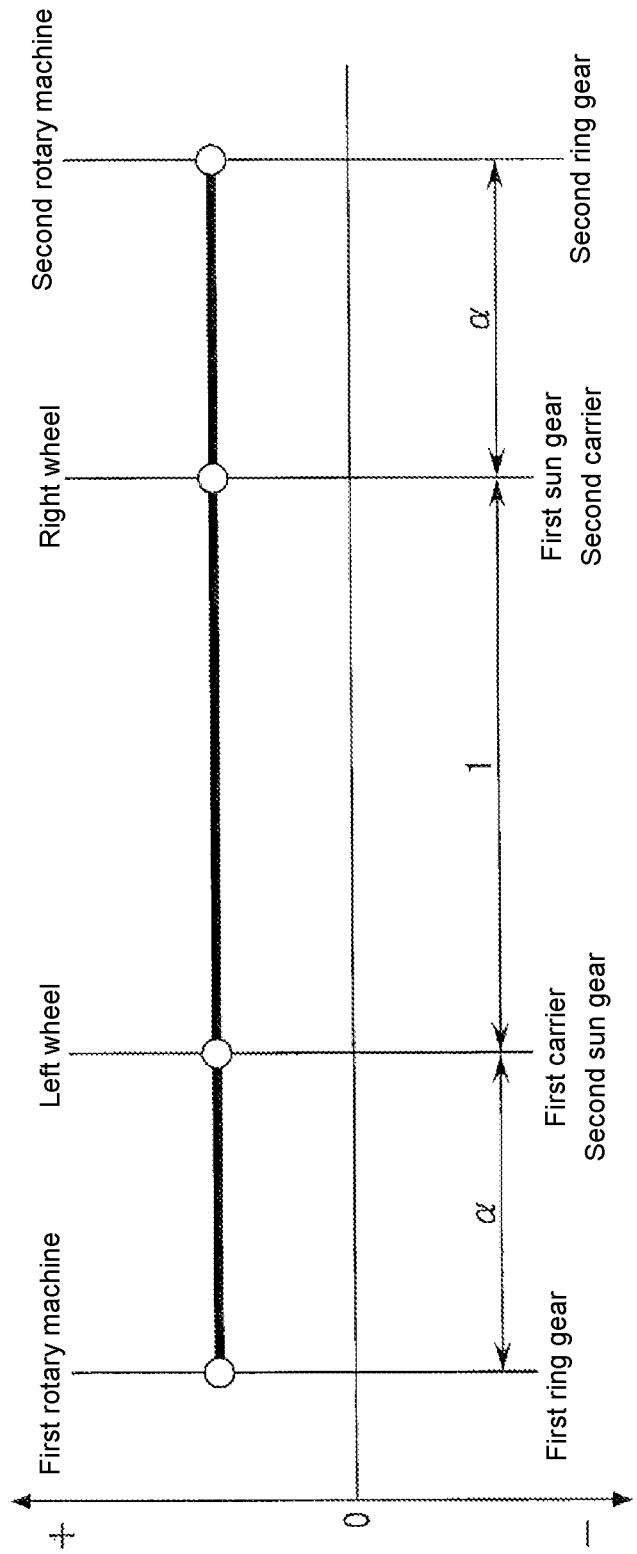
FIG. 40 is a collinear diagram showing a relationship of rotation speeds among various rotation elements of a conventional power apparatus.

Besides, as seen from the comparison of FIG. 4 with FIG. 38 used in the description of the invention of claim 1, for the power apparatus 1, when compared with conventional power apparatus (FIG. 40), even if the rotation speed of the left wheel WL is smaller than the rotation speed of the right wheel WR for the amount of RM, the rotation speed of the first rotary electric machine 3 is not lower than 0; besides, even if the rotation speed of the right wheel WR is smaller than the rotation speed of the left wheel WL, the rotation speed of the second rotary electric machine 4 is not lower than 0. Therefore, a rotating direction inversion of either the first rotary electric machine or the second rotary electric machine 3 and 4 caused by the differential rotation of the left wheel and the right wheel WL and WR can be prevented, and 3 and 4 can be easily controlled accordingly.

Besides, as seen from FIG. 4, the reactive torque RL2 of the left wheel WL caused by the second motor output torque TM2 and the reactive torque RR1 of the right wheel WR caused by the first motor output torque TM1 act on the driving direction of the left wheel and the right wheel WL and WR respectively. The first carrier C1 and the second sun gear S2 are connected by the first connecting mechanism 5 in the above-mentioned way, and the first ring gear R1 and the second carrier C2 are connected by the second connecting mechanism 6 in the above-mentioned way, by which the reactive torques RL2 and RR1 can be reduced when compared with the situation in which the second rotation element and the sixth rotation element are connected with the third rotation element and the fifth rotation element respectively to rotate integrally as in the related art. Therefore, the torque transferred to the left wheel and the right wheel WL and WR can be increased accordingly, so that the miniaturization of the first rotary electric machine and the second rotary electric machine 3 and 4 can be achieved.

Furthermore, as seen from the collinear diagrams of FIG. 4 and so on, which show the relationship of rotation speeds among various rotation elements, the rotation speeds of the first rotary electric machine and the second rotary electric machine 3 and 4 can be respectively maintained greater than the rotation speeds of the first carrier and the second carrier C1 and C2 which are connected with the left wheel and the right wheel WL and WR respectively, by which the efficiency of both 3 and 4 can be raised.

Besides, because the first sun gear and the second sun gear S1 and S2 are connected with the first rotary electric machine and the second rotary electric machine 3 and 4 respectively, compared with the situation in which the first ring gear and the second ring gear R1 and R2 are connected with the first rotary electric machine and the second rotary electric machine 3 and 4 respectively, the torque transferred from the first rotary electric machine and the second rotary electric machine 3 and 4 to the left wheel and the right wheel WL and WR can be increased, and the rotation speeds of the first rotary electric machine and the second rotary electric machine 3 and 4 can be increased. Furthermore, the eighth gear and the fourth gear 6d and 5d can be compactly disposed on the periphery surface of the first ring gear and the second ring gear R1 and R2.

Besides, the power transferred to the first carrier and the second carrier C1 and C2 can be transferred to the left wheel and the right wheel WL and WR respectively in a decelerating state by the first gear 5a and the first output gear 7, and the fifth gear 6a and the second output gear 8. Furthermore, because the first gear and the fifth gear 5a and 6a also serve as the gears of the transferring mechanism in the disclosure, component numbers of the power apparatus 1 can be reduced accordingly.

Next, a power apparatus 1A according to the second embodiment of the disclosure is described with reference to FIG. 7 to FIG. 10. The only difference between the power apparatus 1A and the first embodiment is that the first output gear and the second output gear 7 and 8 do not engage respectively with the first gear 5a of the first connecting mechanism 5 and the fifth gear 6a of the second connecting mechanism 6, but engage respectively with the eighth gear 6d of the second connecting mechanism 6 and the fourth gear 5d of the first connecting mechanism 5. In FIG. 7 to FIG. 10, the same symbols are given to structural elements similar to the first embodiment. In the following part, the description is centered on the difference with the first embodiment.

As seen from the difference with the first embodiment, the first ring gear R1 is connected with the left wheel WL via the eighth gear 6d, the first output gear 7 and the left driving axis SL, and the second ring gear R2 is connected with the right wheel WR via the fourth gear 5d, the second output gear 8 and the right driving axis SR. The teeth numbers of the first output gear and the second output gear 7 and 8 are smaller than teeth numbers of the eighth gear and the fourth gear 6d and 5d respectively, and the gear ratio of the eighth gear 6d to the first output gear 7 and the gear ratio of the fourth gear 5d to the second output gear 8 are set to the same value.

According to the above, the power transferred to the eighth gear and the fourth gear 6d and 5d which are integral with the first ring gear and the second ring gear R1 and R2 respectively can be transferred respectively to the left driving axis and the right driving axis SL and SR in an accelerating state via the first output gear and the second output gear 7 and 8, and further transferred to the left wheel and the right wheel WL and WR respectively. The acceleration ratio in this situation is the same for the left wheel and the right wheel WL and WR.

In addition, the respective teeth number of the eighth gear and the fourth gear 6d and 5d may be set to be greater than the respective teeth number of the first output gear and the second output gear 7 and 8, so that the rotation power transferred to the eighth gear and the fourth gear 6d and 5d is transferred respectively to the first output gear and the second output gear 7 and 8 in a decelerating state.

As seen from the connection relationship among various rotation elements, without regard for the speed variation and shift of rotating direction caused by the eighth gear 6d and the first output gear 7 as well as the fourth gear 5d and the second output gear 8, the rotation speed of the first ring gear R1 is equal to the rotation speed of the left wheel WL, and the rotation speed of the second ring gear R2 is equal to the rotation speed of the right wheel WR. Besides, the relationship of rotation speeds among other rotation elements is the same as the first embodiment.

Figure 8:
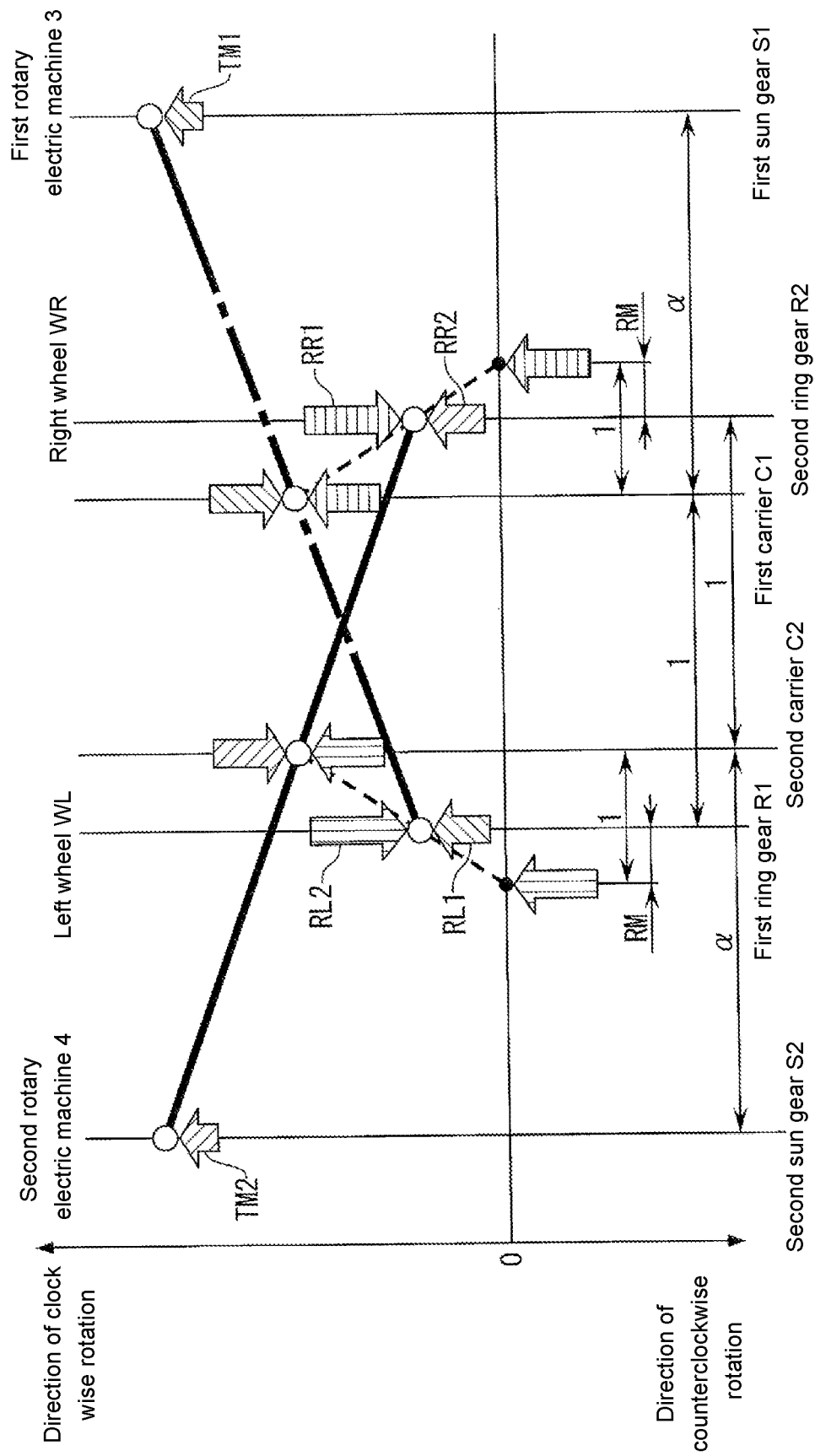
FIG. 8 is a collinear diagram showing a relationship of rotation speeds among various rotation elements of the power apparatus in FIG. 7 and a balancing relationship of torques with regard to a motor-assisted control.

According to the above, the relationship of rotation speeds among various rotation elements in the power apparatus 1A is as shown in FIG. 8 for example. Various parameters (a and RM) in FIG. 8 are the same as described in the first embodiment (0<RM<1.0). As seen from FIG. 8, the left wheel and the right wheel WL and WR can be in a reciprocal differential rotation.

Besides, similar to the situation of the first embodiment, the first rotary electric machine and the second rotary electric machine 3 and 4 are controlled by the ECU 2 (see FIG. 3), by which various operations of the power apparatus 1A are performed. In the following part, the motor-assisted control, the decelerating regeneration control, and the torque distribution control for increasing and decreasing the right-yaw moment contained in an operation different from the first embodiment, which are among the motor-assisted control, the EV driving control, the zero torque control, the decelerating regeneration control, and the torque distribution control for increasing and decreasing the left-yaw moment and the right-yaw moment contained in the operation of the power apparatus 1A during the straight running or revolving of the vehicle, are described with reference to FIG. 8 to FIG. 10, and description regarding other aspects is omitted. Besides, the description below is centered on the operation different from the first embodiment.

[During Straight Running]

In the motor-assisted control performed during the straight running of the vehicle, similar to the first embodiment, power running is performed in both the first rotary electric machine and the second rotary electric machine 3 and 4, and electric power supplied from the battery 23 to the first rotary electric machine and the second rotary electric machine 3 and 4 is controlled. FIG. 8 shows an example of the relationship of rotation speeds among various rotation elements and the balancing relationship of torques during the motor-assisted control. As shown in FIG. 8, the rotating directions of the first rotary electric machine and the second rotary electric machine 3 and 4 are the same as the rotating directions of the first ring gear and the second ring gear R1 and R2 which are connected with the left wheel and the right wheel WL and WR respectively.

In addition, as described in the first embodiment, in FIG. 8 and other collinear diagrams below, the arrows with hatchings represent the input torques or the reactive torques acting on each rotation element, and among these input torques and reactive torques, the torques with the same kind of hatchings (hatching of negative-slope lines, positive-slope lines, vertical lines, and horizontal lines) are balanced. Besides, TM1 and TM2 are the first motor output torque and the second motor output torque (the output torque of the first rotary electric machine and the second rotary electric machine 3 and 4) respectively, RL1 and RL2 are the reactive torques of the left wheel WL caused by the first motor output torque and the second motor output torque TM1 and TM2, and RR1 and RR2 are the reactive torques of right wheel WR caused by the first motor output torque and the second motor output torque TM1 and TM2.

As seen from the balancing relationship of torques shown in FIG. 8, the left wheel transferred torque TWL (the torque transferred to the left wheel WL) is represented by the following formula (21), and the right wheel transferred torque TWR (the torque transferred to the right wheel WR) is represented by the following formula (22).

$$TWL = -|RL1| + |RL2| \qquad (21)$$
$$= -\alpha \times TM1 + (1+\alpha)TM2/RM$$

$$TWR = -|RR2| + |RR1| \qquad (22)$$
$$= -\alpha \times TM2 + (1+\alpha)TM1/RM$$

Besides, according to the formulas (21) and (22), the first motor output torque and the second motor output torque TM1 and TM2 are represented by the following formulas (23) and (24) respectively.

$$TM1 = \{[-(1+\alpha)TWR/RM] + \alpha \times TWL\}/\{[(1+\alpha)^2/RM^2] - \alpha^2\} \qquad (23)$$

$$TM2 = \{[-(1+\alpha)TWL/RM] + \alpha \times TWR\}/\{[(1+\alpha)^2/RM^2] - \alpha^2\} \qquad (24)$$

The electric power supplied to the first rotary electric machine and the second rotary electric machine 3 and 4 is controlled based on the formulas (23) and (24) so that the left wheel transferred torque and the right wheel transferred torque TWL and TWR become the same required torque. According to the above, the rotation power of the first rotary electric machine and the second rotary electric machine 3 and 4 is transferred to the left wheel and the right wheel WL and WR via the first planet gear unit and the second planet gear unit PS1 and PS2, by which the left wheel and the right wheel WL and WR are driven.

In addition, FIG. 8 is an example of the situation in which by controlling the rotating direction of the first rotary electric machine and the second rotary electric machine 3 and 4, the left wheel and the right wheel WL and WR are driven in a direction of clockwise rotation to make the vehicle run forward; and similar to the first embodiment, on the contrary, the left wheel and the right wheel WL and WR can also be driven in a direction of counterclockwise rotation to make the vehicle run backward.

Besides, similar to the situation of the first embodiment, in the decelerating regeneration control, regeneration is performed in the first rotary electric machine and the second rotary electric machine 3 and 4, and in this situation, the left and right wheel transferred torque TWL and TWR are represented by the following formulas (25) and (26) respectively.

$$TWL = \alpha \times |TM1| - (1+\alpha)|TM2|/RM \quad (25)$$

$$TWR = \alpha \times |TM2| - (1+\alpha)|TM1|/RM \quad (26)$$

[During Revolving]

In the first torque distribution control for increasing the right-yaw moment performed during the rightward revolving in the advancing of the vehicle, power running is performed in both the first rotary electric machine and the second rotary electric machine 3 and 4, and the electric power supplied to the first rotary electric machine and the second rotary electric machine 3 and 4 is controlled in a way that the second motor output torque TM2 is greater than the first motor output torque TM1. In this way, as seen from the formulas (21) and (22), the left wheel transferred torque TWL is greater than the right wheel transferred torque TWR, as a result, the right-yaw moment of the vehicle increases.

In the second torque distribution control for increasing the right-yaw moment, regeneration is performed in both the first rotary electric machine and the second rotary electric machine 3 and 4, and the regenerated electric power in the first and the second rotary electric machine 3 and 4 is controlled in a way that the absolute value |TM1| of the first motor output torque is greater than the absolute value |TM2| of the second motor output torque. In this way, as seen from the formulas (25) and (26), the braking torque of the right wheel WR is greater than the braking torque of the left wheel WL, as a result, the right-yaw moment of the vehicle increases.

Figure 9:
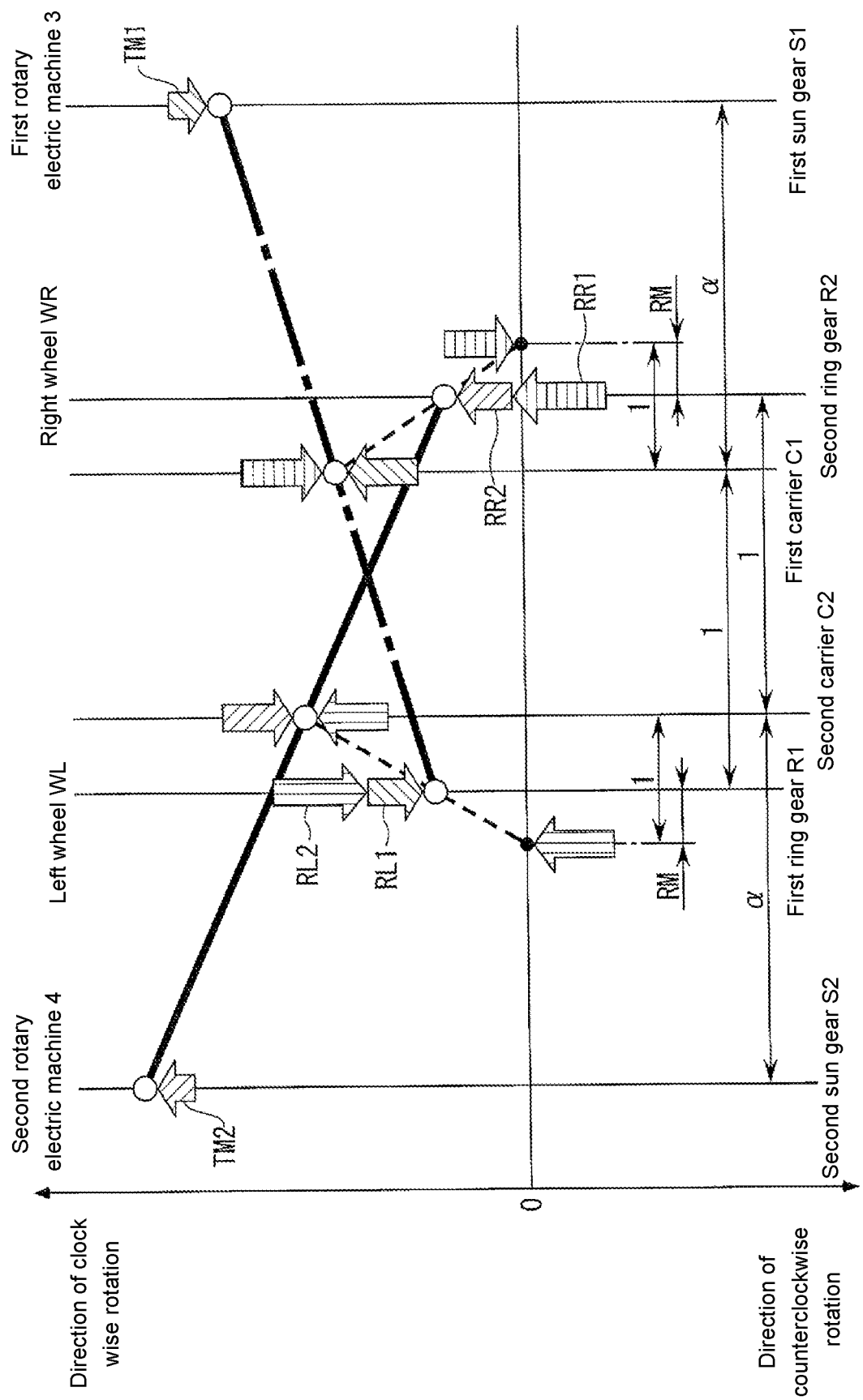
FIG. 9 is a collinear diagram showing a relationship of rotation speeds among various rotation elements of the power apparatus in FIG. 7 and a balancing relationship of torques with regard to a third torque distribution control used for increasing right-yaw moment.

In the third torque distribution control for increasing the right-yaw moment, regeneration is performed in the first rotary electric machine 3, and power running is performed in the second rotary electric machine 4. FIG. 9 shows the relationship of rotation speeds among various rotation elements and the balancing relationship of torques in this situation. In this situation, the left wheel transferred torque and the right wheel transferred torque TWL and TWR are represented by the following formulas (27) and (28) respectively.

$$TWL = |RL1| + |RL2| \quad (27)$$
$$= \alpha \times |TM1| + (1+\alpha)TM2/RM$$

$$TWR = -|RR2| - |RR1| \quad (28)$$
$$= -\alpha \times TM2 - (1+\alpha)|TM1|/RM$$

As seen from the formulas (27) and (28), the driving torque acts on the left wheel WL, and the braking torque acts on the right wheel WR, as a result, the right-yaw moment of the vehicle increases.

Besides, in the fourth torque distribution control for increasing the right-yaw moment, regeneration is performed in the first rotary electric machine 3, and zero torque control is performed on the second rotary electric machine 4. In this situation, only the first motor output torque TM1 serving as the braking torque is generated, so that as seen from the formulas (25) and (26), the left wheel transferred torque TWL is α×|TM1|, the right wheel transferred torque TWR is −(1+α)|TM|/RM. In this way, the driving torque acts on the left wheel WL, and the braking torque acts on the right wheel WR, as a result, the right-yaw moment of the vehicle increases.

In addition, in order to increase the right-yaw moment, zero torque control may be performed on the first rotary electric machine 3, and power running may be performed in the second rotary electric machine 4. In this situation, only the second motor output torque TM2 is generated, so that as seen from the formulas (21) and (22), the left wheel transferred torque TWL is (1+α)TM2/RM, and the right wheel transferred torque TWR is −α×TM2. In this way, the driving torque acts on the left wheel WL, and the braking torque acts on the right wheel WR, as a result, the right-yaw moment of the vehicle increases.

In the first torque distribution control for decreasing the right-yaw moment, power running is performed in both the first rotary electric machine and the second rotary electric machine 3 and 4, and the electric power supplied to the first rotary electric machine and the second rotary electric machine 3 and 4 is controlled in a way that the first motor output torque TM1 is greater than the second motor output torque TM2. In this way, as seen from the formulas (21) and (22), the right wheel transferred torque TWR is greater than the left wheel transferred torque TWL, as a result, the right-yaw moment of the vehicle is decreased.

In the second torque distribution control for decreasing the right-yaw moment, regeneration is performed in both the first rotary electric machine and the second rotary electric machine 3 and 4, and the regenerated electric power in the first rotary electric machine and the second rotary electric machine 3 and 4 is controlled in a way that the absolute value |TM2| of the second motor output torque is greater than the absolute value TM1 of the first motor output torque. In this way, as seen from the formulas (25) and (26), the braking torque of the left wheel WL is greater than the braking torque of the right wheel WR, as a result, the right-yaw moment of the vehicle is decreased.

Figure 10:
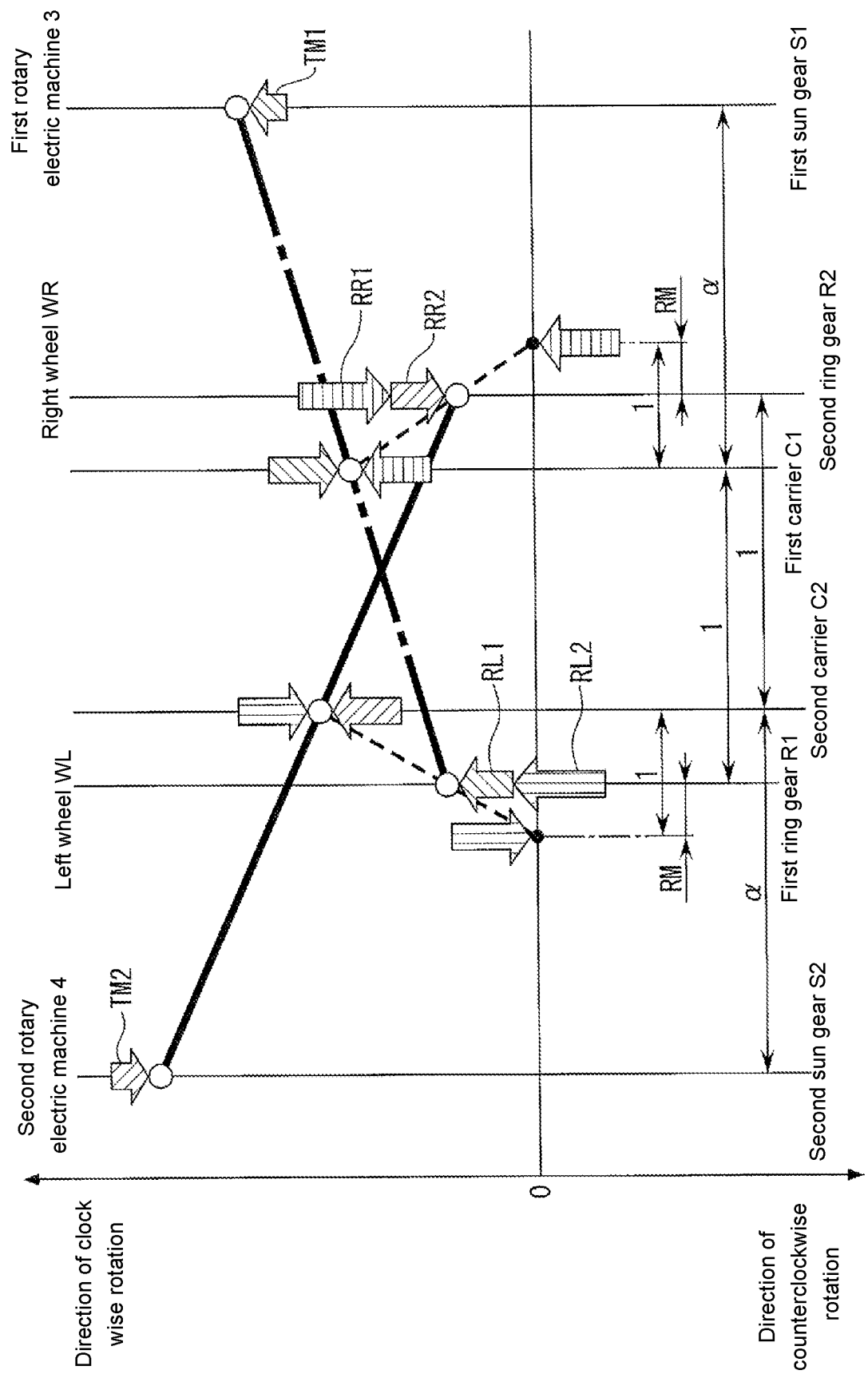
FIG. 10 is a collinear diagram showing a relationship of rotation speeds among various rotation elements of the power apparatus in FIG. 1 and a balancing relationship of torques with regard to a third torque distribution control used for decreasing right-yaw moment.

In the third torque distribution control for decreasing the right-yaw moment, power running is performed in the first rotary electric machine 3, and regeneration is performed in the second rotary electric machine 4. FIG. 10 shows the relationship of rotation speeds among various rotation elements and the balancing relationship of torques in this situation. In this situation, as seen from the comparison of FIG. 9 and FIG. 10, the left wheel transferred torque and the right wheel transferred torque TWL and TWR are represented by the following formulas (29) and (30) respectively.

$$TWL = -|RL1| - |RL2| \quad (29)$$
$$= -\alpha \times TM1 - (1+\alpha)|TM2|/RM$$

$$TWR = |RR2| + |RR1| \quad (30)$$
$$= \alpha \times |TM2| + (1+\alpha)TM1/RM$$

As seen from the formulas (29) and (30), the braking torque acts on the left wheel WL, and the driving torque acts on the right wheel WR, as a result, the right-yaw moment of the vehicle decreases.

Besides, in the fourth torque distribution control for decreasing the right-yaw moment, zero torque control is performed on the first rotary electric machine 3, and regeneration is performed in the second rotary electric machine 4. In this situation, only the second motor output torque TM2 serving as the braking torque is generated, so that as seen from the formulas (25) and (26), the left wheel transferred torque TWL is −(1+α)|TM2|/RM, and the right wheel transferred torque TWR is α×|TM2|. In this way, the braking torque acts on the left wheel WL, and the driving torque acts on the right wheel WR, as a result, the right-yaw moment of the vehicle is decreased.

In addition, in order to decrease the right-yaw moment, power running may be performed in the first rotary electric machine 3, and zero torque control may be performed on the second rotary electric machine 4. In this situation, only the first motor output torque TM1 is generated, so that as seen from the formulas (21) and (22), the left wheel transferred torque TWL is −α×TM1, and the right wheel transferred torque TWR is (1+α)TM1/RM. In this way, the braking torque acts on the left wheel WL, and the driving torque acts on the right wheel WR, as a result, the right-yaw moment of the vehicle is decreased.

Besides, the corresponding relationship of various elements in the second embodiment to various elements in the disclosure is similar to the first embodiment, except that the eighth gear 6d, the first output gear 7, the fourth gear 5d, the second output gear 8, and the left driving axis and the right driving axis SL and SR in the second embodiment correspond to the transferring mechanism of the disclosure.

As mentioned above, according to the second embodiment, as described with reference to FIG. 8 and so on, the rotation power of the first rotary electric machine and the second rotary electric machine 3 and 4 can be transferred to the left wheel and the right wheel WL and WR via the first planet gear unit and the second planet gear unit PS1 and PS2 to drive the WL and WR. Besides, the torques of the left wheel and the right wheel WL and WR can be controlled in a way that the torques have the same magnitude or in a way that the torques have different magnitudes (a torque difference is generated).

Figure 39:
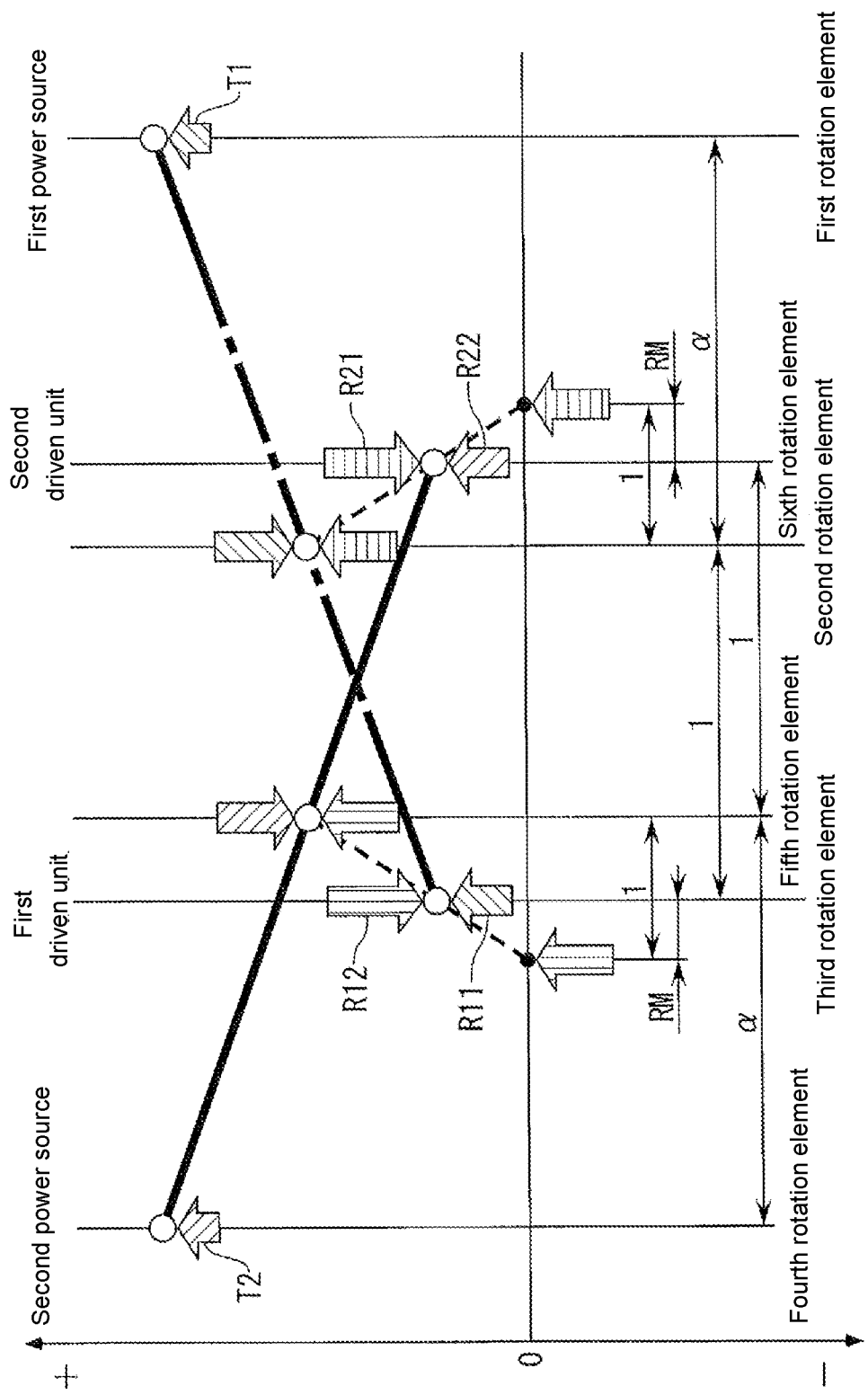
FIG. 39 is a collinear diagram showing a relationship of rotation speeds among various rotation elements of the power apparatus according to the invention of claim 1 and a balancing relationship of torques, with regard to a situation in which the third rotation element and the sixth rotation element are connected with the first driven unit and the second driven unit respectively.

Besides, as seen from the comparison of FIG. 8 and FIG. 39 used in the description of the invention of claim 1, compared with conventional power apparatus (FIG. 40), in the power apparatus 1A, even if the rotation speed of the left wheel WL is smaller than the rotation speed of the right wheel WR for the amount of RM, the rotation speed of the first rotary electric machine 3 is not lower than 0, besides, even if the rotation speed of the right wheel WR is smaller than the rotation speed of the left wheel WL, the rotation speed of the second rotary electric machine 4 is not lower than 0. Therefore, a rotating direction inversion of either the first rotary electric machine or the second rotary electric machine 3 and 4 caused by the differential rotation of the left wheel and the right wheel WL and WR can be prevented, by which the 3 and 4 can be easily controlled.

Besides, as seen from FIG. 8, the reactive torque RR1 of the right wheel WR caused by the first motor output torque TM1 and the reactive torque RL2 of the left wheel WL caused by the second motor output torque TM2 act respectively in directions opposite to the driving directions of the right wheel WR and the left wheel WL. The first carrier C1 and the second ring gear R2 are connected by the first connecting mechanism 5 in the above-mentioned way, and the first ring gear R1 and the second carrier C2 are connected by the second connecting mechanism 6, by which the reactive torques RR1 and RL2 can be increased compared with the situation of related art. Therefore, the torque transferred to the right wheel WR and the left wheel WL can be increased accordingly, so that the miniaturization of the first rotary electric machine and the second rotary electric machine 3 and 4 can be achieved.

Furthermore, as seen from collinear diagrams such as FIG. 8 which show the relationship of rotation speeds among various rotation elements, the rotation speeds of the first rotary electric machine and the second rotary electric machine 3 and 4 can be respectively maintained greater than the rotation speed of the first ring gear and the second ring gear R1 and R2 connected with the left wheel and the right wheel WL and WR respectively, so that the efficiency of both 3 and 4 can be raised in this way. Besides, the effect of the first embodiment can also be achieved.

Figure 11:
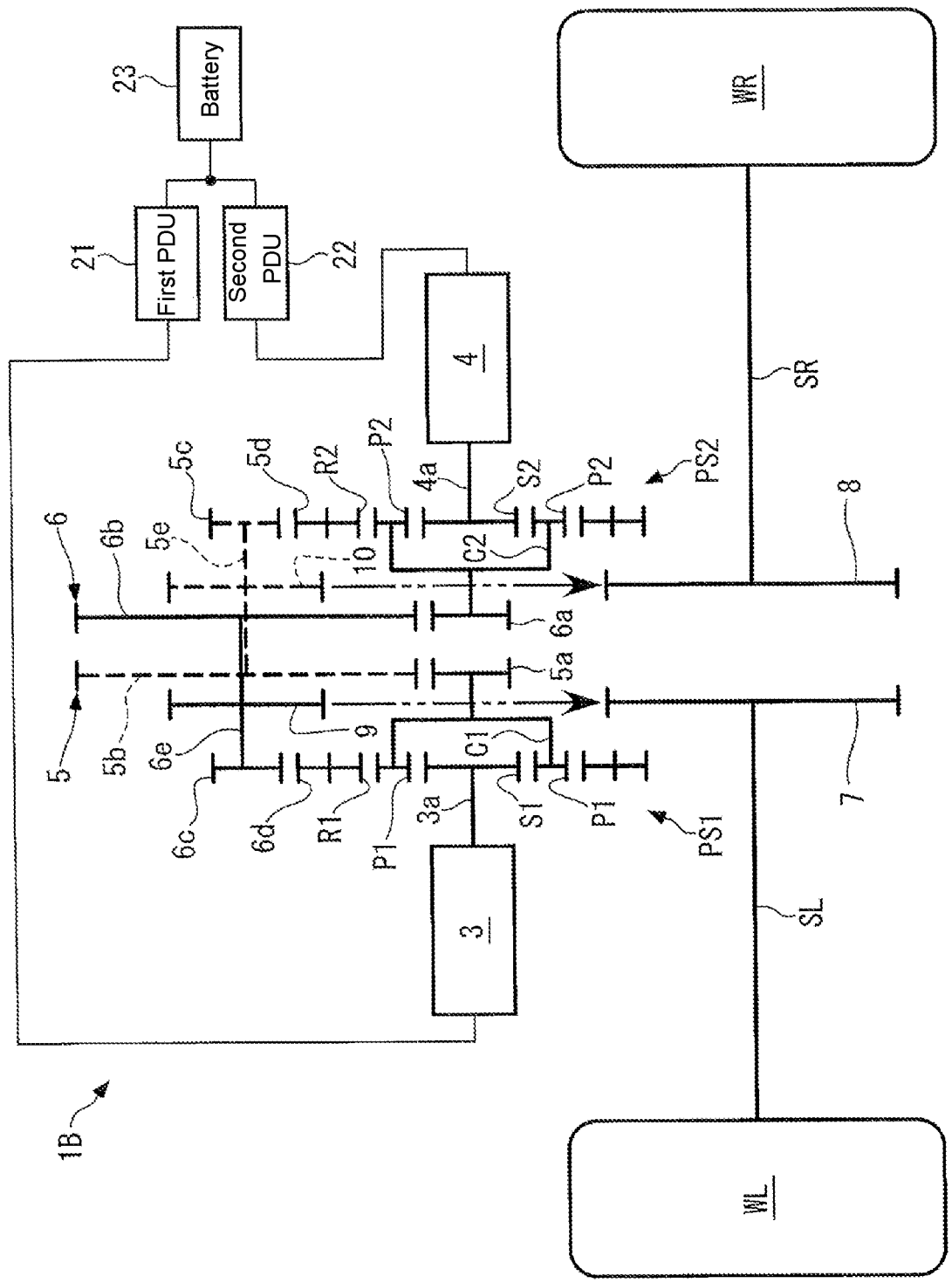
FIG. 11 is a skeleton diagram showing a power apparatus according to a third embodiment of the disclosure as well as the left wheel and the right wheel of a vehicle to which the power apparatus is applied.

Next, a power apparatus 1B according to the third embodiment of the disclosure is described with reference to FIG. 11. Compared with the first embodiment and the second embodiment, the major difference of the power apparatus 1B is that the power apparatus 1B comprises a first input gear 9 and a second input gear 10 connected with the first output gear and the second output gear 7 and 8 respectively. In FIG. 11, the same symbols are given to structural elements similar to the first embodiment and the second embodiment. In the following part, the description is centered on the aspect different from the first embodiment and the second embodiment.

The first input gear 9 is disposed integrally with the second rotation axis 6e of the second connecting mechanism 6, and is arranged between the sixth gear 6b and the seventh gear 6c of the second connecting mechanism 6. Besides, the first input gear 9 engages with a first idler gear (not shown), and the first idler gear engages with the first output gear 7. Different from the first embodiment and the second embodiment, the first output gear 7 engages with neither the first gear 5a nor the eighth gear 6d. According to the above, the first ring gear R1 is connected with the left wheel WL via the eighth gear 6d, the seventh gear 6c, the second rotation axis 6e, the first input gear 9, the first idler gear, the first output gear 7, and the left driving axis SL.

The teeth numbers of the eighth gear 6d, the seventh gear 6c, the first input gear 9, and the first output gear 7 are set in a way that the rotation power transferred to the eighth gear 6d which is integral with the first ring gear R1 is transferred to the first output gear 7 in a decelerating state. In addition, for the sake of convenience, a two-dot chain line with an arrow is used to show that the first input gear 9 is connected with the first output gear 7 in FIG. 11.

Furthermore, the second input gear 10 is disposed integrally with the first rotation axis 5e of the first connecting mechanism 5, and is arranged between the second gear 5b and the third gear 5c of the first connecting mechanism 5. Besides, the second input gear 10 engages with the second idler gear (not shown), and the second idler gear engages with the second output gear 8. Different from the first embodiment and the second embodiment, the second output gear 8 engages with neither the fifth gear 6a nor the fourth gear 5d. According to the above, the second ring gear R2 is connected with the right wheel WR via the fourth gear 5d, the third gear 5c, the first rotation axis 5e, the second input gear 10, the second idler gear, the second output gear 8, and the right driving axis SR.

The teeth number of the fourth gear 5d, the third gear 5c, the second input gear 10, and the second output gear 8 are set in a way that the rotation power transferred to the fourth gear 5d which is integral with the second ring gear R2 is transferred to the second output gear 8 in a decelerating state, and the decelerate ratio is set to the same value of the deceleration ratio determined by the eighth gear 6d, the seventh gear 6*c*, the first input gear 9, and the first output gear 7. Moreover, in FIG. 11, in order to show that the second input gear 10 is disposed integrally with the first rotation axis 5*e*, the second input gear 10 is represented by a dashed line, besides, for the sake of convenience, a two-dot chain line with an arrow is used to show that the second input gear 10 is connected with the second output gear 8.

In addition, the eighth gear and the seventh gear 6*d* and 6*c*, the first input gear 9, the first output gear 7, as well as the fourth gear and the third gear 5*d* and 5*c*, the second input gear 10, and the second output gear 8 may be formed in a way that the rotation power transferred to the first ring gear and the second ring gear R1 and R2 is transferred to the left wheel and the right wheel WL and WR respectively in an accelerating state.

As seen from the connecting relationship among the various rotation elements, without regard for the speed variation and shift of rotating direction caused by the eighth gear 6*d*, the seventh gear 6*c*, the first input gear 9, the first idler gear, and the first output gear 7, the rotation speed of the first ring gear R1 is equal to the rotation speed of the left wheel WL. Besides, without regard for the speed variation and shift of rotating direction caused by the fourth gear 5*d*, the third gear 5*c*, the second input gear 10, the second idler gear, and the second output gear 8, the rotation speed of the second ring gear R2 is equal to the rotation speed of the right wheel WR. The relationship of rotation speeds among other rotation elements is similar to the second embodiment. According to the above, the relationship of rotation speeds among various rotation elements in the power apparatus 1B is similar to the situation of the second embodiment, and is as shown in FIG. 8, FIG. 9, or FIG. 10 for example.

Besides, similar to the situation of the second embodiment, the first rotary electric machine and the second rotary electric machine 3 and 4 are controlled by the ECU 2 (see FIG. 3), by which various operations of the power apparatus 1B are performed. As mentioned above, according to the third embodiment, the effect of the second embodiment can also be achieved.

Furthermore, the corresponding relationship of various elements in the third embodiment to various elements in the disclosure is similar to the first embodiment, except that the first input gear 9, the first output gear 7, the second input gear 10, the second output gear 8, and the left driving axis and the right driving axis SL and SR in the third embodiment correspond to the transferring mechanism in the disclosure.

In addition, in the third embodiment, the first input gear and the second input gear 9 and 10 are disposed integrally with the second rotation axis and the first rotation axis 6*e* and 5*e* respectively, and the first ring gear and the second ring gear R1 and R2 are connected with the left wheel and the right wheel WL and WR respectively; however, the situation may also be that the first input gear and the second input gear 9 and 10 are disposed integrally with the first rotation axis and the second rotation axis 5*e* and 6*e* respectively, and the first carrier and the second carrier C1 and C2 are connected with the left wheel and the right wheel WL and WR respectively.

Figure 12:
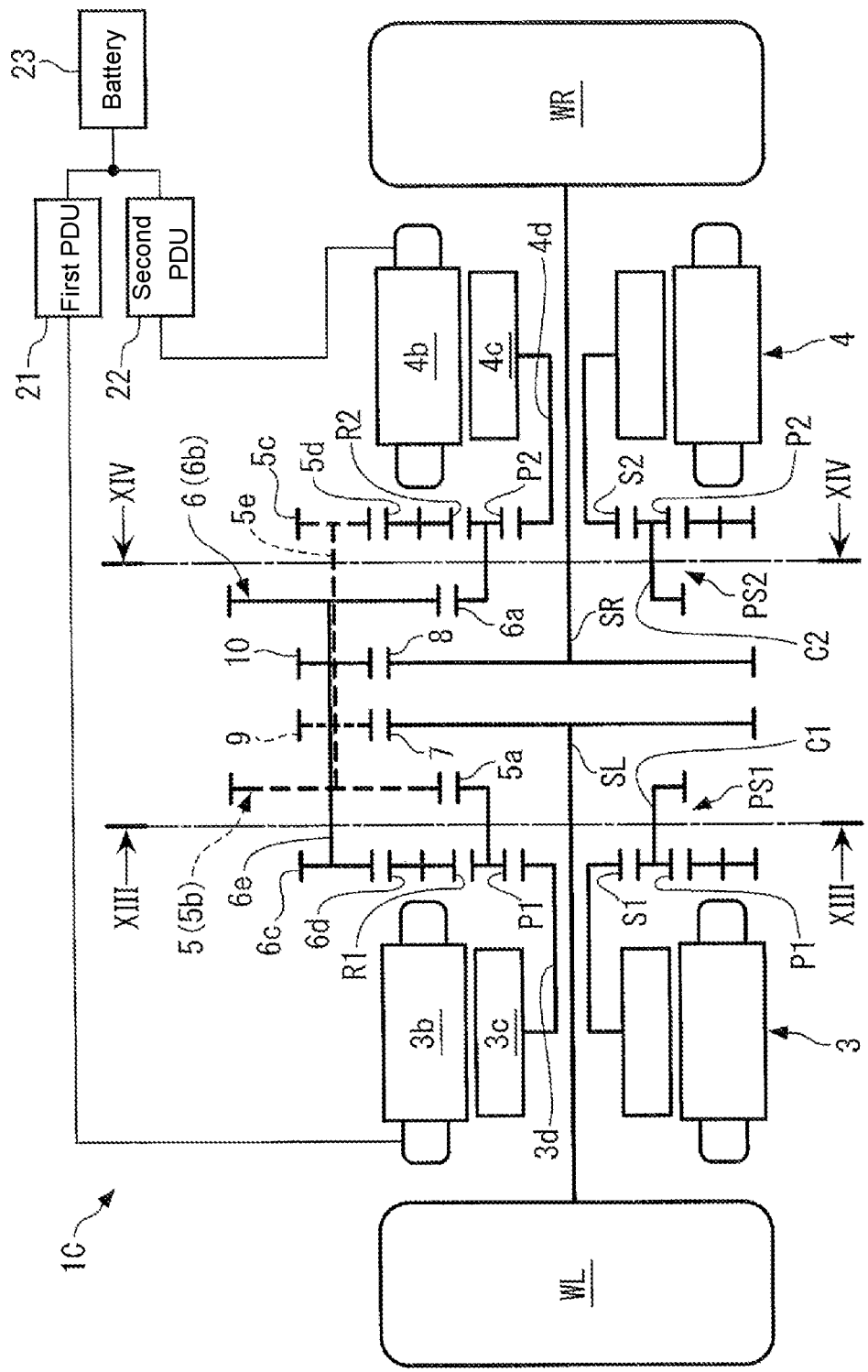
FIG. 12 is a skeleton diagram showing a power apparatus according to a fourth embodiment of the disclosure as well as the left wheel and the right wheel of a vehicle to which the power apparatus is applied.
Figure 13:
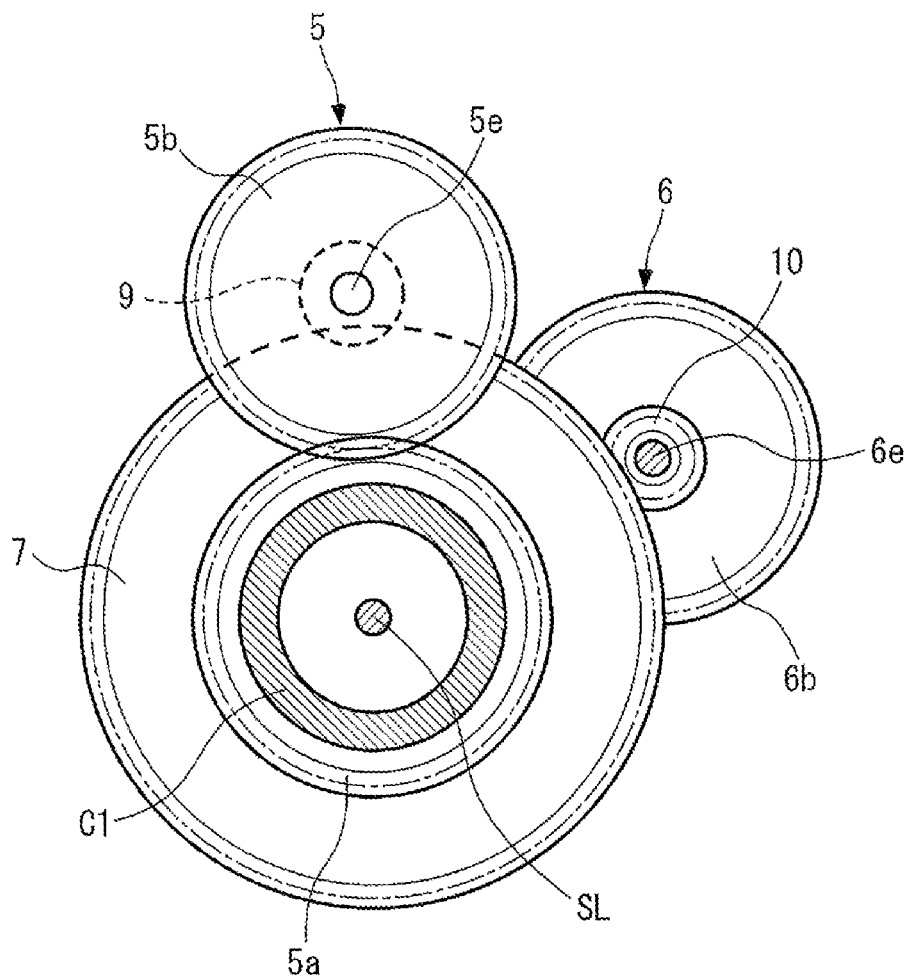
FIG. 13 is a sectional view along a XIII-XIII line in FIG. 12.
Figure 14:
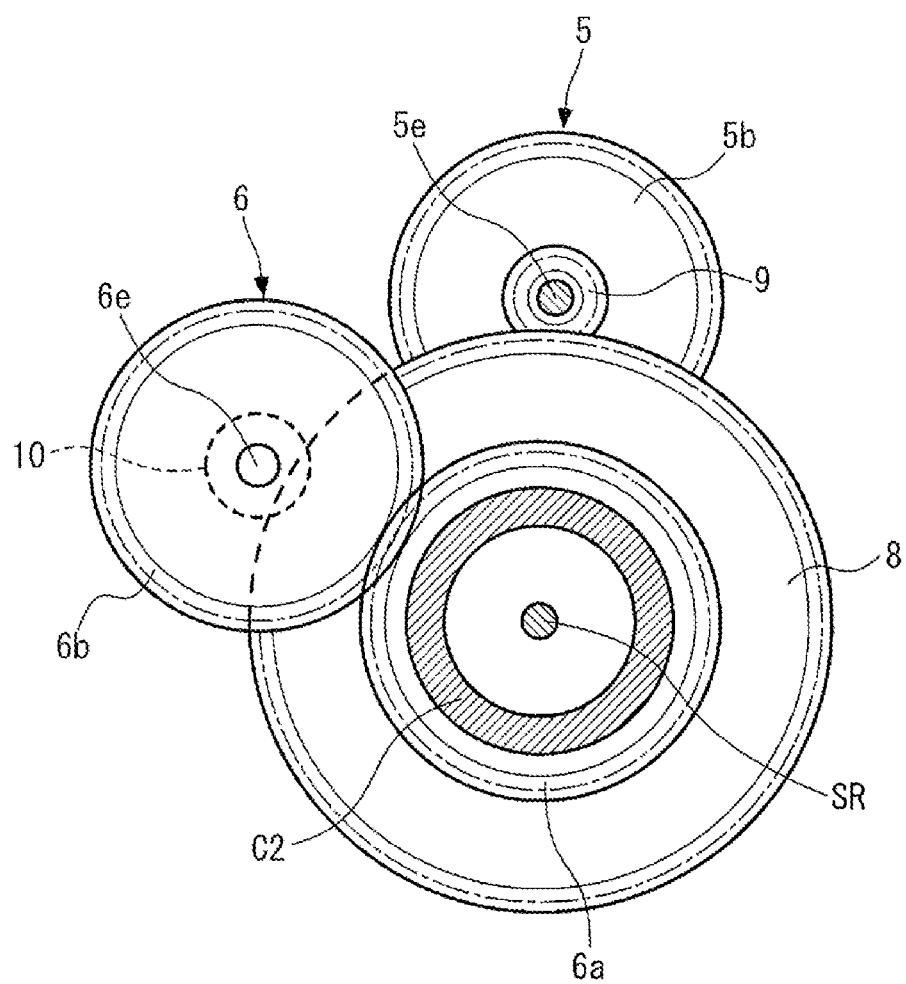
FIG. 14 is a sectional view along a XIV-XIV line in FIG. 12.

Next, a power apparatus 1C according to the fourth embodiment of the disclosure is described with reference to FIG. 12 to FIG. 14. Compared with the first embodiment and the third embodiment, the major difference of the power apparatus 1C is the structure of the first output axis 3*d* of the first rotary electric machine 3 and the second output axis 4*d* of the second rotary electric machine 4, and the fact that the first input gear and the second input gear 9 and 10 are disposed on the first connecting mechanism and the second connecting mechanism 5 and 6 respectively. In FIG. 12 to FIG. 14, the same symbols are given to structural elements similar to the first embodiment and the third embodiment. In the following part, the description is centered on the aspect different from the first embodiment and the third embodiment.

As shown in FIG. 12, the first rotary electric machine and the second rotary electric machine 3 and 4 as well as the first planet gear unit and the second planet gear unit PS1 and PS2 are different from the first embodiment and the third embodiment, and are disposed coaxially with the left driving axis and the right driving axis SL and SR. Besides, the first rotary electric machine and the second rotary electric machine 3 and 4 are hollow-shaped, and the first stator 3*b* of the first rotary electric machine 3 and the second stator 4*b* of the second rotary electric machine 4 are, as described in the first embodiment, connected with the first PDU and the second PDU 21 and 22 respectively.

Besides, the hollow-shaped first output axis and second output axis 3*d* and 4*d* are disposed integrally with the first rotor 3*c* of the first rotary electric machine 3 and the second rotor 4*c* of the second rotary electric machine 4. The hollow-shaped first sun gear and second sun gear S1 and S2 are disposed integrally with the first output axis and the second output axis 3*d* and 4*d* respectively, the left driving axis SL is relatively rotatably disposed in the inner side of the first output axis 3*d* and the first rotary electric machine 3, and the right driving axis SR is relatively rotatably disposed in the inner side of the second output axis 4*d* and the second rotary electric machine 4.

Besides, as shown in FIG. 12 to FIG. 14, the first carrier C1 of the first planet gear unit PS1 and the second carrier C2 of the second planet gear unit PS2 are formed by the combination of a plurality of spindles supporting the first pinion gear and the second pinion gear P1 and P2 respectively and the hollow-shaped rotation axis, C1 extends toward the second planet gear unit PS2, and C2 extends toward the first planet gear unit PS1. Besides, the first gear 5*a* of the first connecting mechanism 5 and the fifth gear 6*a* of the second connecting mechanism 6 which are hollow-shaped are disposed integrally with the first carrier and the second carrier C1 and C2, and on the inner side of C1 and C2, the left driving axis and the right driving axis SL and SR are relatively rotatably disposed.

Besides, contrary to the situation of the third embodiment, the first input gear and the second input gear 9 and 10 are disposed integrally with the first rotation axis 5*e* of the first connecting mechanism 5 and the second rotation axis 6*e* of the second connecting mechanism 6 respectively, and directly engages with the first output gear and the second output gear 7 and 8 respectively. That is, the first input gear 9 is disposed coaxially with the second gear and the third gear 5*b* and 5*c* of the first connecting mechanism 5, besides, the second input gear 10 is disposed coaxially with the sixth gear and the seventh gear 6*b* and 6*c* of the second connecting mechanism 6. Moreover, the first input gear 9 is disposed between the second gear 5*b* and the third gear 5*c*, the second input gear 10 is disposed between the sixth gear 6*b* and the seventh gear 6*c*, and the first output gear and the second output gear 7 and 8 are disposed between the first gear 5*a* and the fifth gear 6*a*. In addition, in FIG. 12, the first input gear 9 is represented by a dashed line to show that the first input gear 9 is disposed integrally with the first rotation axis 5*e*.

According to the above structure, the first carrier C1 is connected with the left wheel WL via the first gear 5*a*, the second gear 5*b*, the first rotation axis 5*e*, the first input gear 9, the first output gear 7, and the left driving axis SL. The teeth numbers of the first gear 5a, the second gear 5b, the first input gear 9, and the first output gear 7 are set in a way that the rotation power transferred to the first gear 5a which is integral with the first carrier C1 is transferred to the first output gear 7 in a decelerating state.

Besides, the second carrier C2 is connected with the right wheel WR via the fifth gear 6a, the sixth gear 6b, the second rotation axis 6e, the second input gear 10, the second output gear 8, and the right driving axis SR. The teeth numbers of the fifth gear 6a, the sixth gear 6b, the second input gear 10, and the second output gear 8 are set in a way that the rotation power transferred to the fifth gear 6a which is integral with the second carrier C2 is transferred to the second output gear 8 in decelerating state, and the deceleration ratio is set to the same value as the deceleration ratio determined by the first gear 5a, the second gear 5b, the first input gear 9, and the first output gear 7.

In addition, the first gear and the second gear 5a and 5b, the first input gear 9 and the first output gear 7 may be formed in a way that the rotation power transferred to the first carrier C1 is transferred to the left wheel WL in an accelerating state, and the fifth gear and the sixth gear 6a and 6b, the second input gear 10 and the second output gear 8 may be formed in a way that the rotation power transferred to the second carrier C2 is transferred to the right wheel WR in an accelerating state.

As seen from the connecting relationship among the various rotation elements, with regard for the speed variation caused by the first gear 5a, the second gear 5b, the first input gear 9, and the first output gear 7, the rotation speed of the first carrier C1 is equal to the rotation speed of the left wheel WL. Besides, without regard for the speed variation caused by the fifth gear 6a, the sixth gear 6b, the second input gear 10, and the second output gear 8, the rotation speed of the second carrier C2 is equal to the rotation speed of the right wheel WR. The relationship of rotation speeds among other rotation elements is similar to the first embodiment. According to the above, the relationship of rotation speeds among various rotation elements in the power apparatus 1C is similar to the situation of the first embodiment, and is shown in FIG. 4, FIG. 5, or FIG. 6 for example.

Besides, similar to the situation of the first embodiment, the first rotary electric machine and the second rotary electric machine 3 and 4 are controlled by the ECU 2 (see FIG. 3), by which various operations of the power apparatus 1C are performed.

Besides, the corresponding relationship of various elements in the fourth embodiment to various elements in the disclosure is similar to the first embodiment, except that the first input gear 9, the first output gear 7, the second input gear 10, the second output gear 8, and the left driving axis and the right driving axis SL and SR in the fourth embodiment correspond to the transferring mechanism in the disclosure, and that the left driving axis and the right driving axis SL and SR correspond to the first driving axis and the second driving axis in the disclosure respectively.

As mentioned above, according to the fourth embodiment, the first rotary electric machine and the second rotary electric machine 3 and 4, the left driving axis and the right driving axis SL and SR, as well as the first planet gear unit and the second planet gear unit PS1 and PS2 are disposed coaxially with each other, and on the inner side of the hollow-shaped first rotary electric machine and second rotary electric machine 3 and 4, the left driving axis and the right driving axis SL and SR are relatively rotatably disposed, so that the whole power apparatus 1C can be miniaturized in the radial direction. Besides, the first input gear 9 is disposed coaxially with the second gear and the third gear 5b and 5c of the first connecting mechanism 5, and the second input gear 10 is disposed coaxially with the sixth gear and the seventh gear 6b and 6c of the second connecting mechanism 6, so that the whole power apparatus 1C can be further miniaturized in the radial direction. Besides, the effect of the first embodiment can also be achieved.

In addition, in the fourth embodiment, the first carrier C1 is connected with the left driving axis SL via the first input gear 9 or the first output gear 7, and the second carrier C2 is connected with the right driving axis SR via the second input gear 10 or the second output gear 8; however, the first input gear and the second input gear 9 and 10 as well as the first output gear and the second output gear 7 and 8 may also be removed, and the first carrier and the second carrier C1 and C2 may be disposed integrally with the left driving axis and the right driving axis SL and SR respectively.

Figure 15:
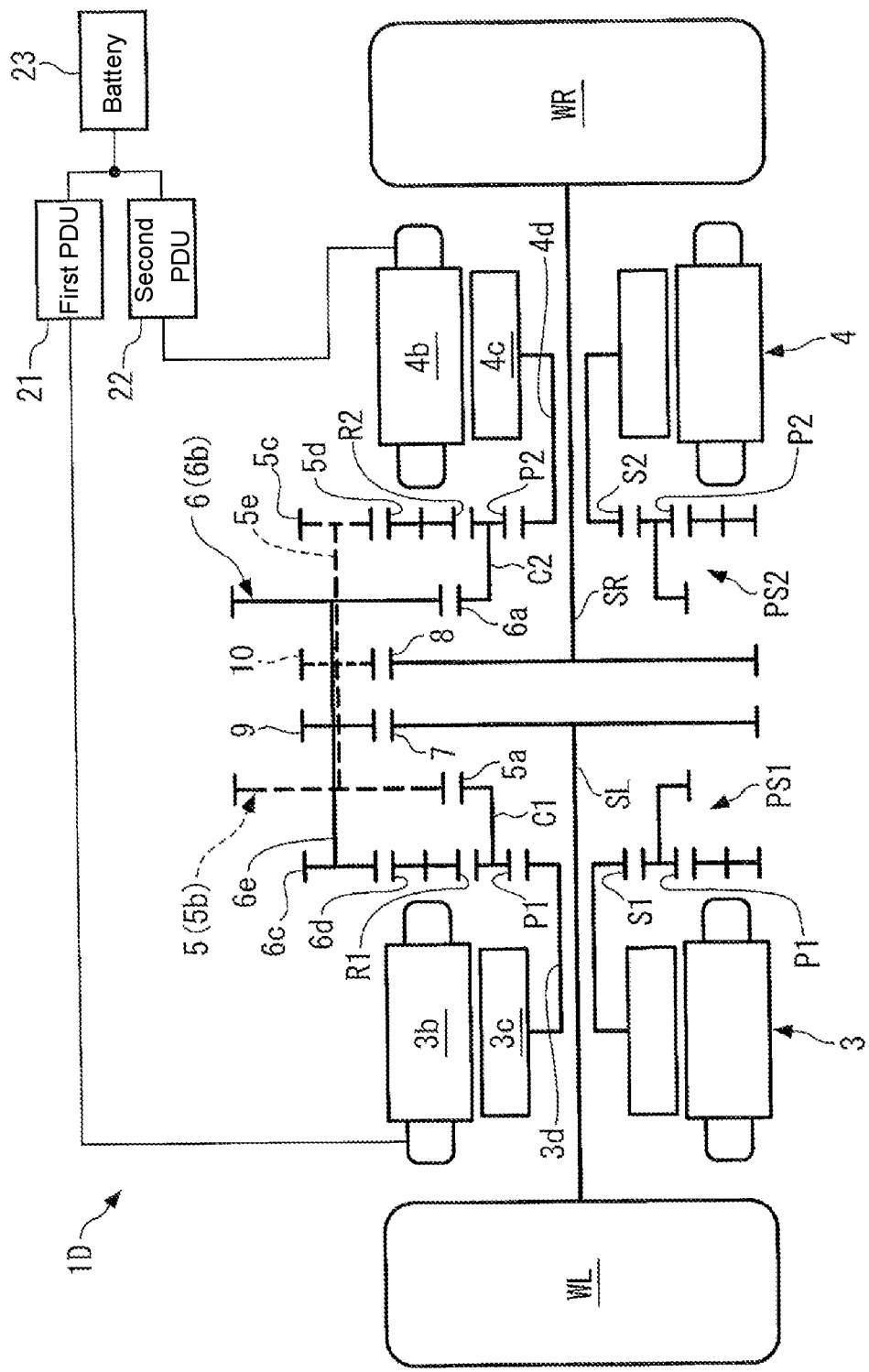
FIG. 15 is a skeleton diagram showing a power apparatus according to a fifth embodiment of the disclosure as well as the left wheel and the right wheel of a vehicle to which the power apparatus is applied.

Next, a power apparatus 1D according to the fifth embodiment of the disclosure is described with reference to FIG. 15. Compared with the fourth embodiment, the only difference of the power apparatus 1D is that the first input gear and the second input gear 9 and 10 are disposed integrally with the second rotation axis 6e of the second connecting mechanism 6 and the first rotation axis 5e of the first connecting mechanism 5 respectively. That is, the first input gear 9 is disposed coaxially with the sixth gear and the seventh gear 6b and 6c of the second connecting mechanism 6, and the second input gear 10 is disposed coaxially with the second gear and the third gear 5b and 5c of the first connecting mechanism 5.

Besides, the first input gear 9 is disposed between the second gear 5b and the third gear 5c, and the second input gear 10 is disposed between the sixth gear 6b and the seventh gear 6c. In FIG. 15, the second input gear 10 is represented by a dashed line in order to show that the second input gear 10 is disposed integrally with the first rotation axis 5e.

According to the above, the first ring gear R1 is connected with the left wheel WL via the eighth gear 6d, the seventh gear 6c, the second rotation axis 6e, the first input gear 9, the first output gear 7, and the left driving axis SL. The teeth numbers of the eighth gear 6d, the seventh gear 6c, the first input gear 9, and the first output gear 7 are set in a way that the rotation power transferred to the eighth gear 6d which is integral with the first ring gear R1 is transferred to the first output gear 7 in a decelerating state.

Besides, the second ring gear R2 is connected with the right wheel WR via the fourth gear 5d, the third gear 5c, the first rotation axis 5e, the second input gear 10, the second output gear 8, and the right driving axis SR. The teeth numbers of the fourth gear 5d, the third gear 5c, the second input gear 10, and the second output gear 8 is set in a way that the rotation power transferred to the fourth gear 5d which is integral with the second ring gear R2 is transferred to the second output gear 8 in a decelerating state, the deceleration ratio is set to the same value as the deceleration ratio determined by the eighth gear 6d, the seventh gear 6c, the first input gear 9, and the first output gear 7.

In addition, the eighth and the seventh gear 6d and 6c, the first input gear 9 as well as the first output gear 7 may also be formed in a way that the rotation power transferred to the first ring gear R1 is transferred to the left wheel WL in an accelerating state, and the fourth and the third gear 5d and 5c, the second input gear 10 as well as the second output gear 8 may also be formed in a way that the rotation power transferred to the second ring gear R2 is transferred to the right wheel WR in an accelerating state.

As seen from the connecting relationship among the various rotation elements, without regard for the speed variation caused by the eighth gear 6d, the seventh gear 6c, the first input gear 9, and the first output gear 7, the rotation speed of the first ring gear R1 is equal to the rotation speed of the left wheel WL. Besides, without regard for the speed variation caused by the fourth gear 5d, the third gear 5c, the second input gear 10, and the second output gear 8, the rotation speed of the second ring gear R2 is equal to the rotation speed of the right wheel WR. The relationship of rotation speeds among other rotation elements is similar to the second embodiment. According to the above, the relationship of rotation speeds among various rotation elements in the power apparatus 1D is similar to the situation of the second embodiment, and is as shown in FIG. 8, FIG. 9, or FIG. 10 for example.

Besides, similar to the situation of the second embodiment, the first rotary electric machine and the second rotary electric machine 3 and 4 are controlled by the ECU 2 (see FIG. 3), by which various operations of the power apparatus 1D are performed.

As mentioned above, according to the fifth embodiment, the first rotary electric machine and the second rotary electric machine 3 and 4, the left driving axis and the right driving axis SL and SR, as well as the first planet gear unit and the second planet gear unit PS1 and PS2 are formed in a way similar to the fourth embodiment, so that the whole power apparatus 1D can be miniaturized in the radial direction. Besides, the first input gear 9 is disposed coaxially with the sixth gear and the seventh gear 6b and 6c of the second connecting mechanism 6, and the second input gear 10 is disposed coaxially with the second gear and the third gear 5b and 5c of the first connecting mechanism 5, so that the whole power apparatus 1D can be further miniaturized in the radial direction. Besides, the effect of the second embodiment can also be achieved.

In addition, in the fifth embodiment, the first ring gear R1 is connected with the left driving axis SL via the first input gear 9 or the first output gear 7, and the second ring gear R2 is connected with the right driving axis SR via the second input gear 10 or the second output gear 8; however, the first input gear and the second input gear 9 and 10 as well as the first output gear and the second output gear 7 and 8 may be removed, and the first ring gear and the second ring gear R1 and R2 may be connected with the left driving axis and the right driving axis SL and SR respectively to rotate integrally.

In this situation, the first gear and the fifth gear 5a and 6a are disposed respectively between the first planet gear unit PS1 and the first rotary electric machine 3, and between the second planet gear unit PS2 and the second rotary electric machine 4; and the first ring gear and the second ring gear R1 and R2 are connected with the left driving axis and the right driving axis SL and SR respectively via a flange and the like disposed between the first planet gear unit PS1 and the second planet gear unit PS2.

Figure 16:
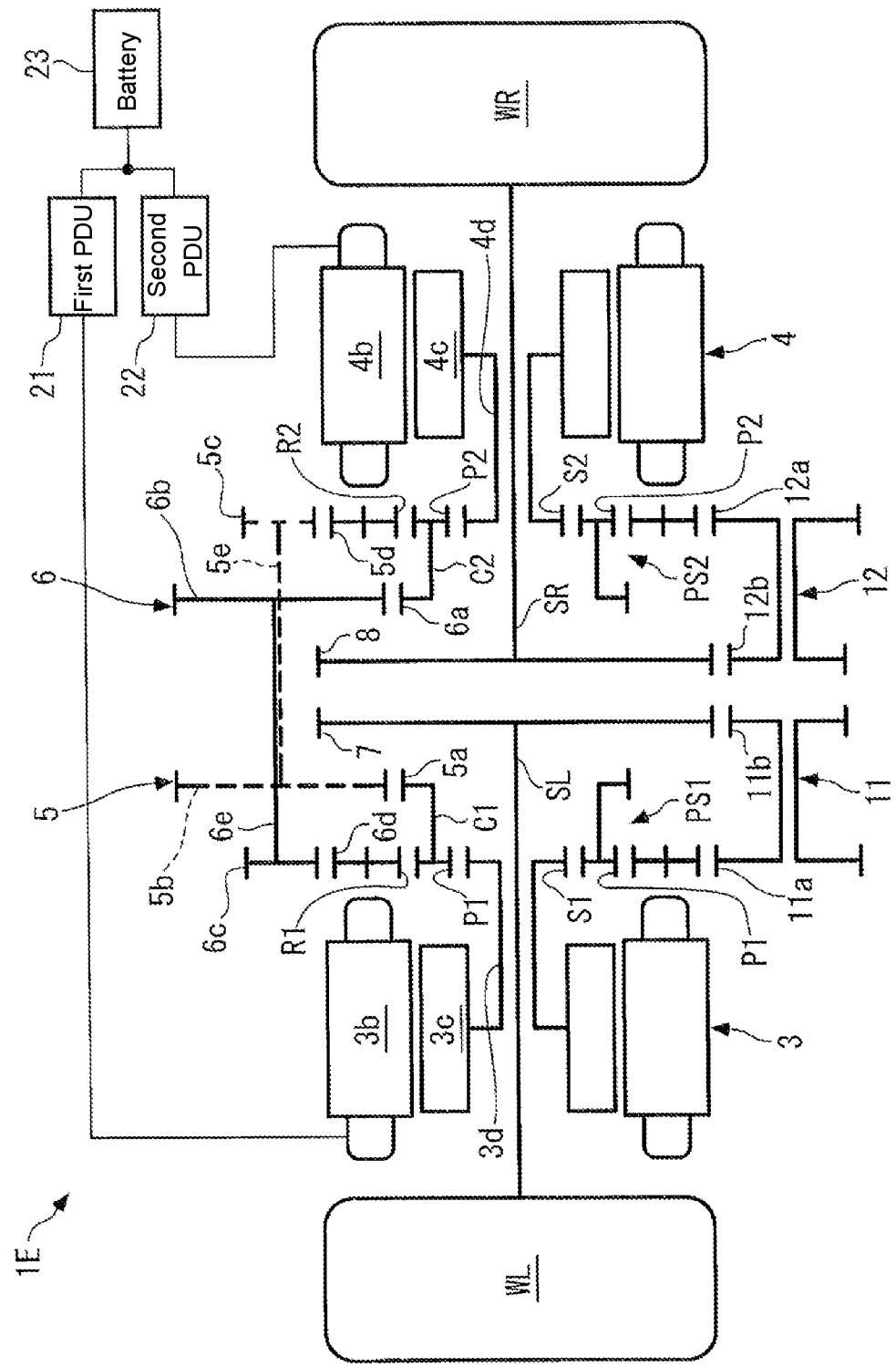
FIG. 16 is a skeleton diagram showing a power apparatus according to a sixth embodiment of the disclosure as well as the left wheel and the right wheel of a vehicle to which the power apparatus is applied.

Next, a power apparatus 1E according to the sixth embodiment of the disclosure is described with reference to FIG. 16. Compared with the fifth embodiment, the main difference of the power apparatus 1E is the structure of the first input gear and the second input gear 11 and 12. In FIG. 16, the same symbols are given to structural elements similar to the first embodiment and the fifth embodiment. In the following part, the description is centered on the aspect different from the fifth embodiment.

The first input gear 11 has a gear 11a engaging with the eighth gear 6d of the second connecting mechanism 6 and a gear 11b engaging with the first output gear 7, the two of which are integral, and the first input gear 11 is rotatably supported on the first spindles (none of which is shown) via a bearing. The first spindles extend in parallel with the axis lines of the first planet gear unit and the second planet gear unit PS1 and PS2, and extend in parallel with the left driving axis and the right driving axis SL and SR. Besides, the first input gear 11 is disposed on a position which is on the outer peripheral circle of the first planet gear unit and the second planet gear unit PS1 and PS2 and does not overlap with the first connecting mechanism and the second connecting mechanism 5 and 6 when seen from the axis line direction, and different to the fifth embodiment, the first input gear 11 is not disposed coaxially with the sixth gear and the seventh gear 6b and 6c of the second connecting mechanism 6.

According to the above, the first ring gear R1 is connected with the left wheel WL via the eighth gear 6d, the gear 11a and the gear 11b of the first input gear 11, the first output gear 7, and the left driving axis SL. The teeth numbers of the eighth gear 6d, the gear 11a, the gear 11b, and the first output gear 7 are set in a way that the rotation power transferred to the eighth gear 6d which is integral with the first ring gear R1 is transferred to the first output gear 7 in a decelerating state.

The second input gear 12 has a gear 12a engaging with the fourth gear 5d of the first connecting mechanism 5 and a gear 12b engaging with the second output gear 8, the two of which are integral, and the second input gear 12 is rotatably supported on the second spindles (none of which is shown) via a bearing. Similar to the first spindles, the second spindles extend in parallel with the axis line of the first planet gear unit and the second planet gear unit PS1 and PS2, and extend in parallel with the left driving axis and the right driving axis SL and SR. Besides, the second input gear 12 is disposed on a position which is on the outer peripheral circle of the first planet gear unit and the second planet gear unit PS1 and PS2 and does not overlap with the first connecting mechanism and the second connecting mechanism 5 and 6, and different to the fifth embodiment, the second input gear 12 is not disposed coaxially with the second gear and the third gear 5b and 5c of the first connecting mechanism 5.

According to the above, the second ring gear R2 is connected with the right wheel WR via the fourth gear 5d, the gear 12a and the gear 12b of the second input gear 2, the second output gear 8, and the right driving axis SR. The teeth numbers of the fourth gear 5d, the gear 12a, the gear 12b, and the second output gear 8 are set in a way that the rotation power transferred to the fourth gear 5d which is integral with the second ring gear R2 is transferred to the second output gear 8 in a decelerating state, and the deceleration ratio is set to the same value as the deceleration ratio determined by the eighth gear 6d, the gear 11a, the gear 11b, and the first output gear 7.

In addition, the eighth gear 6d, the first input gear 11 and the first output gear 7 may also be formed in a way that the rotation power transferred to the first ring gear R1 is transferred to the left wheel WL in an accelerating state, and the fourth gear 5d, the second input gear 12 and the second output gear 8 may also be formed in a way that the rotation power transferred to the second ring gear R2 is transferred to the right wheel WR in an accelerating state.

As seen from the connecting relationship, without regard for the speed variation caused by the eighth gear 6d, the gear 11a, the gear 11b, and the first output gear 7, the rotation speed of the first ring gear R1 is equal to the rotation speed of the left wheel WL; besides, without regard for the speed variation caused by the fourth gear 5d, the gear 12a, the gear 12b, and the second output gear 8, the rotation speed of the second ring gear R2 is equal to the rotation speed of the right wheel WR. The relationship of rotation speeds among other rotation elements is similar to the fifth embodiment. According to the above, the relationship of rotation speeds among various rotation elements in the power apparatus 1E is similar to the situation of the second embodiment and the fifth embodiment, and is as shown in FIG. 8, FIG. 9, or FIG. 10 for example.

Besides, similar to the situation of the second embodiment, the first rotary electric machine and the second rotary electric machine 3 and 4 are controlled by the ECU 2 (see FIG. 3), by which various operations of the power apparatus 1E are performed.

In addition, the corresponding relationship of various elements in the sixth embodiment to various elements in the disclosure is similar to the first embodiment, except that the first input gear 11, the first output gear 7, the second input gear 12, the second output gear 8, and the left driving axis and the right driving axis SL and SR in the sixth embodiment correspond to the transferring mechanism in the disclosure.

According to the above, according to the sixth embodiment, the effect of the second embodiment can also be achieved.

In addition, as for the sixth embodiment, the first input gear and the second input gear 11 and 12 may also be rotatably supported on the first rotation axis and the second rotation axis 5e and 6e respectively. In this situation, in order to prevent the second gear and the sixth gear 5b and 6b from overlapping with the first input gear and the second input gear 11 and 12 respectively, the first gear and the fifth gear 5a and 6a, which engage with the second gear and the sixth gear 5b and 6b respectively, are disposed respectively between the first rotary electric machine 3 and the first planet gear unit PS1, and between the second rotary electric machine 4 and the second planet gear unit PS2.

Figure 17:
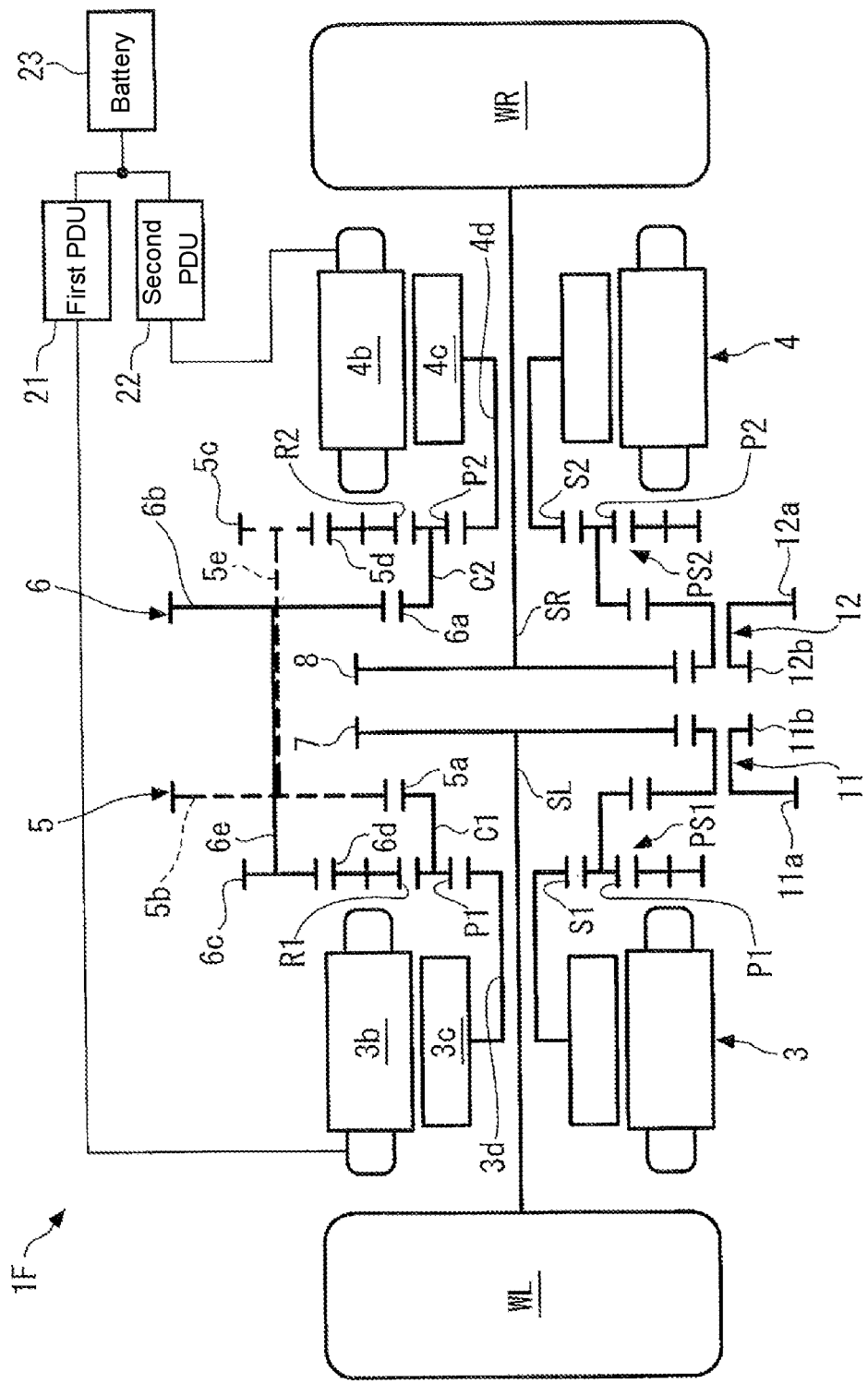
FIG. 17 is a skeleton diagram showing a power apparatus according to a seventh embodiment of the disclosure as well as the left wheel and the right wheel of a vehicle to which the power apparatus is applied.

Next, a power apparatus 1F according to the seventh embodiment of the disclosure is described with reference to FIG. 17. Compared with the sixth embodiment, the only difference of the power apparatus 1F is that the gear 11a of the first input gear 11 and the gear 12a of the second input gear 12 do not engage with the eighth gear 6d of the second connecting mechanism 6 and the fourth gear 5d of the first connecting mechanism 5, but engage with the first gear 5a of the first connecting mechanism 5 and the fifth gear 6a of the second connecting mechanism 6 respectively. In FIG. 17, the same symbols are given to structural elements similar to the first embodiment, the fourth embodiment and the sixth embodiment. In the following part, the description is centered on the aspect different from the sixth embodiment.

According to the structure of the first input gear 11 and so on, the first carrier C1 is connected with the left wheel WL via the first gear 5a, the gear 11a and the gear 11b of the first input gear 11, the first output gear 7, and the left driving axis SL. The teeth numbers of the first gear 5a, the gear 11a, the gear 11b, and the first output gear 7 are set in a way that the rotation power transferred to the first gear 5a which is integral with the first carrier C1 is transferred to the first output gear 7 in a decelerating state.

Besides, according to the structure of the second input gear 12 and so on, the second carrier C2 is connected with the right wheel WR via the fifth gear 6a, the gear 12a and the gear 12b of the second input gear 12, the second output gear 8, and the right driving axis SR. The teeth numbers of the fifth gear 6a, the gear 12a, the gear 12b, and the second output gear 8 are set in a way that the rotation power transferred to the fifth gear 6a which is integral with the second carrier C2 is transferred to the second output gear 8 in a decelerating state, and the deceleration ratio is set to the same value as the deceleration ratio determined by the first gear 5a, the gear 11a, the gear 11b, and the first output gear 7.

In addition, the first gear 5a, the first input gear 11 and the first output gear 7 may also be formed in a way that the rotation power transferred to the first carrier C1 is transferred to the left wheel WL in an accelerating state, and the fifth gear 6a, the second input gear 12 and the second output gear 8 may also be formed in a way that the rotation power transferred to the second carrier C2 is transferred to the right wheel WR in an accelerating state.

As seen from the connecting relationship, without regard for the speed variation caused by the first gear 5a, the gear 11a, the gear 11b, and the first output gear 7, the rotation speed of the first carrier C1 is equal to the rotation speed of the left wheel WL, and without regard for the speed variation caused by the fifth gear 6a, the gear 12a, the gear 12b, and the second output gear 8, the rotation speed of the second carrier C2 is equal to the rotation speed of the right wheel WR. The relationship of rotation speeds among other rotation elements is similar to the fourth embodiment and the sixth embodiment. According to the above, the relationship of rotation speeds among various rotation elements in the power apparatus 1F is similar to the situation of the first embodiment, and is as shown in FIG. 4, FIG. 5, or FIG. 6 for example.

Besides, similar to the situation of the first embodiment, the first rotary electric machine and the second rotary electric machine 3 and 4 are controlled by the ECU 2 (see FIG. 3), by which various operations of the power apparatus 1F are performed.

As mentioned above, according to the seventh embodiment, the effect of the first embodiment can also be achieved.

Figure 18:
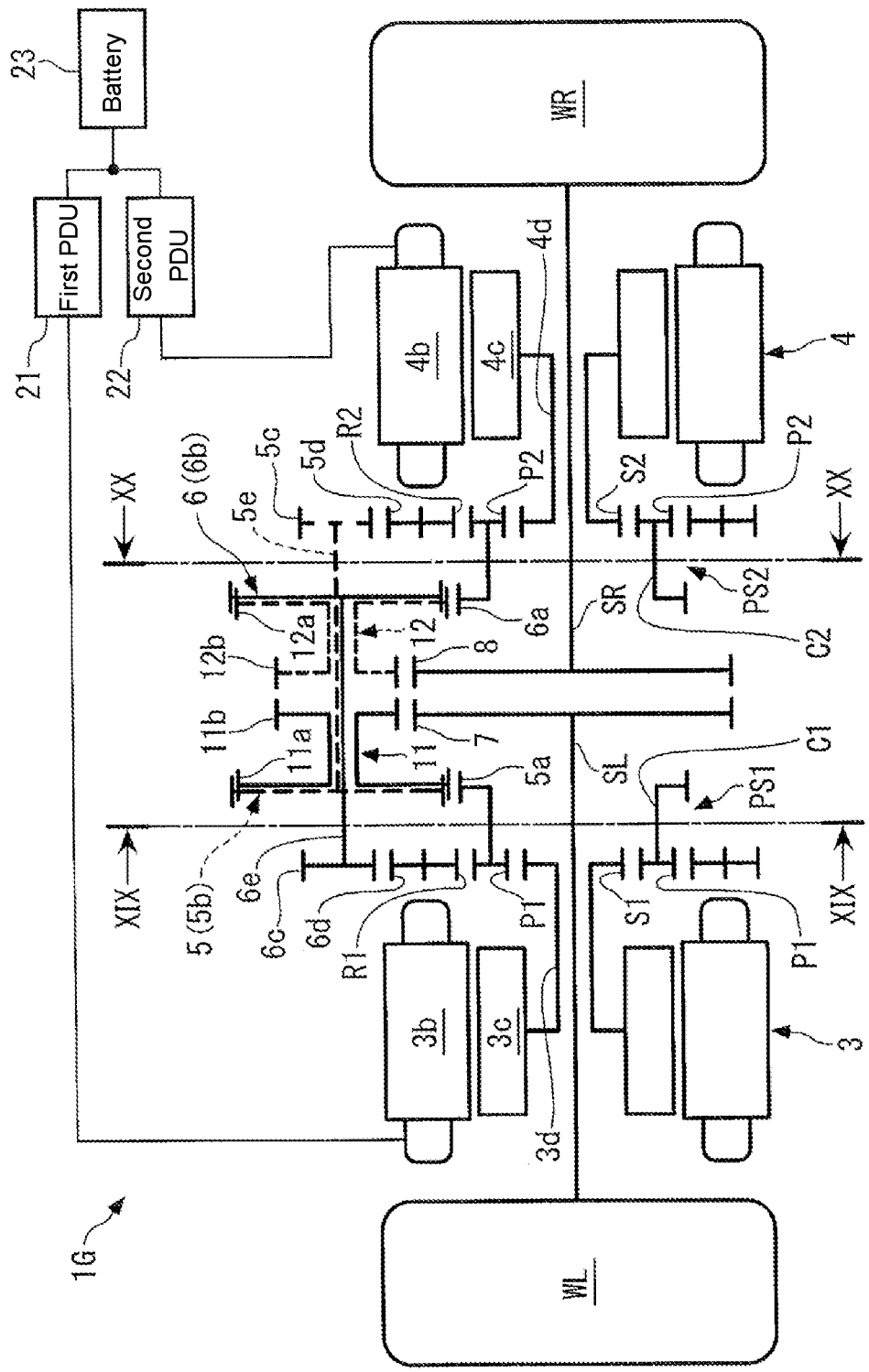
FIG. 18 is a skeleton diagram showing a power apparatus according to an eighth embodiment of the disclosure as well as the left wheel and the right wheel of a vehicle to which the power apparatus is applied.

Next, a power apparatus 1G according to the eighth embodiment of the disclosure is described with reference to FIG. 18 to FIG. 20. Compared with the seventh embodiment, the only difference of the power apparatus 1G is that the first input gear 11 is rotatably supported on the second rotation axis 6e of the second connecting mechanism 6 instead of on the first spindles, and the second input gear 12 is rotatably supported on the first rotation axis 5e of the first connecting mechanism 5 instead of on the second spindles.

That is, the first input gear 11 is disposed coaxially with the sixth gear and the seventh gear 6b and 6c of the second connecting mechanism 6, and the second input gear 12 is disposed coaxially with the second gear and the third gear 5b and 5c of the first connecting mechanism 5. Besides, the first input gear 11 is disposed between the sixth gear 6b and the seventh gear 6c, and the second input gear 12 is disposed between the second gear 5b and the third gear 5c. In addition, in FIG. 18, the second input gear 12 is represented by a dashed line to show that the second input gear 12 is rotatably supported on the first rotation axis 5e.

Figure 19:
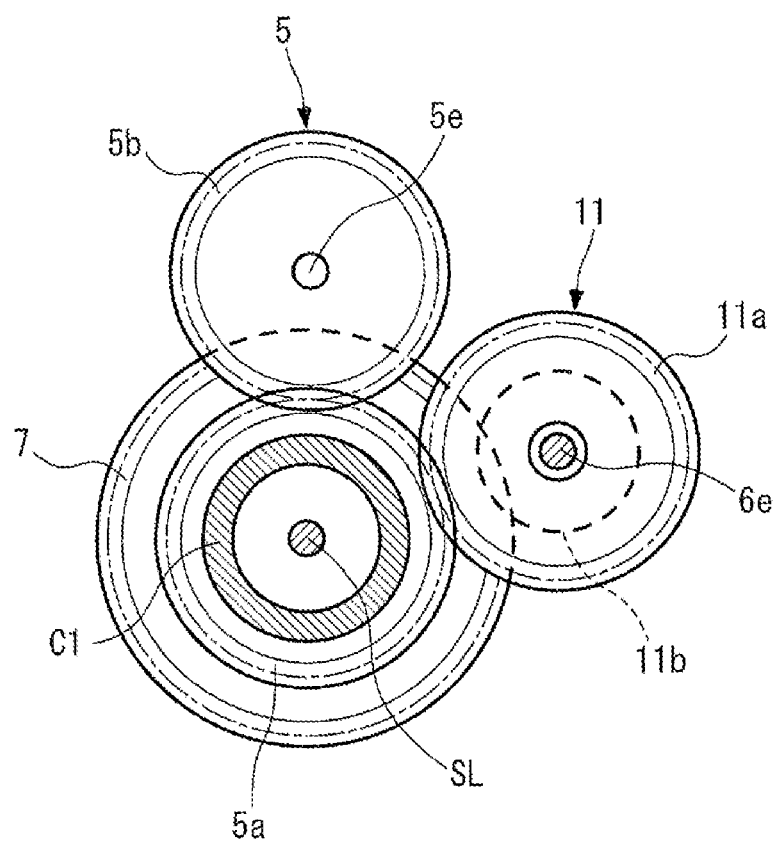
FIG. 19 is a sectional view along a XIX-XIX line in FIG. 18.

As shown in FIG. 19, the gear 11a of the first input gear 11 and the second gear 5b of the first connecting mechanism 5, which engage with the first gear 5a of the first connecting mechanism 5, are disposed on different positions on the outer peripheral circle of the first gear 5a, and do not overlap with each other when seen from the axis line direction. In addition, the second ring gear R2 or the second rotary electric machine 4 is omitted in FIG. 19 for the sake of convenience, and in FIG. 18, in order to show that the gear 11a and the second gear 5b are disposed in the way mentioned above, the gear 11a and the second gear 5b are drawn to be staggered a little from each other, and distances from the engaging sections of 11a and 5b to the first gear 5a are drawn to be different.

Figure 20:
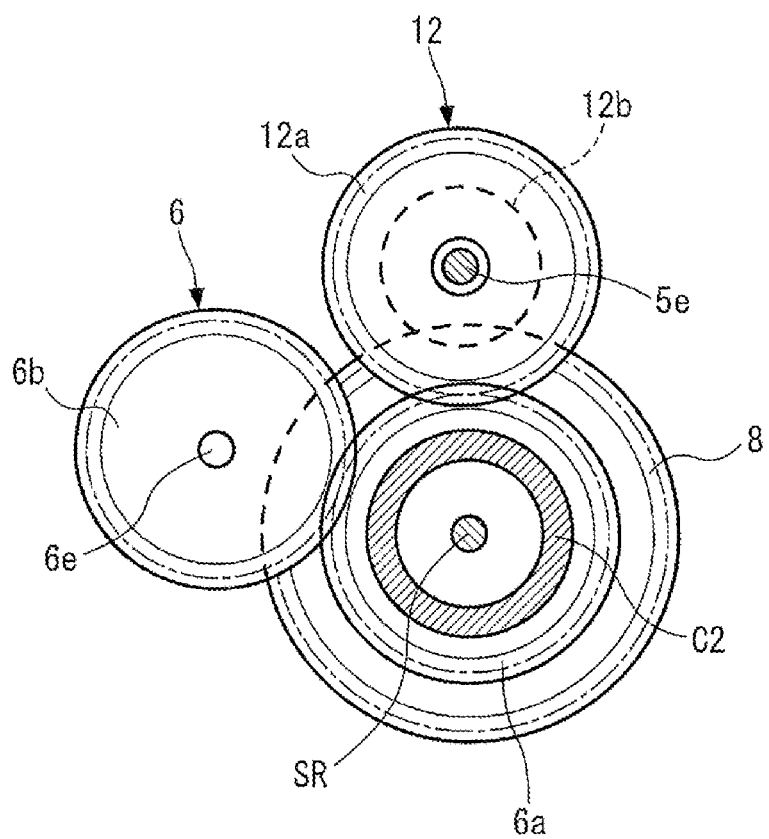
FIG. 20 is a sectional view along a XX-XX line in FIG. 18.

Besides, as shown in FIG. 20, the gear 12a of the second input gear 12 and the sixth gear 6b of the second connecting mechanism 6, which engage with the fifth gear 6a of the second connecting mechanism 6 engage, are disposed on different positions on the outer peripheral circle of the fifth gear 6a, and do not overlap with each other when seen from the axis line direction. In addition, the first ring gear R1 or the first rotary electric machine 3 is omitted in FIG. 20 for the sake of convenience, and in FIG. 18, in order to show that the gear 12a and the sixth gear 6b are disposed in the way mentioned above, the gear 12a and the sixth gear 6b are drawn to be staggered a little from each other, and distances from the engaging sections of 12a and 6b to the fifth gear 6a are drawn to be different.

In addition, the teeth numbers of the first gear 5a, the gear 11a, the gear 11b, and the first output gear 7, as well as the teeth numbers of the fifth gear 6a, the gear 12a, the gear 12b, and the second output gear 8 are set as described in the seventh embodiment.

As seen from the above structure, the relationship of rotation speeds among various rotation elements in the power apparatus 1G is similar to the seventh embodiment (similar to the first embodiment), and is as shown in FIG. 4, FIG. 5, or FIG. 6 for example. Besides, similar to the situation of the first embodiment, the first rotary electric machine and the second rotary electric machine 3 and 4 are controlled by the ECU 2 (see FIG. 3), by which various operations of the power apparatus 1G are performed.

As mentioned above, according to the eighth embodiment, the first rotary electric machine and the second rotary electric machine 3 and 4, the left driving axis and the right driving axis SL and SR, as well as the first planet gear unit and the second planet gear unit PS1 and PS2 are formed in the way similar to the fourth embodiment, so that the whole power apparatus 1G can be miniaturized in the radial direction. Besides, the first input gear 11 is disposed coaxially with the sixth gear and the eighth gear 6b and 6c of the second connecting mechanism 6, and the second input gear 12 is disposed coaxially with the second gear and the third gear 5b and 5c of the first connecting mechanism 5, so that the whole power apparatus 1G can be further miniaturized in the radial direction. Besides, the effect of the first embodiment can also be achieved.

Figure 21:
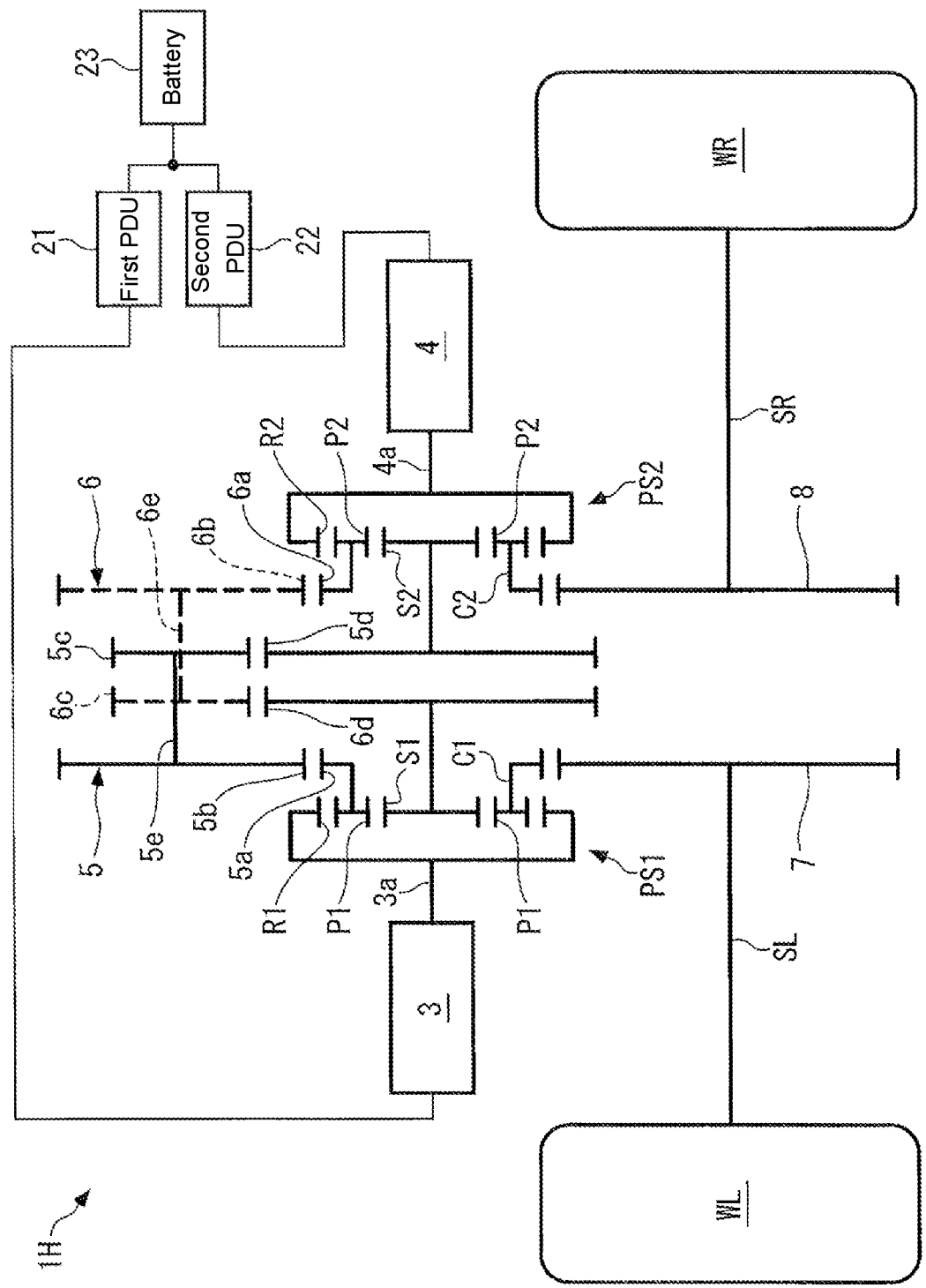
FIG. 21 is a skeleton diagram showing a power apparatus according to a ninth embodiment of the disclosure as well as the left wheel and the right wheel of a vehicle to which the power apparatus is applied.

Next, a power apparatus 1H according to the ninth embodiment of the disclosure is described with reference to FIG. 21 and FIG. 22. Compared with the first embodiment, the difference of the power apparatus 1H is the connecting relationship of the first rotary electric machine and the second rotary electric machine 3 and 4, the first planet gear unit and the second planet gear unit PS1 and PS2, and the first connecting mechanism and the second connecting mechanism 5 and 6. In FIG. 20 and FIG. 21, the same symbols are given to structural elements similar to the first embodiment. In the following part, the description is centered on the aspect different from the first embodiment.

In the power apparatus 1 according to the first embodiment, the first sun gear S1 of the first planet gear unit PS1 is connected with the first rotary electric machine 3, and the first ring gear R1 of the first planet gear unit PS1 is connected with the second connecting mechanism 6; on the contrary, in the power apparatus 1H according to the ninth embodiment, the first sun gear S1 is connected with the second connecting mechanism 6, and the first ring gear R1 is connected with the first rotary electric machine 3.

Specifically speaking, the first ring gear R1 is connected with the first output axis 3a of the first rotary electric machine 3 via a hollow rotation axis or a flange so that the first ring gear R1 and the first output axis 3a rotate integrally. Besides, the eighth gear 6d of the second connecting mechanism 6 is connected with the first sun gear S1 via a rotation axis so that the eighth gear 6d and the first sun gear S1 rotate integrally. The first carrier C1 of the first planet gear unit PS1 is formed by the combination of a plurality of spindles supporting the first pinion gear P1 with a hollow rotation axis, and the first gear 5a of the hollow-shaped first connecting mechanism 5 is disposed integrally with the first carrier C1.

Besides, as described in the first embodiment, in the first connecting mechanism 5, the second gear 5b engages with the first gear 5a, the second gear and the third gear 5b and 5c are connected with each other via the first rotation axis 5e so that 5b and 5c rotate integrally, and the third gear 5c engages with the fourth gear 5d. On the other hand, different to the first embodiment, the fourth gear and the eighth gear 5d and 6d are disposed between the first planet gear unit PS1 and the second planet gear unit PS2.

Besides, in the power apparatus 1 according to the first embodiment, the second sun gear S2 of the second planet gear unit PS2 is connected with the second rotary electric machine 4, and the second ring gear R2 of the second planet gear unit PS2 is connected with the first connecting mechanism 5, on the contrary, in the power apparatus 1H according to the ninth embodiment, the second sun gear S2 is connected with the first connecting mechanism 5, and the second ring gear R2 is connected with the second rotary electric machine 4.

Specifically speaking, the second ring gear R2 is connected with the second output axis 4a of the second rotary electric machine 4 via a hollow rotation axis or a flange so that the second ring gear R2 and the second output axis 4a rotate integrally. Besides, the fourth gear 5d is connected with the second sun gear S2 via a rotation axis so that the fourth gear 5d and the second sun gear S2 rotate integrally. The second carrier C2 of the second planet gear unit PS2 is formed by the combination of a plurality of spindles supporting the second pinion gear P2 with hollow rotation axis, and the fifth gear 6a of the hollow-shaped second connecting mechanism 6 is disposed integrally with the second carrier C2.

Besides, as described in the first embodiment, in the second connecting mechanism 6, the sixth gear 6b engages with the fifth gear 6a, the sixth gear and the seventh gear 6b and 6c are connected with each other via the second rotation axis 6e so that 6b and 6c rotate integrally, and the seventh gear 6c engages with the eighth gear 6d. Furthermore, the first rotation axis and the second rotation axis 5e and 6e are disposed on different positions on the outer peripheral circle of the first planet gear unit and the second planet gear unit PS1 and PS2 (see FIG. 2).

Besides, in FIG. 21, in order to show that the first rotation axis and the second rotation axis 5e and 6e are disposed on different positions on the outer peripheral circle of the first planet gear unit and the second planet gear unit PS1 and PS2 as in FIG. 1, the second rotation axis 6e and the sixth gear and the seventh gear 6b and 6c are represented by dashed lines, and the first rotation axis 5e is drawn to be staggered from the second rotation axis 6e, and be eccentric from the second gear and the third gear 5b and 5c which are integral with the first rotation axis 5e; however, the gears 5b and 5c are actually disposed coaxially and integrally with the first rotation axis 5e. The same is true with the skeleton diagrams (FIG. 23 and FIG. 24) of the following tenth and eleventh embodiment.

As seen from the above structure, the first carrier C1 is connected with the second sun gear S2 via the first gear and the second gear 5a and 5b, the first rotation axis 5e, as well as the third gear and the fourth gear 5c and 5d, and the rotating directions of C1 and S2 become the same direction accordingly. Besides, the teeth numbers of the first gear to the fourth gear 5a to 5d are set in a way that the rotation speed of the first carrier C1 is greater than the rotation speed of the second sun gear S2.

The second carrier C2 is connected with the first sun gear S1 via the fifth gear and the sixth gear 6a and 6b, the second rotation axis 6e, as well as the seventh gear and the eighth gear 6c and 6d, and the rotating directions of C2 and S1 become the same direction accordingly. Besides, the teeth numbers of the fifth gear to the eighth gear 6a to 6d are set in a way that the rotation speed of the second carrier C2 is greater than the rotation speed of the first sun gear S1. Furthermore, the gear ratio of the first gear 5a to the second gear 5b, and the gear ratio of the fifth gear 6a to the sixth gear 6b are set to be the same value, and the gear ratio of the third gear 5c to the fourth gear 5d, and the gear ratio of the seventh gear 6c to the eighth gear 6d are set to be the same value.

As mentioned above, the first ring gear and the second ring gear R1 and R2 are connected respectively with the first output axis 3a of the first rotary electric machine 3 and the second output axis 4a of the second rotary electric machine 4 to rotate integrally. Besides, the first carrier C1 and the second sun gear S2 are connected with each other by the first connecting mechanism 5 so that the rotating directions of C1 and S2 become the same direction and the rotation speed of C1 is greater than the rotation speed of S2. Furthermore, the second carrier C2 and the first sun gear S1 are connected with each other by the second connecting mechanism 6 so that the rotating directions of C2 and S1 become the same direction and the rotation speed of C2 is greater than the rotation speed of S1.

Besides, similar to the situation of the first embodiment, the first carrier C1 is connected with the left wheel WL via the first gear 5a, the first output gear 7 and the left driving axis SL, and the second carrier C2 is connected with the right wheel WR via the fifth gear 6a, the second output gear 8 and the right driving axis SR. In this way, the rotation power transferred to the first gear and the fifth gear 5a and 6a which are integral with the first carrier and the second carrier C1 and C2 respectively are transferred to the left wheel and the right wheel WL and WR respectively in decelerating states with the same deceleration ratio.

As described in the first embodiment, the rotation speeds of the first sun gear S1, the first carrier C1 and the first ring gear R1 satisfy a collinear relationship, and the rotation speeds of the second sun gear S2, the second carrier C2 and the second ring gear R2 satisfy a collinear relationship. Besides, without regard for the speed variation and shift of rotating direction caused by the first gear 5a and the first output gear 7 as well as the fifth gear 6a and the second output gear 8, the rotation speed of the first carrier C1 is equal to the rotation speed of the left wheel WL, and the rotation speed of the second carrier C2 is equal to the rotation speed of the right wheel WR. According to these situations and the structure of the power apparatus 1G described above, the relationship of rotation speeds among various rotation elements is as shown in FIG. 22 for example.

Figure 22:
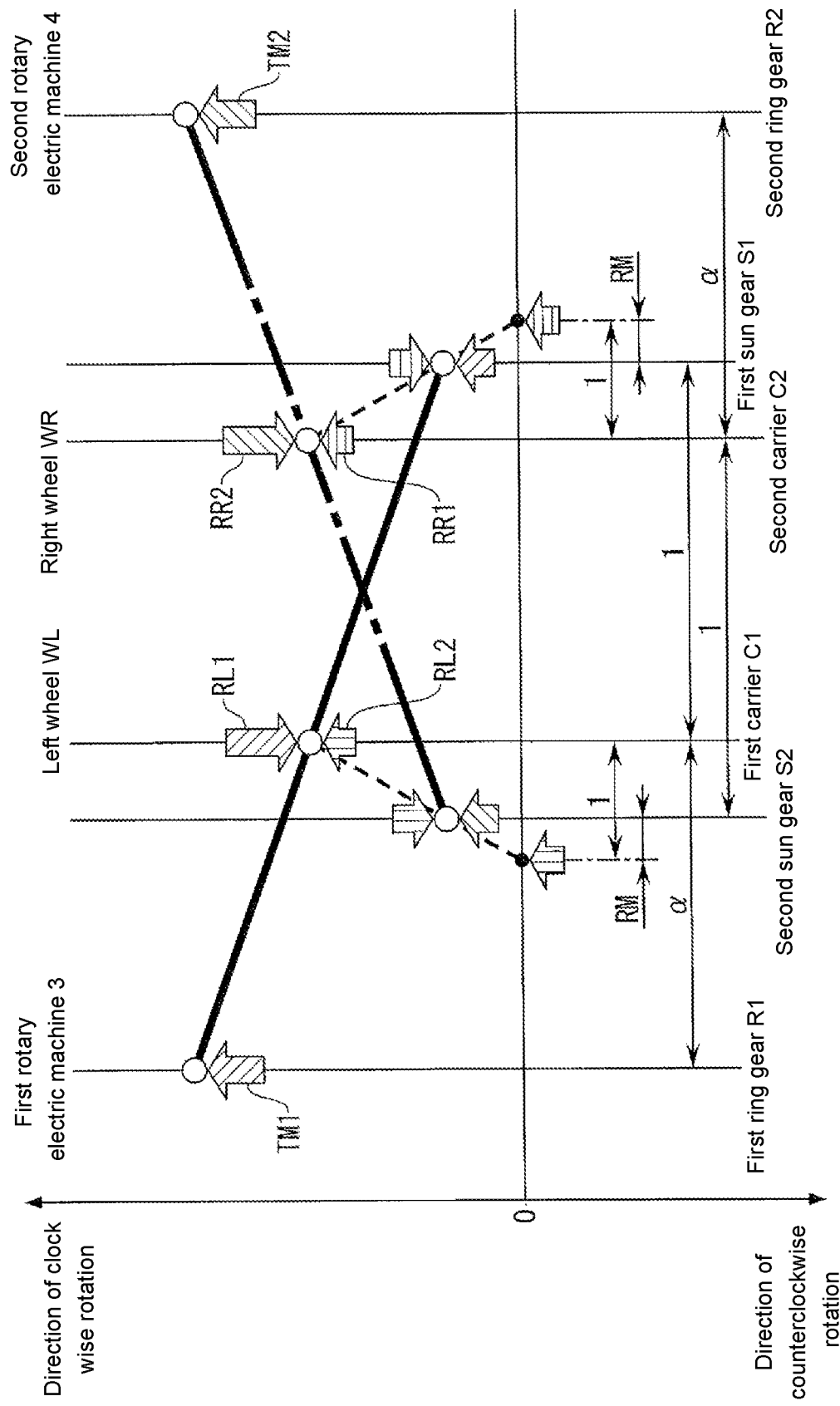
FIG. 22 is a collinear diagram showing a relationship of rotation speeds among various rotation elements of the power apparatus in FIG. 21 and a balancing relationship of torques with regard to a motor-assisted control.

In FIG. 22, different from the first embodiment and so on, a is the ratio of the teeth number of the first sun gear S1/the teeth number of the first ring gear R1, and is also the ratio of the teeth number of the second sun gear S2/the teeth number of the second ring gear R2. RM is as described in the first embodiment. The same is true with other collinear diagrams below (the same is true with the tenth embodiment and the eleventh embodiment below). As seen from FIG. 22, the left wheel and the right wheel WL and WR can be in a reciprocal differential rotation. Besides, similar to the first embodiment, the first rotary electric machine and the second rotary electric machine 3 and 4 are controlled by the ECU 2, by which various operations of the power apparatus 1H are performed, and the motor-assisted control or the torque distribution control for increasing/decreasing the left-yaw moment and the right-yaw moment is implemented.

FIG. 22 shows an example of the relationship of rotation speeds among various rotation elements and the balancing relationship of torques during the motor-assisted control, and as seen from the comparison of FIG. 22 and FIG. 4 described in the first embodiment, similar to the situation of the first embodiment, the left wheel transferred torque TWL (the torque transferred to the left wheel WL) and the right wheel transferred torque TWR (the torque transferred to the right wheel WR) are represented by the formulas (11) and (12) respectively, and the first motor output torque and the second motor output torque TM1 and TM2 are represented by the formulas (13) and (14) respectively.

Besides, based on these formulas (13) and (14), the electric power supplied to the first rotary electric machine and the second rotary electric machine 3 and 4 are controlled in a way that the left wheel transferred torque and the right wheel transferred torque TWL and TWR become the same required torque. According to the above, the rotation power of the first rotary electric machine and the second rotary electric machine 3 and 4 is transferred to the left wheel and the right wheel WL and WR via the first planet gear unit and the second planet gear unit PS1 and PS2, by which the left wheel and the right wheel WL and WR are driven.

Besides, as seen from the comparison of FIG. 22 and FIG. 4 to FIG. 6, operations during the EV driving control, the zero torque control, the decelerating regeneration control, and the first torque distribution control to the fourth torque distribution control for increasing and decreasing the left-yaw moment and the right-yaw moment are similar to the situation of the first embodiment. As mentioned above, according to the ninth embodiment, the effect of the first embodiment can also be achieved.

In addition, in the ninth embodiment, the first output gear and the second output gear 7 and 8 are made to engage with the first gear and the fifth gear 5a and 6a respectively, by which the first carrier and the second carrier C1 and C2 are connected with the left wheel and the right wheel WL and WR respectively; however, the first output gear and the second output gear 7 and 8 may also be made to engage with the eighth gear and the fourth gear 6d and 5d, by which the first sun gear and the second sun gear S1 and S2 are connected with the left wheel and the right wheel WL and WR respectively.

Figure 23:
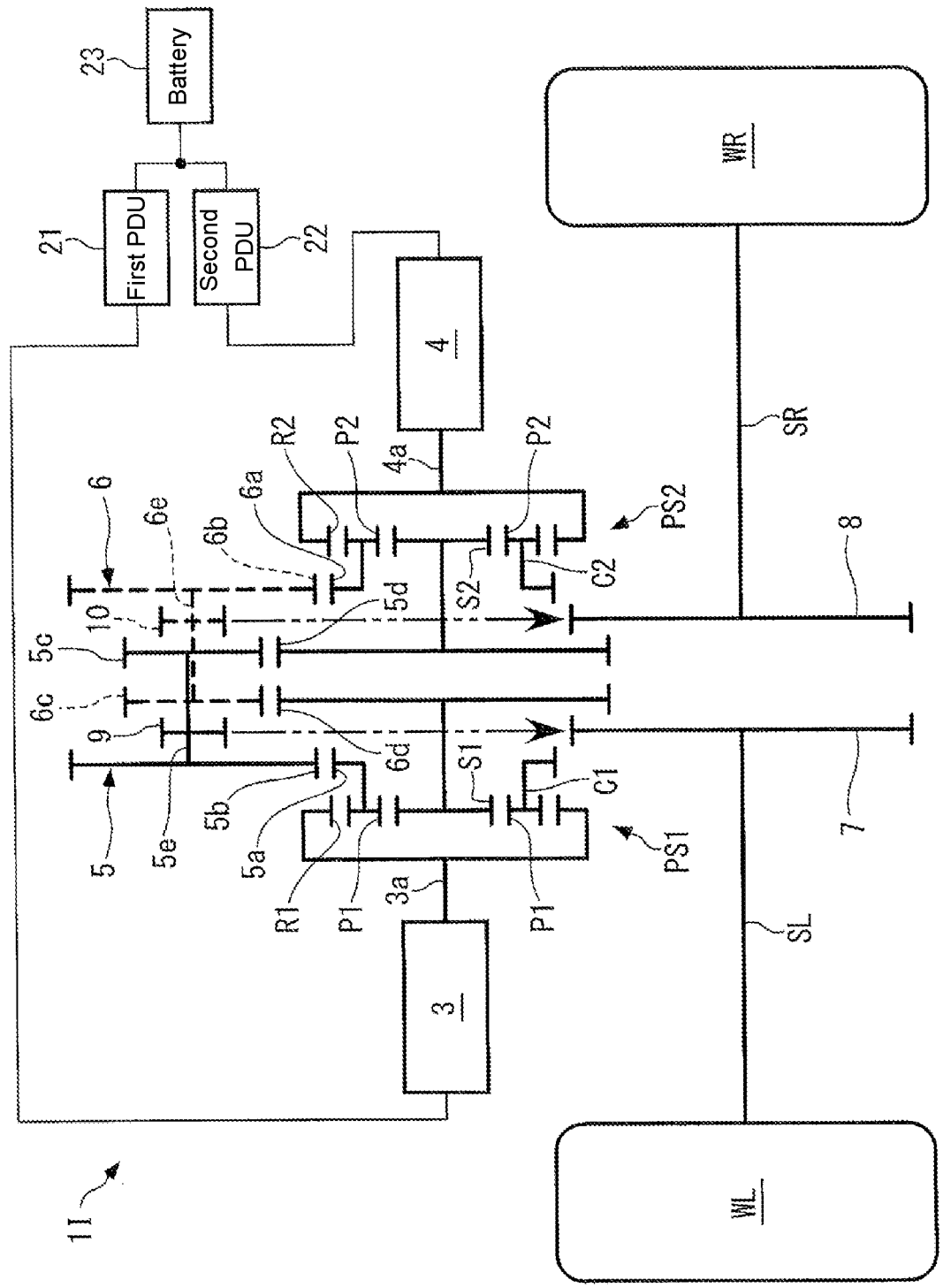
FIG. 23 is a skeleton diagram showing a power apparatus according to a tenth embodiment of the disclosure as well as the left wheel and the right wheel of a vehicle to which the power apparatus is applied.

Next, a power apparatus 1I according to the tenth embodiment of the disclosure is described with reference to FIG. 23. Compared with the ninth embodiment, the major difference of the power apparatus 1I is the comprising of the first input gear and the second input gear 9 and 10 described in the third embodiment. In FIG. 23, the same symbols are given to structural elements similar to the first embodiment, the third embodiment and the ninth embodiment. In the following part, the description is centered on the aspect different from the ninth embodiment.

The first input gear 9 is disposed integrally with the first rotation axis 5e of the first connecting mechanism 5, and similar to the third embodiment, engages with the first idler gear, and the first idler gear engages with the first output gear 7. Besides, different from the ninth embodiment, the first output gear 7 does not engage with the first gear 5a. According to the above, the first carrier C1 is connected with the left wheel WL via the first gear 5a, the second gear 5b, the first rotation axis 5e, the first input gear 9, the first idler gear, the first output gear 7, and the left driving axis SL.

The teeth numbers of the first gear 5a, the second gear 5b, the first input gear 9, and the first output gear 7 are set in a way that the rotation power transferred to the first gear 5a which is integral with the first carrier C1 is transferred to the first output gear 7 in a decelerating state. In addition, for the sake of convenience, a two-dot chain line with an arrow is used to show that the first input gear 9 is connected with the first output gear 7 in FIG. 23.

Furthermore, the second input gear 10 is disposed integrally with the second rotation axis 6e of the second connecting mechanism 6, and similar to the third embodiment, engages with the second idler gear, and the second idler gear engages with the second output gear 8. Besides, different from the ninth embodiment, the second output gear 8 does not engage with the fifth gear 6a. According to the above, the second carrier C2 is connected with the right wheel WR via the fifth gear 6a, the sixth gear 6b, the second rotation axis 6e, the second input gear 10, the second idler gear, the second output gear 8, and the right driving axis SR.

The teeth numbers of the fifth gear 6a, the sixth gear 6b, the second input gear 10, and the second output gear 8 are set in a way that the rotation power transferred to the fifth gear 6a which is integral with the second carrier C2 is transferred to the second output gear 8 in a decelerating state, and the deceleration ratio is set to the same value as the deceleration ratio determined by the first gear 5a, the second gear 5b, the first input gear 9, and the first output gear 7. In addition, in FIG. 23, the second input gear 10 is represented by a dashed line in order to show that the second input gear 10 is disposed integrally with the second rotation axis 6e, and for the sake of convenience, a two-dot chain line with an arrow is used to show that the second input gear 10 is connected with the second output gear 8.

As seen from the connecting relationship among the various rotation elements, without regard for the speed variation and the shift of rotating direction caused by the first gear 5a, the second gear 5b, the first input gear 9, and the first output gear 7, the rotation speed of the first carrier C1 is equal to the rotation speed of the left wheel WL. Besides, without regard for the speed variation and the shift of rotating direction caused by the fifth gear 6a, the sixth gear 6b, the second input gear 10, the second idler gear, and the second output gear 8, the rotation speed of the second carrier C2 is equal to the rotation speed of the right wheel WR. The relationship of rotation speeds among other rotation elements is similar to the ninth embodiment. According to the above, the relationship of rotation speeds among various rotation elements in the power apparatus 1I is similar to the situation of the ninth embodiment, and is as shown in FIG. 22 for example.

Besides, similar to the situation of the ninth embodiment, the first rotary electric machine and the second rotary electric machine 3 and 4 are controlled by the ECU 2 (see FIG. 3), by which various operations of the power apparatus 1I are performed. According to the above, the tenth embodiment, the effect of the first embodiment can also be achieved.

In addition, in the tenth embodiment, the first input gear and the second input gear 9 and 10 are disposed integrally with the first rotation axis and the second rotation axis 5e and 6e respectively, and the first carrier and the second carrier C1 and C2 are connected with the left wheel and the right wheel WL and WR respectively; however, the first input gear and the second input gear 9 and 10 may also be disposed integrally with the second and the first rotation axis 6e and 5e, and the first sun gear and the second sun gear S1 and S2 may be connected with the left wheel and the right wheel WL and WR.

Figure 24:
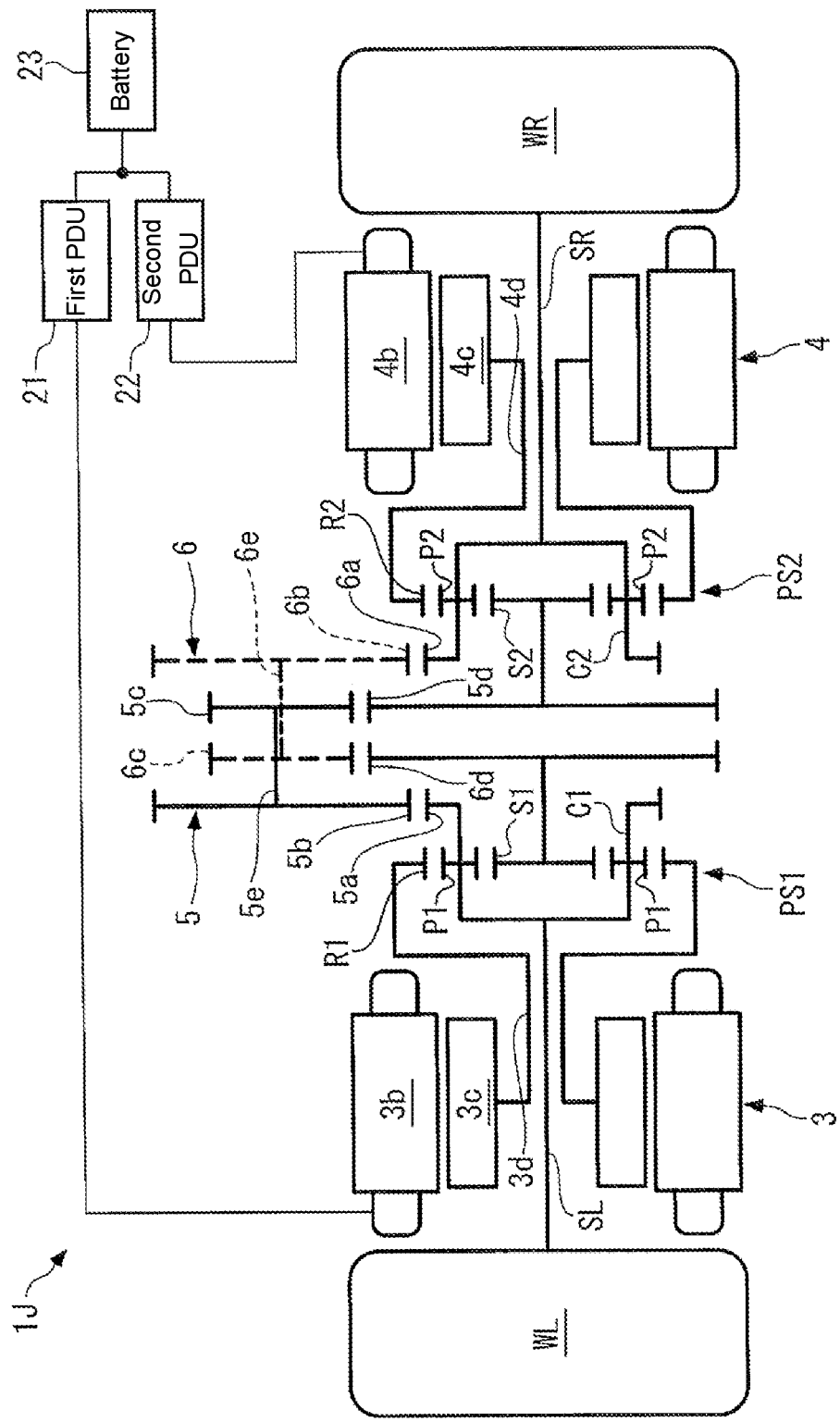
FIG. 24 is a skeleton diagram showing a power apparatus according to a eleventh embodiment of the disclosure as well as the left wheel and the right wheel of a vehicle to which the power apparatus is applied.

Next, a power apparatus 1J according to the eleventh embodiment of the disclosure is described with reference to FIG. 24. Compared with the ninth embodiment, the difference of the power apparatus 1J is that the first rotary electric machine and the second rotary electric machine 3 and 4 are hollow-shaped as described in the fourth embodiment, and that the first output gear and the second output gear 7 and 8 are omitted and the first carrier and the second carrier C1 and C2 are connected with the left driving axis and the right driving axis SL and SR respectively to rotate integrally. In FIG. 24, the same symbols are given to structural elements similar to the first embodiment, the fourth embodiment and the ninth embodiment. In the following part, the description is centered on the aspect different from the ninth embodiment.

As shown in FIG. 24, different from the eighth embodiment and similar to the fourth embodiment (FIG. 12), the first rotary electric machine and the second rotary electric machine 3 and 4 as well as the first planet gear unit and the second planet gear unit PS1 and PS2 are disposed coaxially with the left driving axis and the right driving axis SL and SR. Besides, as described in the fourth embodiment, the first rotary electric machine and the second rotary electric machine 3 and 4 are hollow-shaped, the first stator and the second stator 3b and 4b are connected with the first PDU and the second PDU 21 and 22 respectively, and the first output axis and the second output axis 3d and 4d are disposed integrally with the first rotor and the second rotor 3c and 4c respectively.

Besides, the first output axis and the second output axis 3d and 3e are connected with the first ring gear and the second ring gear R1 and R2 respectively via a doughnut plate-shaped flange or a hollow rotation axis to rotate integrally. Furthermore, the left driving axis SL is relatively rotatably disposed on the inner side of the first output axis 3d and the first rotary electric machine a3, and the right driving axis SR is relatively rotatably disposed on the inner side of the second output axis 4d and the second rotary electric machine 4.

The first carrier C1 is formed by the combination of a plurality of spindles supporting the first pinion gear P1 with a disk-shaped flange, and the flange is disposed integrally with the left driving axis SL. Besides, the second carrier C2 is formed by the combination of a plurality of spindles supporting the second pinion gear P2 with a disk-shaped flange, and the flange is disposed integrally with the right driving axis SR. The connecting relationship among other rotation elements is similar to the ninth embodiment.

As seen from the above structure, the relationship of rotation speeds among various rotation elements in the power apparatus 1J is similar to the situation of the ninth embodiment, and is as shown in FIG. 22 for example. Besides, similar to the situation of the ninth embodiment, the first rotary electric machine and the second rotary electric machine 3 and 4 are controlled by the ECU 2 (see FIG. 3), by which various operations of the power apparatus 1J are performed. As mentioned above, according to the eleventh embodiment, the effect of the first embodiment can also be achieved.

In addition, in the eleventh embodiment, the first carrier and the second carrier C1 and C2 are disposed integrally with the left driving axis and the right driving axis SL and SR respectively; the first input gear 9 and the first output gear 7, as well as the second input gear 10 and the second output gear 8 may also be used for the respective connection as described in the fourth embodiment, or the first input gear 11 and the first output gear 7, as well as the second input gear 12 and the second output gear 8 may be used for the respective connection as described in the seventh embodiment or the eighth embodiment.

Besides, in the eleventh embodiment, the first carrier and the second carrier C1 and C2 are connected with the left wheel and the right wheel WL and WR respectively, but it may be the first sun gear and the second sun gear S1 and S2 that are connected with the left wheel and the right wheel WL and WR respectively. In this situation, the first sun gear and the second sun gear S1 and S2 may be disposed integrally with the left driving axis and the right driving axis SL and SR respectively, or the first input gear 9 (11) and the first output gear 7, and the second input gear 10 (12) and the second output gear 8 may be used for the respective connection as described in the fifth embodiment or the sixth embodiment. In such a situation when the first input gear and the second input gear 11 and 12 are used for connection, 11 and 12 may be rotatably supported on the first rotation axis and the second rotation axis 5e and 6e as described in the variation of the sixth embodiment.

Furthermore, in the first embodiment to the eleventh embodiment, the gear ratio of the first gear 5a to the second gear 5b and the gear ratio of the fifth gear 6a to the sixth gear 6b are set to a same value, and the gear ratio of the third gear 5c to the fourth gear 5d and the gear ratio of the seventh gear 6c to the eighth gear 6d are set to a same value, but the gear ratios may also be set to different values.

Next, a power apparatus 1K according to the twelfth embodiment of the disclosure is described with reference to FIG. 25 to FIG. 28. Compared with the first embodiment, the major difference of the power apparatus 1K is the structure of the first connecting mechanism and the second connecting mechanism 13 and 14. In FIG. 25 to FIG. 28, the same symbols are given to structural elements similar to the first embodiment. In the following part, the description is centered on the aspect different from the first embodiment.

Different from the first connecting mechanism 5 of the first embodiment, the first connecting mechanism 13 has a first middle gear 13e beside the first gear to the fourth gear 13a to 13d and the first rotation axis 13f. The first gear to the fourth gear 13a to 13d and the first middle gear 13e are all formed by external gears. The first gear 13a is connected with the first carrier C1 to rotate integrally, engages with the second gear 13b, and similar to the first embodiment, is disposed between the first planet gear unit PS1 and the second planet gear unit PS2. The third gear 13c is connected with the second gear 13b via the first rotation axis 13f to rotate integrally, and engages with the first middle gear 13e.

Similar to the first embodiment, the first rotation axis 13f is rotatably supported on a case via a bearing (not shown), extends in parallel with the axis line of the first planet gear unit and the second planet gear unit PS1 and PS2, and extends in parallel with the left driving axis and the right driving axis SL and SR. The first middle gear 13e has an integrally disposed rotation axis, is rotatably supported on a case via the rotation axis and a bearing (not shown), and engages with not only the third gear 13c but also the fourth gear 13d. The rotation axis of the first middle gear 13e (the axis line of the first middle gear 13e) extends in parallel with the first rotation axis 13f, the axis line of the first planet gear unit and the second planet gear unit PS1 and PS2, as well as the left driving axis and the right driving axis SL and SR. Similar to the first embodiment, the fourth gear 13d is disposed integrally on the periphery surface of the second ring gear R2.

Besides, the teeth number of the first gear 13a is smaller than the teeth number of the second gear 13b, and the teeth number of the third gear 13c is smaller than the teeth number of the fourth gear 13d. According to the above structure, the first carrier C1 and the second ring gear R2 are connected with each other by the first connecting mechanism 13 in a way that the rotating directions of C1 and R2 are opposite to each other, and the absolute value of the rotation speed of C1 is greater than the absolute value of the rotation speed of R2.

Different form the second connecting mechanism 6 of the first embodiment, the second connecting mechanism 14 has a second middle gear 14e besides the fifth gear to the eighth gear 14a to 14d and the second rotation axis 14f. The fifth gear to the eighth gear 14a to 14d and the second middle gear 14e are all formed by external gears. The fifth gear 14a is connected with the second carrier C2 to rotate integrally, engages with the sixth gear 14b, and similar to the first embodiment, is disposed between the first gear 13a and the second planet gear unit PS2. The seventh gear 14c is connected with the sixth gear 14b via the second rotation axis 14f to rotate integrally, and engages with the second middle gear 14e.

Similar to the first embodiment, the second rotation axis 14f is rotatably supported on a case via a bearing (not shown), extends in parallel with the axis line of the first planet gear unit and the second planet gear unit PS1 and PS2, and extends in parallel with the left driving axis and the right driving axis SL and SR. The second middle gear 14e has an integrally disposed rotation axis, is rotatably supported on a case via the rotation axis and a bearing (not shown), and engages with not only the seventh gear 14c but also the eighth gear 14d. The rotation axis of the second middle gear 14e (the axis line of the second middle gear 14e) extends in parallel with the second rotation axis 14f, the axis line of the first planet gear unit and the second planet gear unit PS1 and PS2, as well as the left driving axis and the right driving axis SL and SR. Similar to the first embodiment, the eighth gear 14d is disposed integrally on the periphery surface of the first ring gear R1.

Besides, the teeth number of the fifth gear 14a is smaller than the teeth number of the sixth gear 14b, and the teeth number of the seventh gear 14c is smaller than the teeth number of the eighth gear 14d. According to the above structure, the second carrier C2 and the first ring gear R1 are connected with each other by the second connecting mechanism 14 in a way that the rotating directions of C2 and R1 are opposite to each other, and the absolute value of the rotation speed of C2 is greater than the absolute value of the rotation speed of R1. Besides, the gear ratio of the first gear 13a to the second gear 13b and the gear ratio of the fifth gear 14a to the sixth gear 14b are set to a same value, and the gear ratio of the third gear 13c to the fourth gear 13d and the gear ratio of the seventh gear 14c to the eighth gear 14d are set to a same value.

In addition, the position relationship of the first rotation axis and the second rotation axis 13f and 14f is similar to the position relationship of the first rotation axis and the second rotation axis 5e and 6e of the first embodiment described by using FIG. 2, so that detailed description is omitted here.

Figure 25:
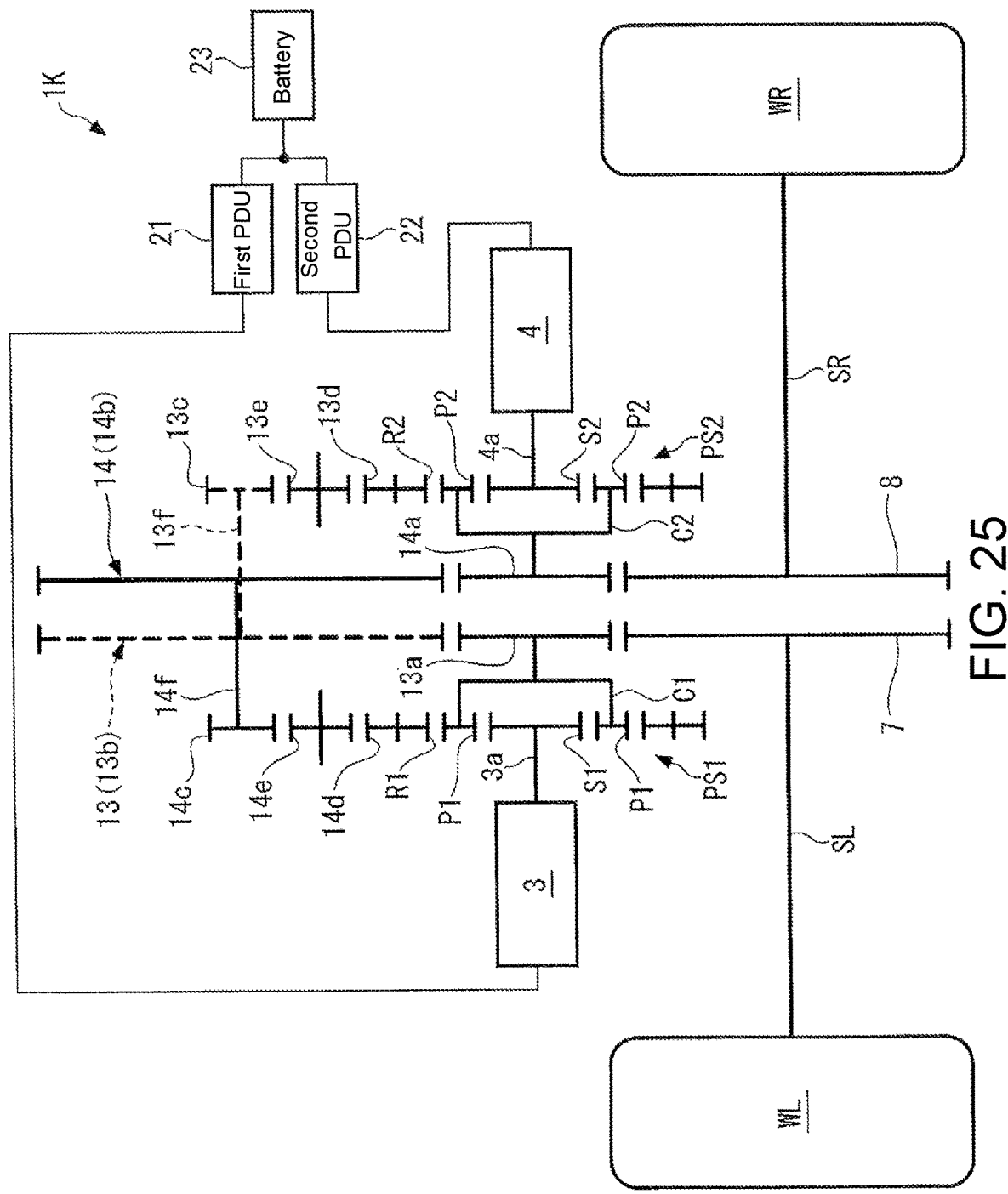
FIG. 25 is a skeleton diagram showing a power apparatus according to a twelfth embodiment of the disclosure as well as the left wheel and the right wheel of a vehicle to which the power apparatus is applied.
Figure 29:
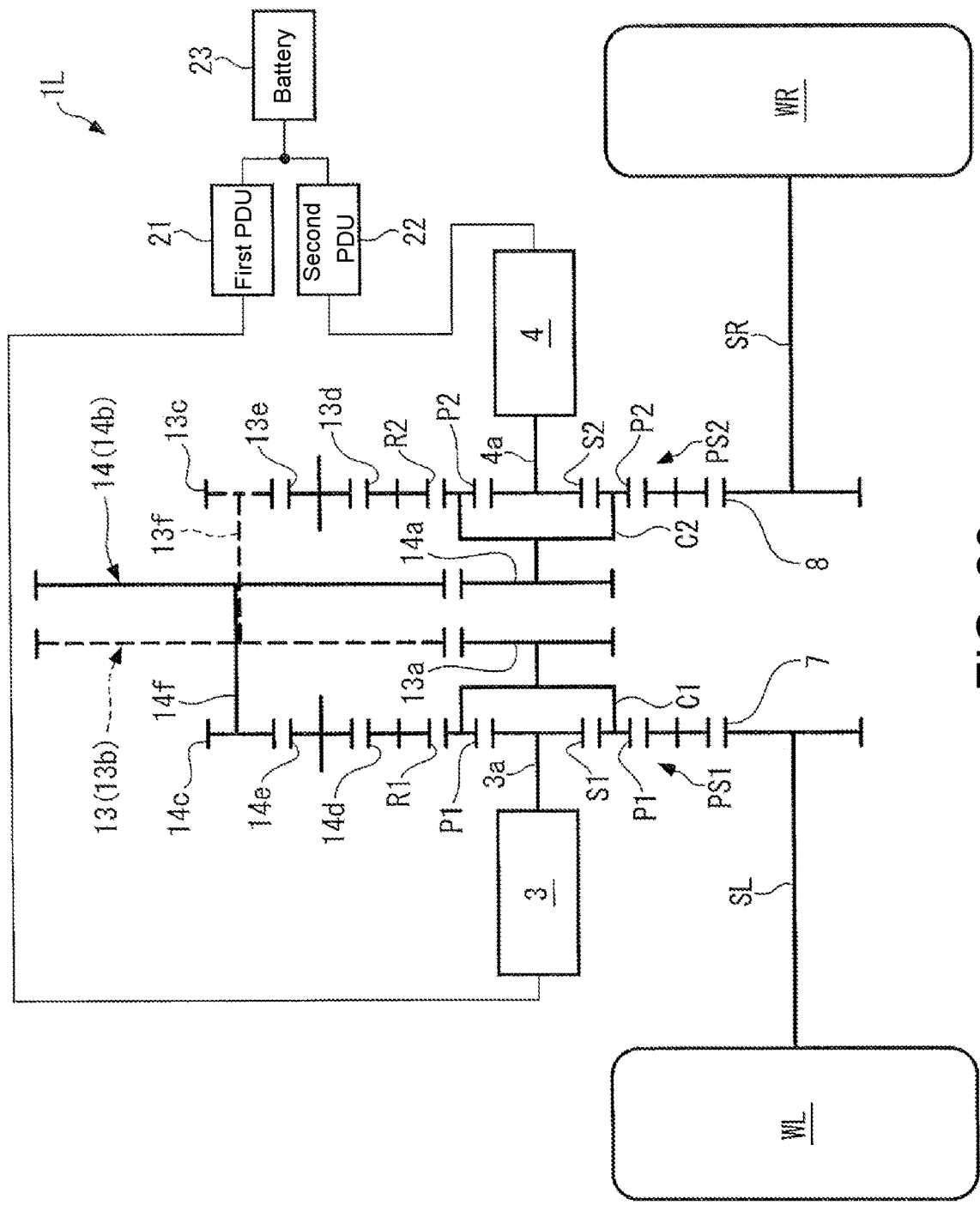
FIG. 29 is a skeleton diagram showing a power apparatus according to a thirteenth embodiment of the disclosure as well as the left wheel and the right wheel of a vehicle to which the power apparatus is applied.

Besides, in FIG. 25, in order to show that the first rotation axis and the second rotation axis 13f and 14f are disposed on different positions on the outer peripheral circle of the first planet gear unit and the second planet gear unit PS1 and PS2 as in the situation of the first embodiment, the first rotation axis 13f, and the second gear and the third gear 13b and 13c are represented by dashed lines, and the second rotation axis 14f is drawn to be staggered from the first rotation axis 13f, and be the eccentric from the sixth gear and the seventh gear 14b and 14c which are integral with the second rotation axis 14f; however, the gears 14b and 14c are actually disposed coaxially and integrally with the second rotation axis 14f. The same is true to the skeleton diagrams (FIG. 29, FIG. 33 and FIG. 34) of the thirteenth embodiment to the fifteenth embodiment below.

Besides, the first output gear and the second output gear 7 and 8 engage with the first gear and the fifth gear 13a and 14a respectively. The teeth numbers of the first output gear and the second output gear 7 and 8 are greater than the teeth numbers of the first gear and the fifth gear 13a and 14a respectively, and the gear ratio of the first gear 13a to the first output gear 7 and the gear ratio of the fifth gear 14a to the second output gear 8 are set to a same value. According to the above, similar to the situation of the first embodiment, the rotation power, which is transferred to the first gear and the fifth gear 13a and 14a which are integral with the first carrier and the second carrier C1 and C2 respectively, is transferred to the left driving axis and the right driving axis SL and SR respectively via the first output gear and the second output gear 7 and 8 in a decelerating state, and is further transferred to the left wheel and the right wheel WL and WR respectively. The deceleration ratio in this situation is the same for the left wheel and the right wheel WL and WR.

as described in the first embodiment, the rotation speeds of the first sun gear S1, the first carrier C1 and the first ring gear R1, as well as the rotation speeds of the second sun gear S2, the second carrier C2 and the second ring gear R2 satisfy a collinear relationship, and the first carrier C1 and the second ring gear R2 are connected with each other by the first connecting mechanism 13 in a way that the rotating directions of C1 and R2 are opposite to each other, and the absolute value of the rotation speed of C1 is greater than the absolute value of the rotation speed of R2. Besides, the second carrier C2 and the first ring gear R1 are connected with each other by the second connecting mechanism 14 in a way that the rotating directions of C2 and R1 are opposite to each other, and the absolute value of the rotation speed of C2 is greater than the absolute value of the rotation speed of R1.

Besides, the first carrier C1 is connected with the left wheel WL via the first gear 13a, the first output gear 7 and the left driving axis SL, and the second carrier C2 is connected with the right wheel WR via the fifth gear 14a, the second output gear 8 and the right driving axis SR. Without regard for the speed variation and the shift of rotating direction caused by the first gear 13a and the first output gear 7 as well as the fifth gear 14a and the second output gear 8, the rotation speed of the first carrier C1 is equal to the rotation speed of the left wheel WL, and the rotation speed of the second carrier C2 is equal to the rotation speed of the right wheel WR. The relationship of rotation speeds among other rotation elements is similar to the first embodiment.

Figure 26:
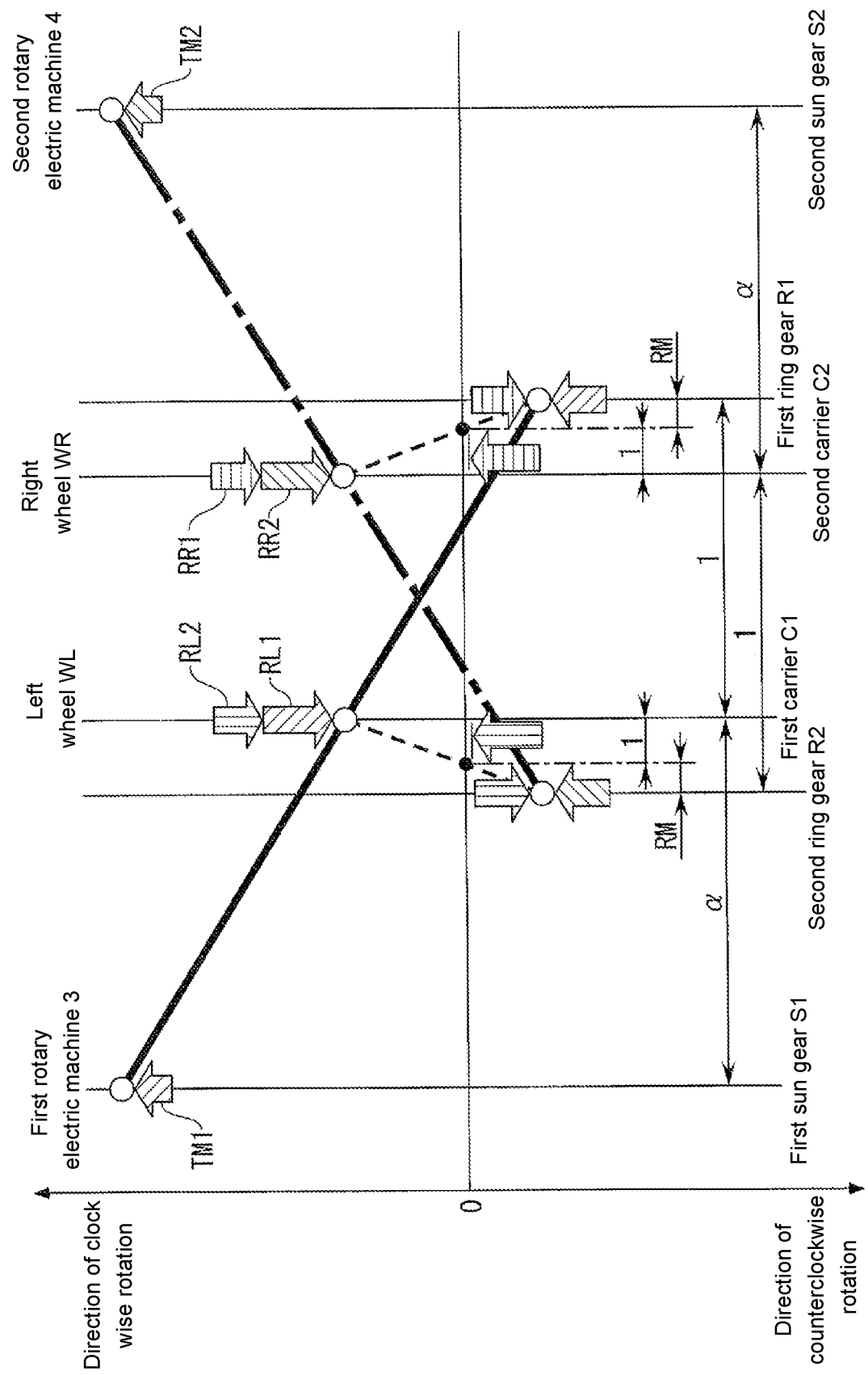
FIG. 26 is a collinear diagram showing a relationship of rotation speeds among various rotation elements of the power apparatus in FIG. 25 and a balancing relationship of torques with regard to a motor-assisted control.

According to the above, in the power apparatus 1K, the relationship of rotation speeds among various rotation elements is as shown in FIG. 26 for example. In FIG. 26, α is as described in the first embodiment, RM is the ratio of (the teeth number of the first gear 13a×the teeth number of the third gear 13c)/(the teeth number of the second gear 13b×the teeth number of the fourth gear 13d), and is also the ratio of (the teeth number of the fifth gear 14a×the teeth number of the seventh gear 14c)/(the teeth number of the sixth gear 14b×the teeth number of the eighth gear 14d), and 0<RM<1.0. As seen from FIG. 26, the left wheel and the right wheel WL and WR can be in a reciprocal differential rotation.

Besides, similar to the situation of the first embodiment, the first rotary electric machine and the second rotary electric machine 3 and 4 are controlled by the ECU 2 (see FIG. 3), by which various operations of the power apparatus 1K are performed. In the following part, the motor-assisted control, the decelerating regeneration control, and the torque distribution control for increasing and decreasing the right-yaw moment contained in an operation different from the first embodiment, which are among the motor-assisted control, the EV driving control, the zero torque control, the decelerating regeneration control, and the torque distribution control for increasing and decreasing the left-yaw moment and the right-yaw moment contained in the operation of the power apparatus 1K during the straight running or revolving of the vehicle, are described with reference to FIG. 26 to FIG. 28, and description regarding other aspects is omitted. Besides, the description below is centered on the operation different from the first embodiment.

[During Straight Running]

In the motor-assisted control performed during the straight running of the vehicle, similar to the first embodiment, power running is performed in both the first rotary electric machine and the second rotary electric machine 3 and 4, and electric power supplied from the battery 23 to the first rotary electric machine and the second rotary electric machine 3 and 4 is controlled. FIG. 26 shows an example of the relationship of rotation speeds among various rotation elements and the balancing relationship of torques during the motor-assisted control. Various parameters (TM1 and TM2, RL1, RL2, RR1, and RR2) in FIG. 26 are as described in the first embodiment. As shown in FIG. 26, the rotating directions of the first rotary electric machine and the second rotary electric machine 3 and 4 are the same as the rotating directions of the first carrier and the second carrier C1 and C2 which are connected with the left wheel and the right wheel WL and WR respectively.

Besides, as seen from the balancing relationship of torques shown in FIG. 26, the left wheel transferred torque and the right wheel transferred torque TWL and TWR are represented by the following formulas (31) and (32) respectively.

$$TWL=|RL1|+|RL2|=(1+\alpha)TM1+\alpha \times RM \times TM2 \quad (31)$$

$$TWL=|RR2|+|RR1|=(1+\alpha)TM2+\alpha \times RM \times TM1 \quad (32)$$

Besides, according to the formulas (31) and (32), the first motor output torque and the second motor output torque TM1 and TM2 are represented by the following formulas (33) and (34) respectively.

$$TM1=\{(1+\alpha)TWL-\alpha\times RM\times TWR\}/\{(1+\alpha)^2-\alpha^2\times RM^2\} \quad (33)$$

$$TM2=\{(1+\alpha)TWR-\alpha\times RM\times TWL\}/\{(1+\alpha)^2-\alpha^2\times RM^2\} \quad (34)$$

The electric power supplied to the first rotary electric machine and the second rotary electric machine 3 and 4 is controlled based on the formulas (33) and (34) so that the left wheel transferred torque and the right wheel transferred torque TWL and TWR become the same required torque. According to the above, the rotation power of the first rotary electric machine and the second rotary electric machine 3 and 4 is transferred to the left wheel and the right wheel WL and WR via the first planet gear unit and the second planet gear unit PS1 and PS2, by which the left wheel and the right wheel WL and WR are driven.

In addition, FIG. 26 is an example of the situation in which by controlling the rotating directions of the first rotary electric machine and the second rotary electric machine 3 and 4, the left wheel and the right wheel WL and WR are driven in a direction of clockwise rotation to make the vehicle run forward; and similar to the first embodiment, on the contrary, the left wheel and the right wheel WL and WR can also be driven in a direction of counterclockwise rotation to make the vehicle run backward.

Besides, in the decelerating regeneration control, similar to the first embodiment, regeneration is performed in the first rotary electric machine and the second rotary electric machine 3 and 4, and in this situation, the left wheel transferred torque and the right wheel transferred torque TWL and TWR are represented by the following formulas (35) and (36).

$$TWL=-(1+\alpha)|TM1|-\alpha\times RM\times|TM2| \quad (35)$$

$$TWR=-(1+\alpha)|TM2|-\alpha\times RM\times|TM1| \quad (35)$$

[During Revolving]

As seen from the difference between the formulas (31) to (36) and the formulas (11) to (16) described in the first embodiment, among the first torque distribution control to the fourth torque distribution control for increasing and decreasing the right-yaw moment which are performed during the rightward revolving in the advancing of the vehicle, the operations in the first torque distribution control and the second torque distribution control have different relationship formulas of torques, but the relationship formulas of torques are the same as the first embodiment. Therefore, description about these formulas is omitted, and the third torque distribution control and the fourth torque distribution control for increasing and decreasing the right-yaw moment are described in sequence below.

In the third torque distribution control for increasing the right-yaw moment, power running is performed in the first rotary electric machine 3, regeneration is performed in the second rotary electric machine 4, and the electric power supplied to the first rotary electric machine 3 and the regenerated electric power in the second rotary electric machine 4 are controlled so that the first motor output torque TM1 is greater than the absolute value TM2 of the second motor output torque.

Figure 27:
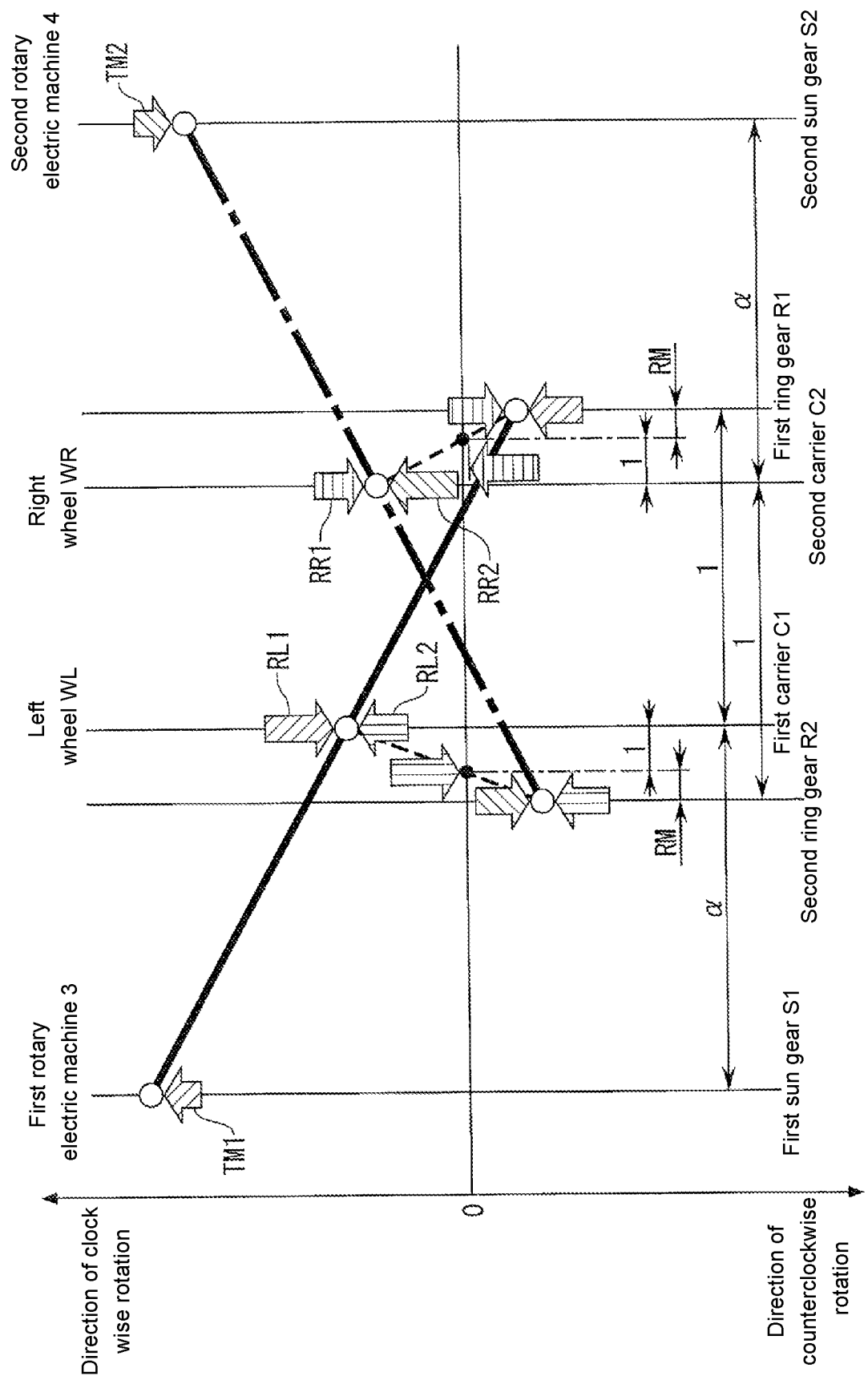
FIG. 27 is a collinear diagram showing a relationship of rotation speeds among various rotation elements of the power apparatus in FIG. 25 and a balancing relationship of torques with regard to a third torque distribution control used for increasing right-yaw moment.

FIG. 27 shows the relationship of rotation speeds among various rotation elements and the balancing relationship of torques in this situation. In this situation, the left wheel transferred torque and the right wheel transferred torque TWL and TWR are represented by the following formulas (37) and (38) respectively.

$$TWL = |RL1| - |RL2| \quad (37)$$
$$= (1+\alpha)TM1 - \alpha \times RM \times |TM2|$$

$$TWR = -|RR2| + |RR1| \quad (38)$$
$$= -(1+\alpha)|TM2| + \alpha \times RM \times TM1$$

As seen from the formulas (37) and (38) as well as TM1≥|TM2|, the driving torque and the braking torque act on the left wheel and the right wheel WL and WR respectively, or the driving torque of the left wheel WL is greater than the driving torque of the right wheel WR, as a result, the right-yaw moment of the vehicle increases.

Besides, in the fourth torque distribution control for increasing the right-yaw moment, the zero torque control is performed on the first rotary electric machine 3, and regeneration is performed in the second rotary electric machine 4. In this situation, only the second motor output torque TM2 serving as the braking torque is generated, so that as seen from the formulas (35) and (36), the left wheel transferred torque TWL is −α×RM×|TM2|, and the right wheel transferred torque TWR is −(1+α)|TM2|. Accordingly, the braking torque of the right wheel WR is greater than the braking torque of the left wheel WL, as a result, the right-yaw moment of the vehicle increases.

In addition, in order to increase the right-yaw moment, it may be that power running is performed in the first rotary electric machine 3, and zero torque control is performed on the second rotary electric machine 4. In this situation, only the first motor output torque TM1 is generated, so that as seen from the formulas (31) and (32), the left wheel transferred torque TWL is (1+α)TM1, and the right wheel transferred torque TWR is α×RM×TM1. Accordingly, the driving torque of the left wheel WL is greater than the driving torque of the right wheel WR, as a result, the right-yaw moment of the vehicle increases.

In the third torque distribution control for decreasing the right-yaw moment, regeneration is performed in the first rotary electric machine 3, and power running is performed in the second rotary electric machine 4, and the regenerated electric power in the first rotary electric machine 3 and the electric power supplied to the second rotary electric machine 4 are controlled in a way that the absolute value |TM1| of the first motor output torque is greater than the second motor output torque TM2.

Figure 28:
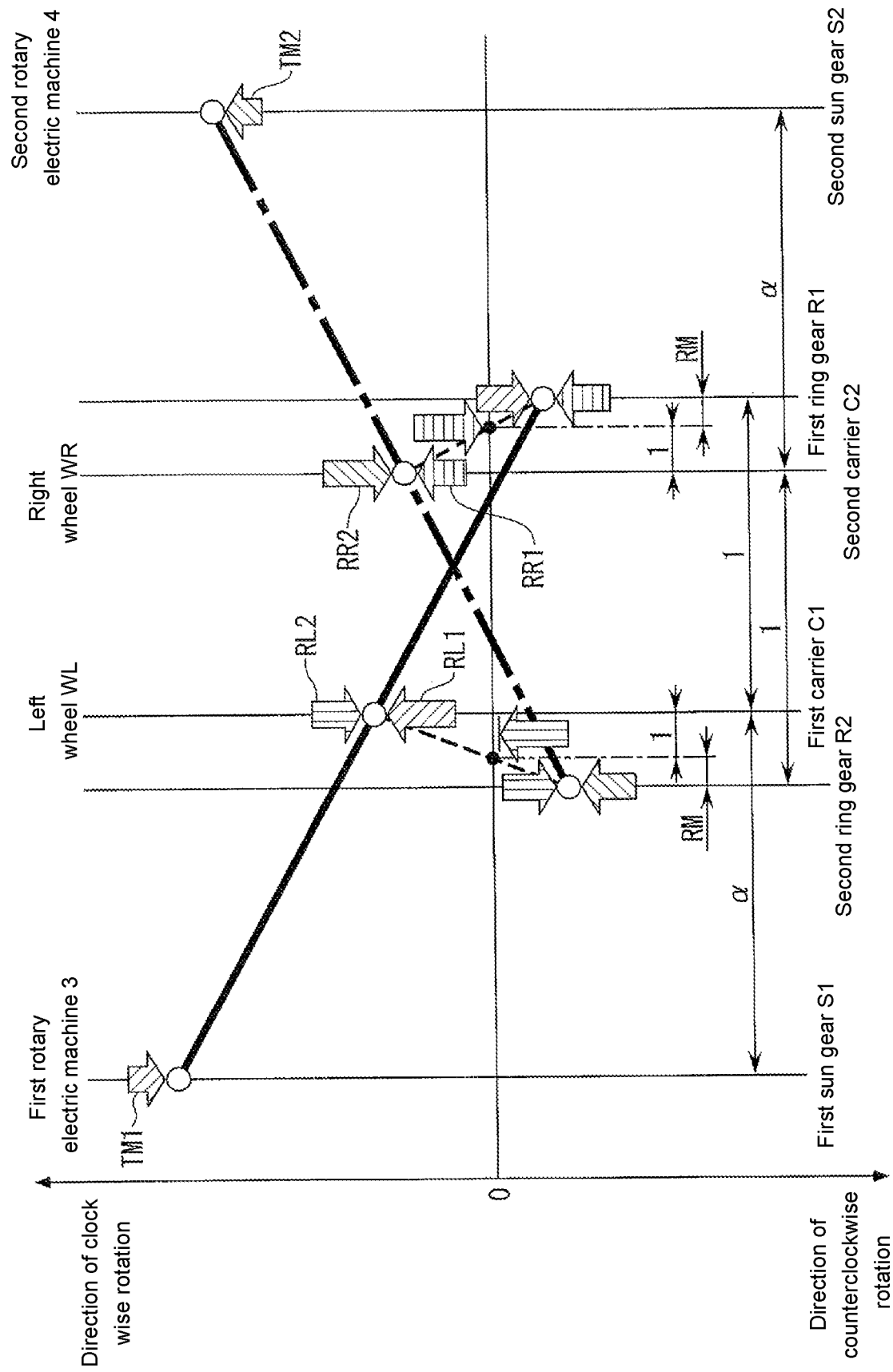
FIG. 28 is a collinear diagram showing a relationship of rotation speeds among various rotation elements of the power apparatus in FIG. 25 and a balancing relationship of torques with regard to a third torque distribution control used for decreasing right-yaw moment.

FIG. 28 shows the relationship of rotation speeds among various rotation elements and the balancing relationship of torques in this situation. In this situation, as seen from the comparison of FIG. 27 and FIG. 28, the left wheel transferred torque and the right wheel transferred torque TWL and TWR are represented by the following formulas (39) and (40) respectively.

$$TWL = -|RL1| + |RL2| \quad (39)$$
$$= -(1+\alpha)|TM1| + \alpha \times RM \times TM2$$

$$TWR = |RR2| - |RR1| \quad (40)$$
$$= (1+\alpha)TM2 - \alpha \times RM \times |TM1|$$

As seen from the formulas (39) and (40), and the relationship of |TM1|≥TM2, the braking torque and the driving torque act on the left wheel and the right wheel WL and WR respectively, or the driving torque of the left wheel WL is greater than the driving torque of the right wheel WR, as a result, the right-yaw moment of the vehicle decreases.

Besides, in the fourth torque distribution control for decreasing the right-yaw moment, regeneration is performed in the first rotary electric machine 3, and the zero torque control is performed on the second rotary electric machine 4. In this situation, only the first motor output torque TM1 serving as the braking torque is generated, so that as seen from the formulas (35) and (36), the left wheel transferred torque TWL is −(1+α)|TM1|, and the right wheel transferred torque TWR is −α×RM×|TM1|. Accordingly, the braking torque of the left wheel WL is greater than the braking torque of the right wheel WR, as a result, the right-yaw moment of the vehicle is decreased.

In addition, in order to decrease the right-yaw moment, the zero torque control is performed on the first rotary electric machine 3, and power running is performed in the second rotary electric machine 4. In this situation, only the second motor output torque TM2 is generated, so that as seen from the formulas (31) and (32), the left wheel transferred torque TWL is α×RM×TM2, and the right wheel transferred torque TWR is (1+α)TM2. Accordingly, the driving torque of the right wheel WR is greater than the driving torque of the left wheel WL, as a result, the right-yaw moment of the vehicle is decreased.

Besides, the corresponding relationship of various elements in the twelfth embodiment to various elements of the disclosure is similar to the first embodiment, except that the first gear 13a, the first output gear 7, the fifth gear 14a, the second output gear 8, and the left driving axis and the right driving axis SL and SR in the twelfth embodiment correspond to the transferring mechanism in the disclosure.

As mentioned above, according to the twelfth embodiment, as described with reference to FIG. 26 and so on, the rotation power of the first rotary electric machine and the second rotary electric machine 3 and 4 can be transferred to the left wheel and the right wheel WL and WR via the first planet gear unit and the second planet gear unit PS1 and PS2 to drive WL and WR. Besides, the torques of the left wheel and the right wheel WL and WR can be controlled in a way that the torques have the same magnitude or in a way that the torques have different magnitudes (a torque difference is generated).

Figure 41:
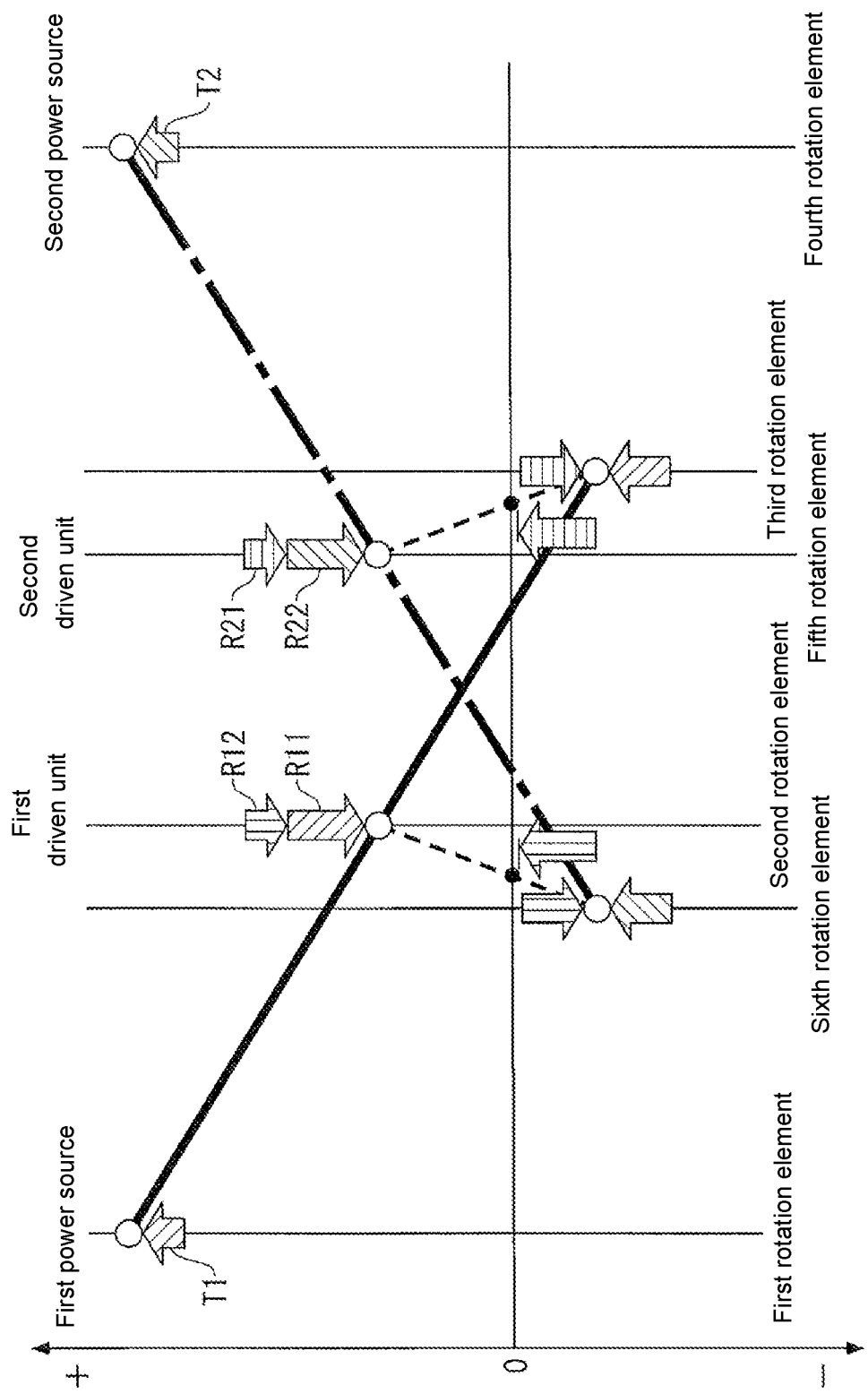
FIG. 41 is a collinear diagram showing a relationship of rotation speeds among various rotation elements of the power apparatus according to the invention of claim 2 and a balancing relationship of torques, with regard to a situation in which the second rotation element and the fifth rotation element are connected with the first driven unit and the second driven unit respectively.

Besides, as seen from the comparison of FIG. 26 with FIG. 41 which is used to describe the invention of claim 2, in the power apparatus 1K, if the rotating directions of the first carrier and the second carrier C1 and C2 connected respectively with the left wheel and the right wheel WL and WR are the same, the first sun gear S1 connected with the first rotary electric machine 3 rotates in the same rotating direction as the first carrier C1 at a rotation speed greater than that of the first carrier C1, and the second sun gear S2 connected with the second rotary electric machine 4 rotates in the same rotating direction as the second carrier C2 at a rotation speed greater than that of the second carrier C2. Therefore, a rotating direction inversion of either the first rotary electric machine or the second rotary electric machine 3 and 4 caused by the differential rotation of the left wheel and the right wheel WL and WR can be inhibited (prevented), by which 3 and 4 can be easily controlled.

Besides, as seen from FIG. 26, the reactive torque RL1 of the left wheel WL caused by the first motor output torque TM1, and the reactive torque RL2 of the left wheel WL caused by the second motor output torque TM2 both act on the direction opposite to the driving direction of the left wheel WL; and the reactive torque RR1 of the right wheel WR caused by the first motor output torque TM1, and the reactive torque RR2 of the right wheel WR caused by the second motor output torque TM2 both act on the direction opposite to the driving direction of the right wheel WR. Therefore, compared with the situation in which the second rotation element and the sixth rotation element are connected respectively with the third rotation element and the fifth rotation element to rotate integrally as in the related art (FIG. 40), the torque transferred to the left wheel and the right wheel WL and WR can be increased, so that the miniaturization of the first rotary electric machine and the second rotary electric machine 3 and 4 can be realized.

Furthermore, as seen from the collinear diagrams of FIG. 26 and so on which show the relationship of rotation speeds among various rotation elements, the rotation speeds of the first rotary electric machine and the second rotary electric machine 3 and 4 can be respectively maintained greater than the rotation speeds of the first carrier and the second carrier C1 and C2 connected with the left wheel and the right wheel WL and WR respectively, by which the efficiency of 3 and 4 can be raised. Besides, the effect of the first embodiment can also be achieved.

Next, a power apparatus 1L according to the thirteenth embodiment of the disclosure is described with reference to FIG. 29 to FIG. 32. Compared with the twelfth embodiment, the only difference of the power apparatus 1L is that the first output gear and the second output gear 7 and 8 engage with the eighth gear 14d of the second connecting mechanism 14 and the fourth gear 13d of the first connecting mechanism 13 respectively, instead of engaging with the first gear 13a of the first connecting mechanism 13 and the fifth gear 14a of the second connecting mechanism 14 respectively, and other structures are similar to the twelfth embodiment. In FIG. 29 to FIG. 32, the same symbols are given to structural elements similar to the first embodiment and the twelfth embodiment. In the following part, the description is centered on the aspect different from the twelfth embodiment.

As seen from the difference from the twelfth embodiment, the first ring gear R1 is connected with the left wheel WL via the eighth gear 14d, the first output gear 7 and the left driving axis SL, and the second ring gear R2 is connected with the right wheel WR via the fourth gear 13d, the second output gear 8 and the right driving axis. The teeth numbers of the first output gear and the second output gear 7 and 8 are smaller than the teeth numbers of the eighth gear and the fourth gear 14d and 13d respectively, and the gear ratio of the eighth gear 14d to the first output gear 7 and the gear ratio of the fourth gear 13d to the second output gear 8 are set to the same value.

According to the above, the rotation power transferred to the eighth gear and the fourth gear 14d and 13d, which are integral with the first ring gear and the second ring gear R1 and R2 respectively, is transferred to the left driving axis and the right driving axis SL and SR respectively in an accelerating state via the first output gear and the second output gear 7 and 8, and is further transferred to the left wheel and the right wheel WL and WR. The acceleration ratio of this situation is the same for the left wheel and the right wheel WL and WR.

As seen from the connecting relationship among the various rotation elements, without regard for the speed variation and the shift of rotating direction caused by the eighth gear 14d and the first output gear 7 as well as the fourth gear 13d and the second output gear 8, the rotation speed of the first ring gear R1 is equal to the rotation speed of the left wheel WL, and the rotation speed of the second ring gear R2 is equal to the rotation speed of the right wheel WR. Besides, the relationship of rotation speeds among other rotation elements is similar to the twelfth embodiment.

Figure 30:
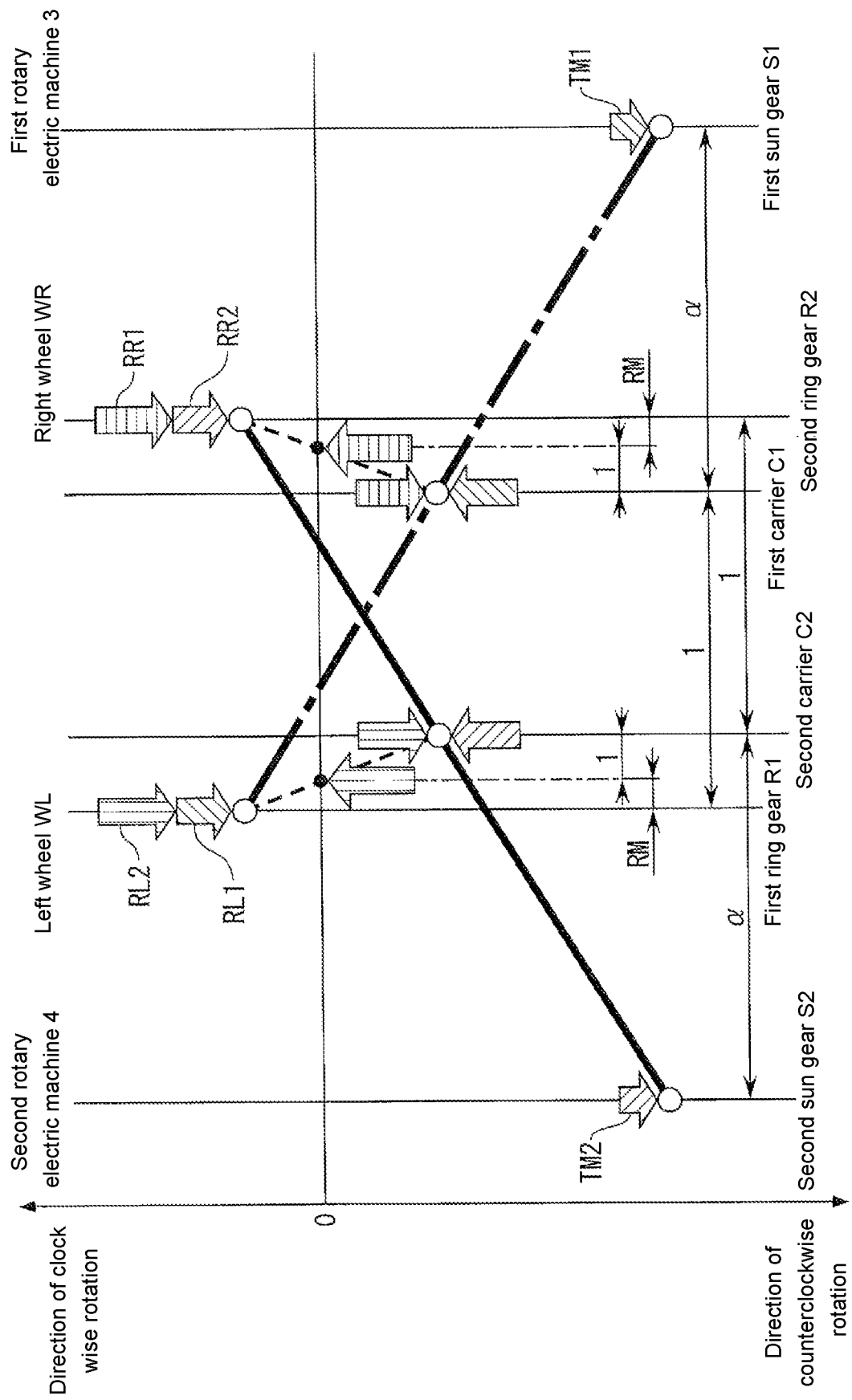
FIG. 30 is a collinear diagram showing a relationship of rotation speeds among various rotation elements of the power apparatus in FIG. 29 and a balancing relationship of torques with regard to a motor-assisted control.

According to the above, in the power apparatus 1L, the relationship of rotation speeds among various rotation elements is as shown in FIG. 30 for example. Various parameters (a, RM, TM1 and TM2, RL1, RL2, RR1, and RR2) in FIG. 30 are as described in the twelfth embodiment, and 0<RM<1.0. As seen from FIG. 30, the left wheel and the right wheel WL and WR can be in a reciprocal differential rotation.

Besides, similar to the situation of the second embodiment and the twelfth embodiment, the first rotary electric machine and the second rotary electric machine 3 and 4 are controlled by the ECU 2 (see FIG. 3), by which various operations of the power apparatus 1L are performed. In the following part, the motor-assisted control, the decelerating regeneration control, and the torque distribution control for increasing and decreasing the right-yaw moment contained in an operation different from the second embodiment and the twelfth embodiment, which are among the motor-assisted control, the EV driving control, the zero torque control, the decelerating regeneration control, and the torque distribution control for increasing and decreasing the left-yaw moment and the right-yaw moment contained in the operation of the power apparatus 1L during the straight running or revolving of the vehicle, are described with reference to FIG. 30 to FIG. 32, and description regarding other aspects is omitted. Besides, the description below is centered on the operation different from the second embodiment and the twelfth embodiment.

[During Straight Running]

Similar to the second embodiment and the twelfth embodiment, in the motor-assisted control implemented during the straight running of the vehicle, power running is performed in both the first rotary electric machine and the second rotary electric machine 3 and 4, and the electric power supplied from the battery 23 to the first rotary electric machine and the second rotary electric machine 3 and 4 is controlled. FIG. 30 shows an example of the relationship of rotation speeds among various rotation elements and the balancing relationship of torques in the motor-assisted control. As shown in FIG. 30, the rotating directions of the first rotary electric machine and the second rotary electric machine 3 and 4 are opposite to the rotating directions of the first ring gear and the second ring gear R1 and R2 connected with the left wheel and the right wheel WL and WR respectively.

Besides, as seen from the balancing relationship of torques shown in FIG. 30, the left wheel transferred torque and the right wheel transferred torque TWL and TWR are represented by the following formulas (41) and (42) respectively.

$$TWL = |RL1| + |RL2| = 60 \times TM1 + (1+\alpha)TM2/RM \tag{41}$$

$$TWR = |RR2| + |RR1| = 60 \times TM2 + (1+\alpha)TM1/RM \tag{42}$$

Besides, according to the formulas (41) and (42), the first motor output torque and the second motor output torque TM1 and TM2 are represented by the following formulas (43) and (44) respectively.

$$TM1 = \{[(1+\alpha)TWR/RM] - \alpha \times TWL\}/\{[(1+\alpha)^2/RM^2] - \alpha^2\} \tag{43}$$

$$TM2 = \{[(1+\alpha)TWL/RM] - \alpha \times TWR\}/\{[(1+\alpha)^2/RM^2] - \alpha^2\} \tag{44}$$

The electric power supplied to the first rotary electric machine and the second rotary electric machine 3 and 4 are controlled based on the formulas (43) and (44), in a way that the left wheel transferred torque and the right wheel transferred torque TWL and TWR become the same required torque. According to the above, the rotation power of the first rotary electric machine and the second rotary electric machine 3 and 4 is transferred to the left wheel and the right wheel WL and WR via the first planet gear unit and the second planet gear unit PS1 and PS2, by which the left wheel and the right wheel WL and WR are driven.

In addition, FIG. 30 is an example of the situation in which by controlling the rotating directions of the first rotary electric machine and the second rotary electric machine 3 and 4, the left wheel and the right wheel WL and WR are driven in a direction of clockwise rotation to make the vehicle run forward; and similar to the first embodiment, on the contrary, the left wheel and the right wheel WL and WR can also be driven in a direction of counterclockwise rotation to make the vehicle run backward.

Besides, similar to the second and the twelfth embodiment, in the decelerating regeneration control, regeneration is performed in the first rotary electric machine and the second rotary electric machine 3 and 4, and in this situation, the left wheel transferred torque and the right wheel transferred torque TWL and TWR are represented by the following formulas (45) and (46) respectively.

$$TWL = -\alpha \times |TM1| - (1+\alpha)|TM2|/RM \tag{45}$$

$$TWR = -\alpha \times |TM2| - (1+\alpha)|TM1|/RM \tag{46}$$

[During Revolving]

As seen from the difference between the formulas (41) to (46) and the formulas (21) to (26) described in the second embodiment, among the first torque distribution control to the fourth torque distribution control for increasing and decreasing the right-yaw moment which are performed during the rightward revolving in the advancing of the vehicle, the operations in the first torque distribution control and the second torque distribution control have different relationship formulas of torques, but the relationship formulas of torques are the same as the second embodiment. Therefore, description about these formulas is omitted, and the third torque distribution control and the fourth torque distribution control for increasing and decreasing the right-yaw moment are described in sequence below.

Figure 31:
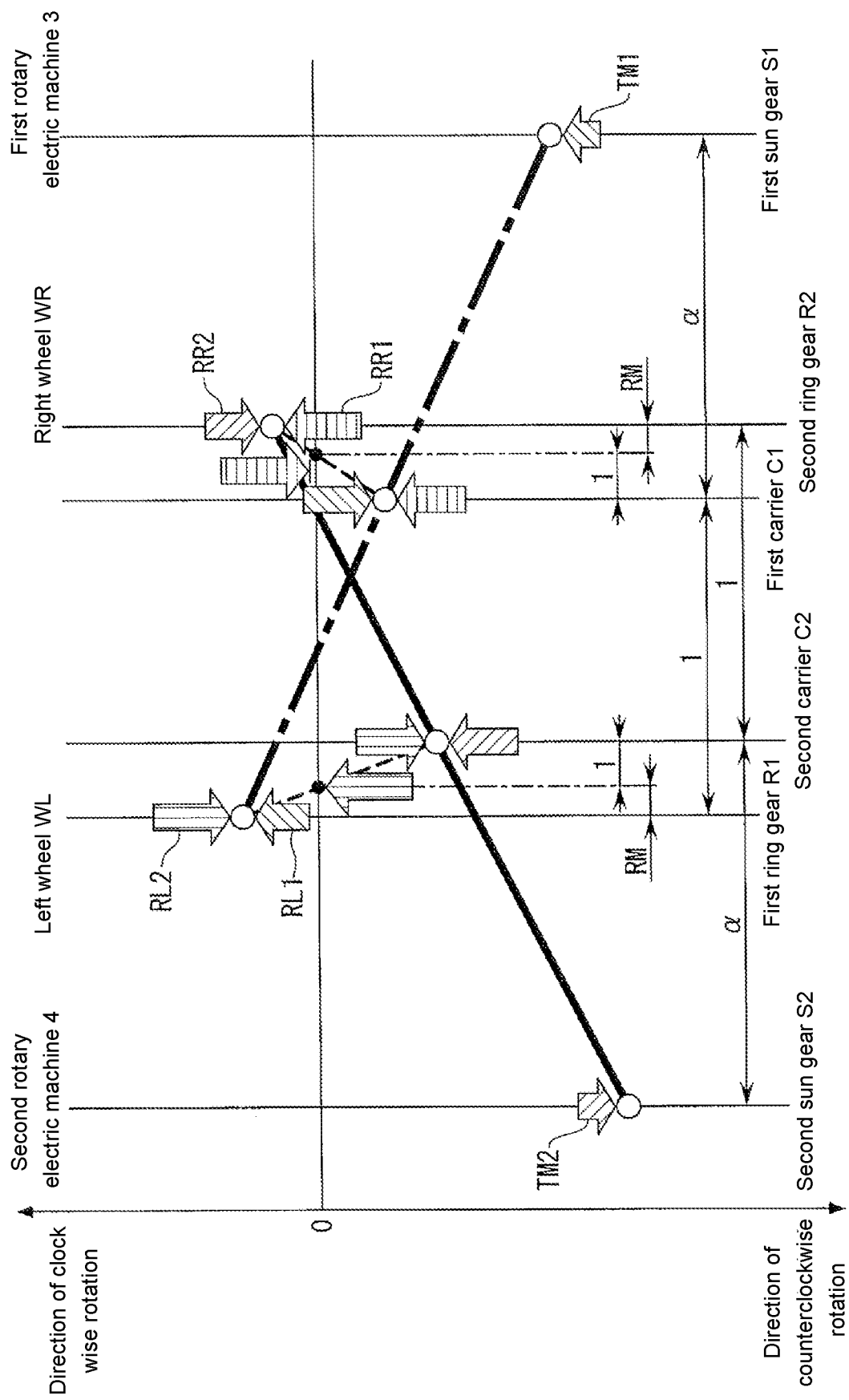
FIG. 31 is a collinear diagram showing a relationship of rotation speeds among various rotation elements of the power apparatus in FIG. 29 and a balancing relationship of torques with regard to a third torque distribution control used for increasing right-yaw moment.

In the third torque distribution control for increasing the right-yaw moment, regeneration is performed in the first rotary electric machine 3, power running is performed in the second rotary electric machine 4, and the regenerated electric power in the first rotary electric machine 3 and the electric power supplied to the second rotary electric machine 4 are controlled in a way that the second motor output torque TM2 is greater than the absolute value |TM1| of the first motor output torque. FIG. 31 shows the relationship of rotation speeds among various rotation elements and the balancing relationship of torques in this situation. In this situation, the left wheel transferred torque and the right wheel transferred torque TWL and TWR are represented by the following formulas (47) and (48) respectively.

$$TWL = -|RL1| + |RL2| \tag{47}$$
$$= -\alpha \times |TM1| + (1+\alpha)TM2/RM$$

-continued $$TWR = |RR2| - |RR1| \qquad (48)$$
$$= \alpha \times TM2 - (1 + \alpha)|TM1|/RM$$

As seen from the formulas (47) and (48), and TM2≥|TM|, the driving torque and the braking torque act on the left wheel and the right wheel WL and WR, or the driving torque of the left wheel WL is greater than the driving torque of the right wheel WR, as a result, the right-yaw moment of the vehicle increases.

Besides, in the fourth torque distribution control for increasing the right-yaw moment, regeneration is performed in the first rotary electric machine 3, and the zero torque control is performed on the second rotary electric machine 4. In this situation, only the first motor output torque TM1 serving as the braking torque is generated, so that as seen from the formulas (45) and (46), the left wheel transferred torque TWL is −α×|TM1|, and the right wheel transferred torque TWR is −(1+α)|TM1|/RM. Accordingly, the braking torque of the right wheel WR is greater than the braking torque of the left wheel WL, as a result, the right-yaw moment of the vehicle increases.

In addition, in order to increase the right-yaw moment, it may be that the zero torque control is implemented to the first rotary electric machine 3, and power running is performed in the second rotary electric machine 4. In this situation, only the second motor output torque TM2 is generated, so that as seen from the formulas (41) and (42), the left wheel transferred torque TWL is (1+α)TM2/RM, and the right wheel transferred torque TWR is α×TM2. Accordingly, the driving torque of the left wheel WL is greater than the driving torque of the right wheel WR, as a result, the right-yaw moment of the vehicle increases.

Figure 32:
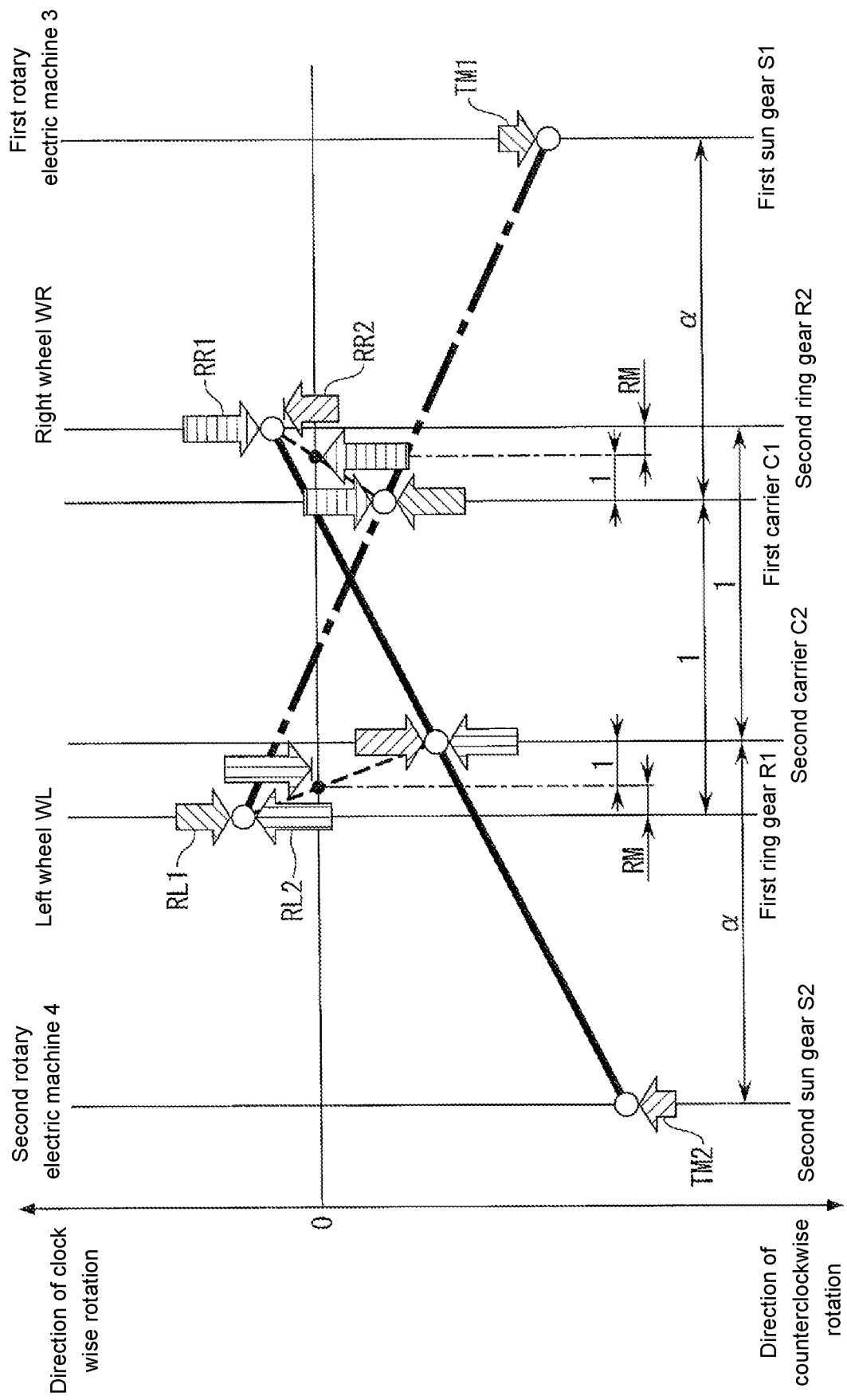
FIG. 32 is a collinear diagram showing a relationship of rotation speeds among various rotation elements of the power apparatus in FIG. 29 and a balancing relationship of torques with regard to a third torque distribution control used for decreasing right-yaw moment.

Besides, in the third torque distribution control for decreasing the right-yaw moment, power running is performed in the first rotary electric machine 3, regeneration is performed in the second rotary electric machine 4, and the electric power supplied to the first rotary electric machine 3 and the regenerated electric power in the second rotary electric machine 4 are controlled in a way that the first motor output torque TM1 is greater than the absolute value TM2 of the second motor output torque. FIG. 32 shows the relationship of rotation speeds among various rotation elements and the balancing relationship of torques in this situation. In this situation, as seen from the comparison of FIG. 31 and FIG. 32, the left wheel transferred torque and the right wheel transferred torque TWL and TWR are represented by the following formulas (49) and (50) respectively.

$$TWL = |RL1| - |RL2| \qquad (49)$$
$$= \alpha \times TM1 - (1 + \alpha)|TM2|/RM$$

$$TWR = -|RR2| + |RR1| \qquad (50)$$
$$= -\alpha \times |TM2| + (1 + \alpha)TM1/RM$$

As seen from the formulas (49) and (50), and TM1≥|TM2|, the braking torque and the driving torque act on the left wheel and the right wheel WL and WR respectively, or the driving torque of the right wheel WR is greater than the driving torque of the left wheel WL, as a result, the right-yaw moment of the vehicle decreases.

Besides, in the fourth torque distribution control for decreasing the right-yaw moment, the zero torque control is implemented to the first rotary electric machine 3, and regeneration is performed in the second rotary electric machine 4. In this situation, only the second motor output torque TM2 serving as the braking torque is generated, so that as seen from the formula (45) and (46), the left wheel transferred torque TWL is −(1+α)|TM2|/RM, and the right wheel transferred torque TWR is −α×|TM2|. Accordingly, the braking torque of the left wheel WL is greater than the braking torque of the right wheel WR, as a result, the right-yaw moment of the vehicle is decreased.

In addition, in order to decrease the right-yaw moment, it may be that power running is performed in the first rotary electric machine 3, and the zero torque control is implemented to the second rotary electric machine 4. In this situation, only the first motor output torque TM1 is generated, so that as seen from the formulas (41) and (42), the left wheel transferred torque TWL is α×TM1, and the right wheel transferred torque TWR is (1+α)TM1/RM. Accordingly, the driving torque of the right wheel WR is greater than the driving torque of the left wheel WL, as a result, the right-yaw moment of the vehicle is decreased.

Besides, the corresponding relationship of various elements in the thirteenth embodiment to various elements in the disclosure is similar to the twelfth embodiment, except that the eighth gear 14d, the first output gear 7, the fourth gear 13d, the second output gear 8, and the left driving axis and the right driving axis SL and SR in the thirteenth embodiment correspond to the transferring mechanism in the disclosure.

As mentioned above, according to the thirteenth embodiment, as described with reference to FIG. 30 and so on, the rotation power of the first rotary electric machine and the second rotary electric machine 3 and 4 can be transferred to the left wheel and the right wheel WL and WR via the first planet gear unit and the second planet gear unit PS1 and PS2 to drive WL and WR. Besides, the torque of the left wheel and the right wheel WL and WR can be controlled in a way that the torques have the same magnitude or in a way that the torques have different magnitudes (a torque difference is generated).

Figure 42:
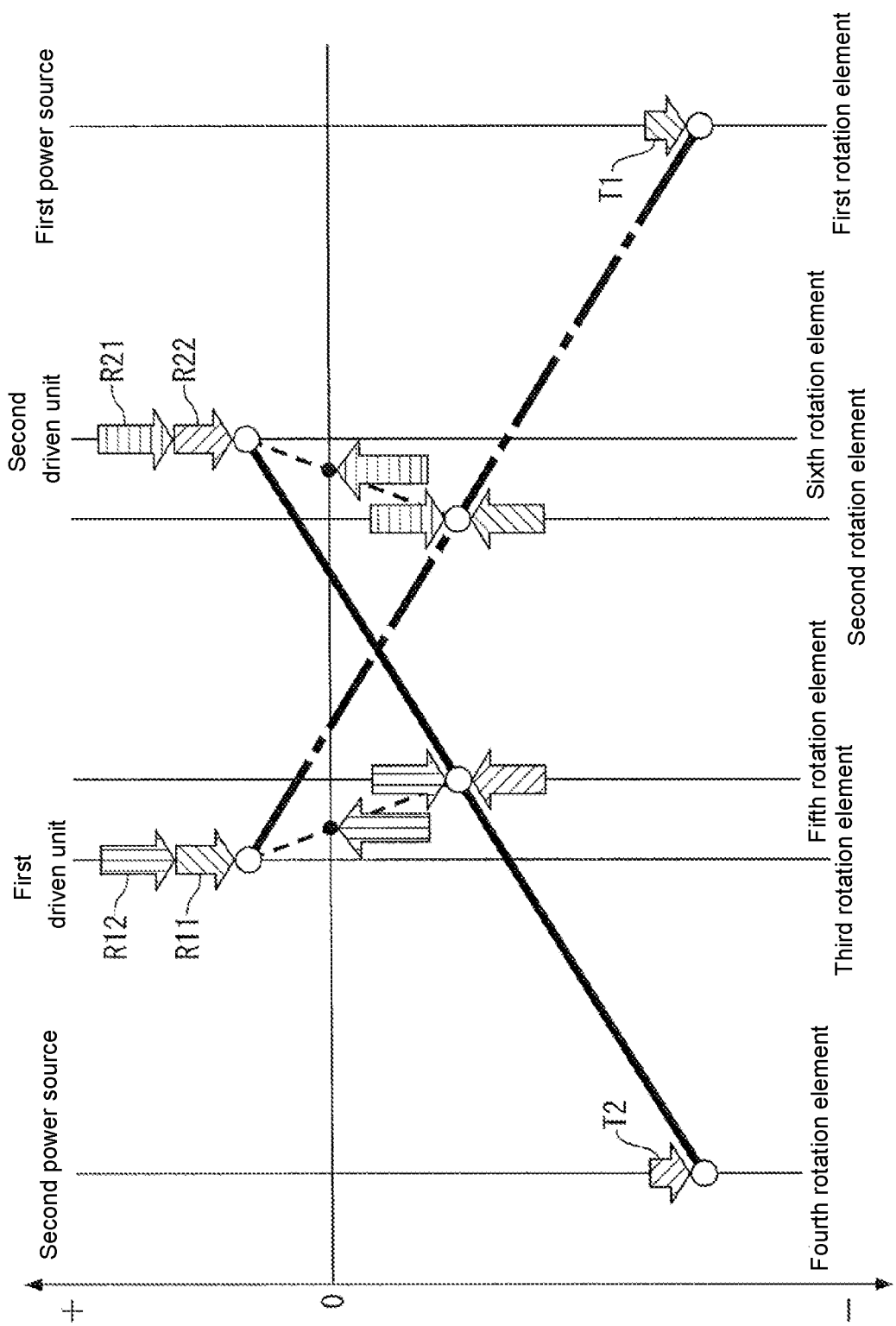
FIG. 42 is a collinear diagram showing a relationship of rotation speeds among various rotation elements of the power apparatus according to the invention of claim 2 and a balancing relationship of torques, with regard to a situation in which the third rotation element and the sixth rotation element are connected with the first driven unit and the second driven unit respectively.

Besides, as seen from the comparison of FIG. 30 and FIG. 42 which is used to described the invention of claim 2, in the power apparatus 1L, if the rotating directions of the first carrier and the second carrier C1 and C2 connected respectively with the left wheel and the right wheel WL and WR are the same, the first sun gear S1 connected with the first rotary electric machine 3 rotates in the same rotating direction as the first carrier C1 at a rotation speed greater than that of the first carrier C1, and the second sun gear S2 connected with the second rotary electric machine 4 rotates in the same rotating direction as the second carrier C2 at a rotation speed greater than that of the second carrier C2. Therefore, a rotating direction inversion of either the first rotary electric machine or the second rotary electric machine 3 and 4 caused by the differential rotation of the left wheel and the right wheel WL and WR can be inhibited (prevented), by which 3 and 4 can be easily controlled.

Besides, as seen from FIG. 30, the reactive torque RL1 of the left wheel WL caused by the first motor output torque TM1, and the reactive torque RL2 of the left wheel WL caused by the second motor output torque TM2 both act on the direction opposite to the driving direction of the left wheel WL; and the reactive torque RR1 of the right wheel WR caused by the first motor output torque TM1, and the reactive torque RR2 of the right wheel WR caused by the second motor output torque TM2 both act on the direction opposite to the driving direction of the right wheel WR. Therefore, compared with the situation in which the second rotation element and the sixth rotation element are connected respectively with the third rotation element and the fifth rotation element to rotate integrally as in the related art (FIG. 40), the torque transferred to the left wheel and the right wheel WL and WR can be increased, so that the miniaturization of the first rotary electric machine and the second rotary electric machine 3 and 4 can be realized.

Furthermore, as seen from the collinear diagrams of FIG. 30 and so on which show the relationship of rotation speeds among various rotation elements, the absolute value of the rotation speeds of the first rotary electric machine and the second rotary electric machine 3 and 4 can be maintained respectively greater than the absolute value of rotation speeds of the first carrier and the second carrier C1 and C2 connected with the left wheel and the right wheel WL and WR respectively, by which the efficiency of 3 and 4 can be raised. Besides, the effect of the first embodiment can also be achieved.

In addition, as for the twelfth embodiment, the first input gear and the second input gear 9 and 10 as well as the first idler gear and the second idler gear may be used to connect the first carrier and the second carrier C1 and C2 with the left wheel and the right wheel WL and WR, as described in the third embodiment. The same is true with the connection between the left wheel and the right wheel WL and WR with the first ring gear and the second ring gear R1 and R2 in the thirteenth embodiment.

Figure 33:
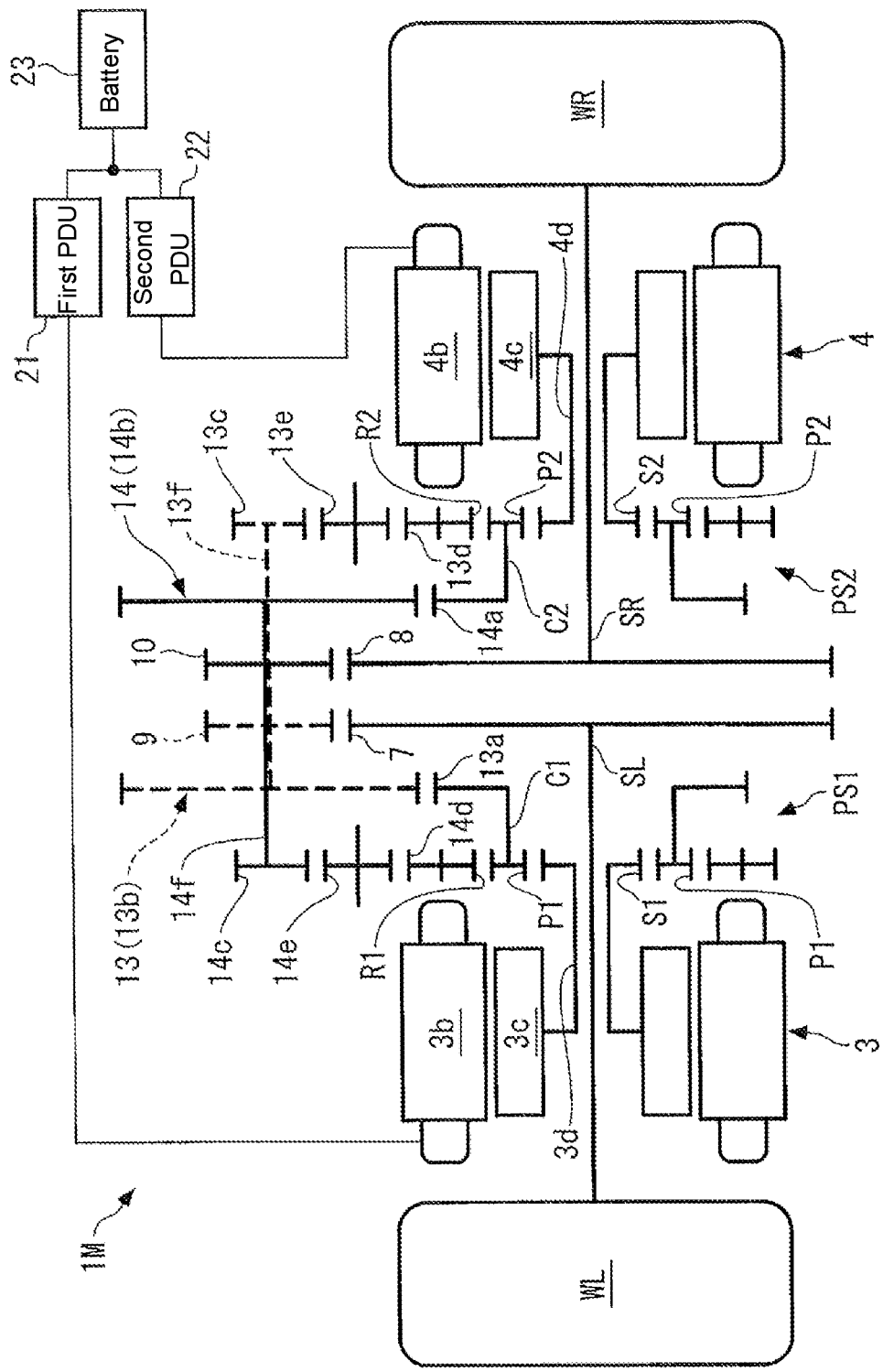
FIG. 33 is a skeleton diagram showing a power apparatus according to a fourteenth embodiment of the disclosure as well as the left wheel and the right wheel of a vehicle to which the power apparatus is applied.

Next, a power apparatus 1M according to the fourteenth embodiment of the disclosure is described with reference to FIG. 33. The power apparatus 1M uses the first connecting mechanism and the second connecting mechanism 13 and 14 of the twelfth embodiment in the power apparatus 1C of the fourth embodiment (FIG. 12), instead of using the first connecting mechanism and the second connecting mechanism 5 and 6. In FIG. 33, the same symbols are given to structural elements similar to the fourth embodiment and the twelfth embodiment. In the following part, the description is centered on the aspect different from the fourth embodiment and the twelfth embodiment.

As seen from FIG. 33, the first gear 13a of the first connecting mechanism 13 and the fifth gear 14a of the second connecting mechanism 14, which are described in the twelfth embodiment, are respectively disposed integrally with the hollow-shaped first carrier and second carrier C1 and C2 described in the fourth embodiment. Besides, the first input gear and the second input gear 9 and 10 described in the fourth embodiment are respectively disposed integrally with the first rotation axis 13f of the first connecting mechanism 13 and the second rotation axis 14f of the second connecting mechanism 14. That is, the first input gear 9 is disposed coaxially with the second gear and the third gear 13b and 13c of the first connecting mechanism 13, besides, the second input gear 10 is disposed coaxially with the sixth gear and the seventh gear 14b and 14c of the second connecting mechanism 14. Besides, the first input gear 9 is disposed between the second gear 13b and the third gear 13c, and the second input gear 10 is disposed between the sixth gear 14b and the seventh gear 14c.

Furthermore, different from the twelfth embodiment, the first output gear and the second output gear 7 and 8 do not engage with the first gear and the fifth gear 13a and 14a, but engage with the first input gear and the second input gear 9 and 10 respectively as in the fourth embodiment. Besides, similar to the fourth embodiment, the first sun gear and the second sun gear S1 and S2 are disposed integrally with the first output axis 3d of the first rotary electric machine 3 and the second output axis 4d of the second rotary electric machine 4 respectively.

In addition, the position relationship among the first rotation axis 13f, the second gear 13b, the first input gear 9, the second rotation axis 14f, the sixth gear 14b, and the second input gear 10 is similar to the position relationship among the first rotation axis 5e, the second gear 5b, the first input gear 9, the second rotation axis 6e, the sixth gear 6b, and the second input gear 10 in the fourth embodiment which is described using FIG. 13 and FIG. 14, so that detailed description is omitted. Besides, in FIG. 33, the first input gear 9 is represented by a dashed line in order to show that the first input gear 9 is disposed integrally with the first rotation axis 13f.

According to the above structure, the first carrier C1 is connected with the left wheel WL via the first gear 13a, the second gear 13b, the first rotation axis 13f, the first input gear 9, the first output gear 7, and the left driving axis SL. The teeth numbers of the first gear 13a, the second gear 13b, the first input gear 9, and the first output gear 7 are set in a way that the rotation power transferred to the first gear 13a which is integral with the first carrier C1 is transferred to the first output gear 7 in a decelerating state.

Besides, the second carrier C2 is connected with the right wheel WR via the fifth gear 14a, the sixth gear 14b, the second rotation axis 14f, the second input gear 10, the second output gear 8, and the right driving axis SR. The teeth numbers of the fifth gear 14a, the sixth gear 14b, the second input gear 10, and the second output gear 8 are set in a way that the rotation power transferred to the fifth gear 14a which is integral with the second carrier C2 is transferred to the second output gear 8 in a decelerating state, and the deceleration ratio is set to the same value as the deceleration ratio determined by the first gear 13a, the second gear 13b, the first input gear 9, and the first output gear 7.

As seen from the connecting relationship among the various rotation elements, without regard for the speed variation caused by the first gear 13a, the second gear 13b, the first input gear 9, and the first output gear 7, the rotation speed of the first carrier C1 is equal to the rotation speed of the left wheel WL. Besides, without regard for the speed variation caused by the fifth gear 14a, the sixth gear 14b, the second input gear 10, and the second output gear 8, the rotation speed of the second carrier C2 is equal to the rotation speed of the right wheel WR. The relationship of rotation speeds among other rotation elements is similar to the twelfth embodiment. According to the above, similar to the situation of the twelfth embodiment, the relationship of rotation speeds among various rotation elements in the power apparatus 1M is as shown in FIG. 26, FIG. 27, or FIG. 28 for example.

Besides, similar to the situation of the twelfth embodiment, the first rotary electric machine and the second rotary electric machine 3 and 4 are controlled by the ECU 2 (see FIG. 3), by which various operations of the power apparatus 1M are performed.

As mentioned above, according to the fourteenth embodiment, the first rotary electric machine and the second rotary electric machine 3 and 4, the left driving axis and the right driving axis SL and SR, as well as the first planet gear unit and the second planet gear unit PS1 and PS2 are formed as in the fourth embodiment, so that the whole power apparatus 1M can be miniaturized in the radial direction. Besides, the first input gear 9 is disposed coaxially with the second gear and the third gear 13b and 13c of the first connecting mechanism 13, and the second input gear 10 is disposed coaxially with the sixth gear and the seventh gear 14*b* and 14*c* of the second connecting mechanism 14, so that the whole power apparatus 1M can be further miniaturized in the radial direction. Besides, the effect of the twelfth embodiment can also be achieved.

Figure 34:
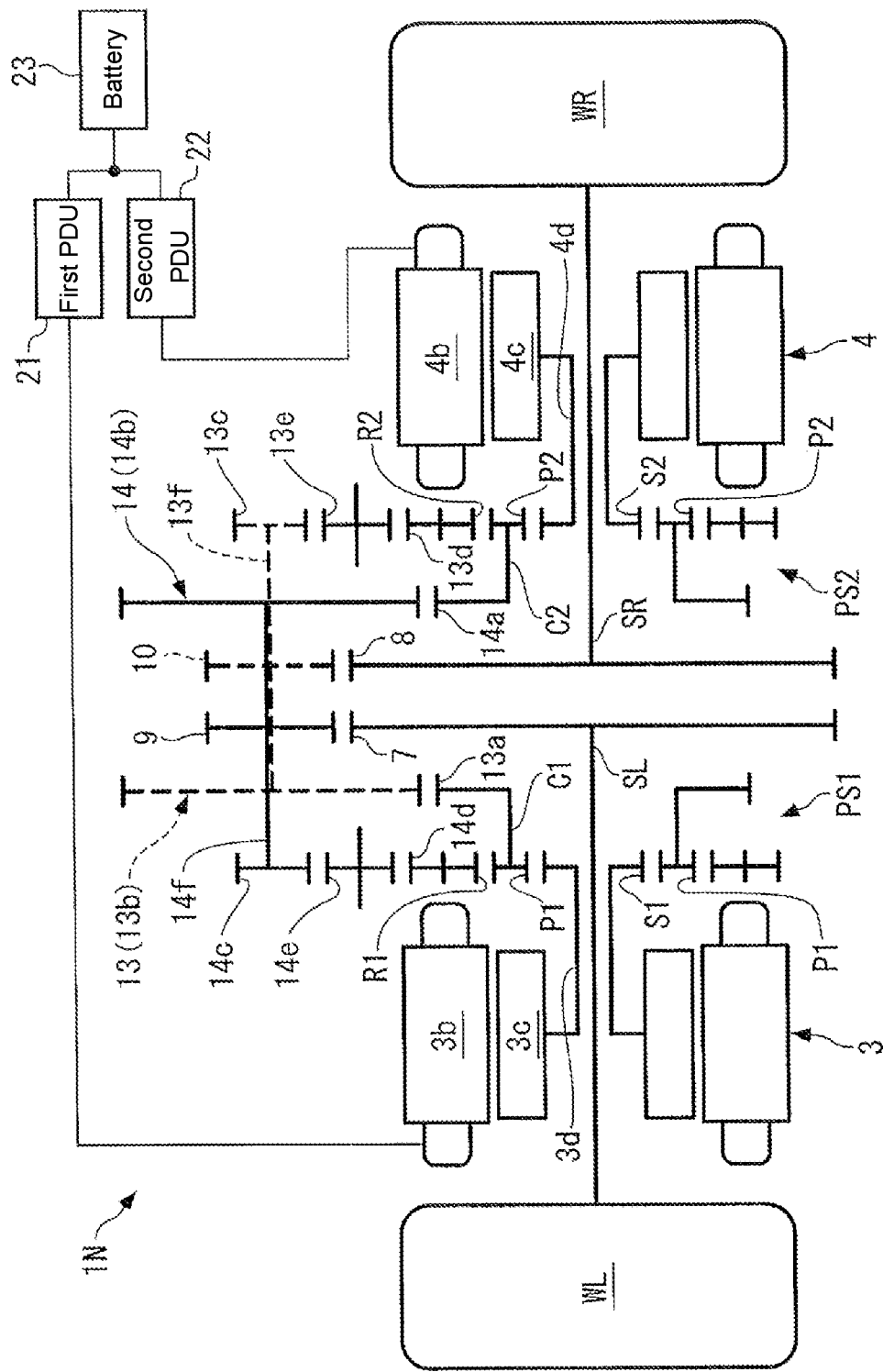
FIG. 34 is a skeleton diagram showing a power apparatus according to a fifteenth embodiment of the disclosure as well as the left wheel and the right wheel of a vehicle to which the power apparatus is applied.

Next, a power apparatus 1N according to the fifteenth embodiment of the disclosure is described with reference to FIG. 34. Compared with the fourteenth embodiment, the only difference of the power apparatus 1N is that the first input gear and the second input gear 9 and 10 are disposed integrally with the second rotation axis 14*f* of the second connecting mechanism 14 and the first rotation axis 13*f* of the first connecting mechanism 13 respectively. That is, the first input gear 9 is disposed coaxially with the sixth gear and the seventh gear 14*b* and 14*c* of the second connecting mechanism 14, and the second input gear 10 is disposed coaxially with the second gear and the third gear 13*b* and 13*c* of the first connecting mechanism 13.

Besides, the first input gear 9 is disposed between the second gear 13*b* and the third gear 13*c*, and the second input gear 10 is disposed between the sixth gear 14*b* and the seventh gear 14*c*. In FIG. 34, the second input gear 10 is represented by a dashed line to show that the second input gear 10 is disposed integrally with the first rotation axis 13*f*.

According to the above, the first ring gear R1 is connected with the left wheel WL via the eighth gear 14*d*, the second middle gear 14*e*, the seventh gear 14*c*, the second rotation axis 14*f*, the first input gear 9, the first output gear 7, and the left driving axis SL. The teeth numbers of the eighth gear 14*d*, the seventh gear 14*c*, the first input gear 9, and the first output gear 7 are set in a way that the rotation power transferred to the eighth gear 14*d* which is integral with the first ring gear R1 is transferred to the first output gear 7 in a decelerating state.

Besides, the second ring gear R2 is connected with the right wheel WR via the fourth gear 13*d*, the first middle gear 13*e*, the third gear 13*c*, the first rotation axis 13*f*, the second input gear 10, the second output gear 8, and the right driving axis SR. The teeth numbers of the fourth gear 13*d*, the third gear 13*c*, the second input gear 10, and the second output gear 8 are set in a way that the rotation power transferred to the fourth gear 13*d* which is integral with the second ring gear R2 is transferred to the second output gear 8 in a decelerating state, and the deceleration ratio is set the same value as the deceleration ratio determined by the eighth gear 14*d*, the seventh gear 14*c*, the first input gear 9, and the first output gear 7.

As seen from the connecting relationship among the various rotation elements, without regard for the speed variation and the shift of rotating direction caused by the eighth gear 14*d*, the second middle gear 14*e*, the seventh gear 14*c*, the first input gear 9, and the first output gear 7, the rotation speed of the first ring gear R1 is equal to the rotation speed of the left wheel WL. Besides, without regard for the speed variation and the shift of rotating direction caused by the fourth gear 13*d*, the first middle gear 13*e*, the third gear 13*c*, the second input gear 10, and the second output gear 8, the rotation speed of the second ring gear R2 is equal to the rotation speed of the right wheel WR. The relationship of rotation speeds among other rotation elements is similar to the fourteenth embodiment, and similar to the thirteenth embodiment. According to the above, the relationship of rotation speeds among various rotation elements in the power apparatus 1N is similar to the situation of the thirteenth embodiment, and is as shown in FIG. 30, FIG. 31, or FIG. 32 for example.

Besides, similar to the situation of the thirteenth embodiment, the first rotary electric machine and the second rotary electric machine 3 and 4 are controlled by the ECU 2 (see FIG. 3), by which various operations of the power apparatus 1N are performed. As mentioned above, according to the fifteenth embodiment, the effect of the thirteenth embodiment and the fourteenth embodiment can also be achieved.

In addition, as for the fourteenth embodiment, the first carrier and the second carrier C1 and C2 may also be connected with the left wheel and the right wheel WL and WR respectively by the first input gear and the second input gear 11 and 12 described in the sixth embodiment to the eighth embodiment, instead of by the first input gear and the second input gear 9 and 10. The same is true with the connection of the left wheel and the right wheel WL and WR with the first ring gear and the second ring gear R1 and R2 in the fifteenth embodiment.

Besides, in the first embodiment to the eighth embodiment and the twelfth embodiment to the fifteenth embodiment, the first sun gear and the second sun gear S1 and S2 are connected with the first rotary electric machine and the second rotary electric machine 3 and 4 respectively to rotate integrally; however, the connection may be done via the gears and so on to make the rotation speeds or the rotating directions different from each other.

Figure 35:
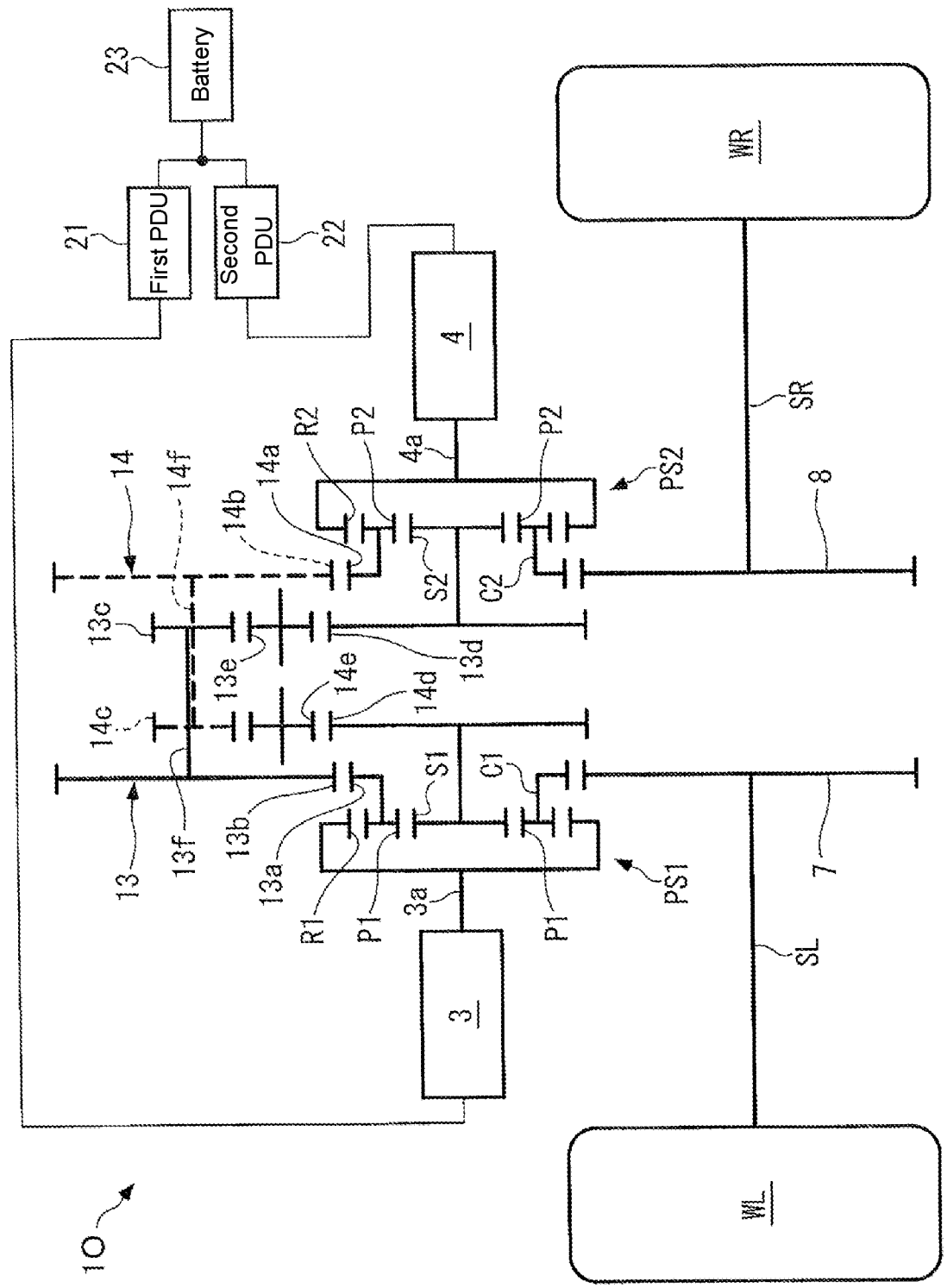
FIG. 35 is a skeleton diagram showing a power apparatus according to a sixteenth embodiment of the disclosure as well as the left wheel and the right wheel of a vehicle to which the power apparatus is applied.

Next, a power apparatus 1O according to the sixteenth embodiment of the disclosure is described with reference to FIG. 35. Compared with the twelfth embodiment (FIG. 25), the difference of the power apparatus 1O is that the connecting relationship of the first sun gear S1 and the first ring gear R1 of the first planet gear unit PS1 is opposite to the connecting relationship in the twelfth embodiment, and the connecting relationship of the second sun gear S2 and the second ring gear R2 of the second planet gear unit PS2 is also the opposite. In other words, the power apparatus 1O is formed by using the first connecting mechanism and the second connecting mechanism 13 and 14 of the twelfth embodiment in the power apparatus 1H of the ninth embodiment (FIG. 21), instead of using the first connecting mechanism and the second connecting mechanism 5 and 6. In FIG. 35, the same symbols are given to the structural elements similar to the ninth embodiment and the twelfth embodiment. In the following part, the description is centered on the aspect different from the twelfth embodiment.

In the power apparatus 1K according to the twelfth embodiment, the first sun gear S1 is connected with the first rotary electric machine 3, and the first ring gear R1 is connected with the second connecting mechanism 14, while in the power apparatus 1O according to the sixteenth embodiment, on the contrary, the first sun gear S1 is connected with the second connecting mechanism 14, and the first ring gear R1 is connected with the first rotary electric machine 3.

Specifically speaking, the first ring gear R1 is connected with the first output axis 3*a* of the first rotary electric machine 3 via a hollow rotation axis or a flange to rotate integrally. Besides, the eighth gear 14*d* of the second connecting mechanism 14 is connected with the first sun gear S1 via a rotation axis to rotate integrally. The first carrier C1 of the first planet gear unit PS1 is formed by a combination of a plurality of spindles supporting the first pinion gear P1 with a hollow rotation axis, and similar to the twelfth embodiment, the first gear 13*a* of the hollow-shaped first connecting mechanism 13 is disposed integrally with the first carrier C1.

Besides, as described in the twelfth embodiment, in the first connecting mechanism 13, the second gear 13*b* engages with the first gear 13*a*, and the second gear and the third gear 13*b* and 13*c* are connected with each other via the first rotation axis 13*f* to rotate integrally. Furthermore, the third gear 13*c* engages with the first middle gear 13*e*, and the first middle gear 13*e* engages with the fourth gear 13*d*. The fourth gear and the eighth gear 13*d* and 14*d* are disposed between the first planet gear unit PS1 and the second planet gear unit PS2, the fourth gear 13*d* is disposed on the side near the second planet gear unit PS2, and the eighth gear 14*d* is disposed on the side near the first planet gear unit PS1.

Besides, in the power apparatus 1K according to the twelfth embodiment, the second sun gear S2 is connected with the second rotary electric machine 4, and the second ring gear R2 is connected with the first connecting mechanism 13, while in the power apparatus 1O according to the sixteenth embodiment, on the contrary, the second sun gear S2 is connected with the first connecting mechanism 13, and the second ring gear R2 is connected with the second rotary electric machine 4.

Specifically speaking, the second ring gear R2 is connected with the second output axis 4*a* of the second rotary electric machine 4 via a hollow rotation axis or a flange to rotate integrally. Besides, the fourth gear 13*d* is connected with the second sun gear S2 via a rotation axis to rotate integrally. The second carrier C2 of the second planet gear unit PS2 is formed by a combination of a plurality of spindles supporting the second pinion gear P2 with a hollow rotation axis, and similar to the twelfth embodiment, the fifth gear 14*a* of the hollow-shaped second connecting mechanism 14 is disposed integrally with the second carrier C2.

Besides, as described in the twelfth embodiment, in the second connecting mechanism 14, the sixth gear 14*b* engages with the fifth gear 14*a*, and the sixth gear and the seventh gear 14*b* and 14*c* are connected with each other via the second rotation axis 14*f* to rotate integrally. Furthermore, the seventh gear 14*c* engages with the second middle gear 14*e*, and the second middle gear 14*e* engages with the eighth gear 14*d*. Furthermore, the first rotation axis and the second rotation axis 13*f* and 14*f* are disposed on different positions on the outer peripheral circles of the first planet gear unit and the second planet gear unit PS1 and PS2.

In addition, in FIG. 35, in order to show that the first rotation axis and the second rotation axis 13*f* and 14*f* are disposed on different positions on the outer peripheral circles of the first planet gear unit and the second planet gear unit PS1 and PS2 as in FIG. 25, the second rotation axis 14*f*, the sixth gear and the seventh gear 14*b* and 14*c* are represented by dashed lines, the first rotation axis 13*f* is drawn to be staggered from the second rotation axis 14*f*, and be eccentric from the second gear and the third gear 13*b* and 13*c* which are integral with the first rotation axis 13*f*; however, the gears 13*b* and 13*c* are actually disposed coaxially and integrally with the first rotation axis 13*f*. The same is true with the skeleton diagram (FIG. 37) of the following seventeenth embodiment.

As seen from the above structure, the first carrier C1 is connected with the second sun gear S2 via the first gear and the second gear 13*a* and 13*b*, the first rotation axis 13*f*, the third gear 13*c*, the first middle gear 13*e*, as well as the fourth gear 13*d*, by which the rotating directions of C1 and S2 are opposite to each other. Besides, the teeth numbers of the first gear to the fourth gear 13*a* to 13*d* are set in a way that the absolute value of the rotation speed of the first carrier C1 is greater than the absolute value of the rotation speed of the second sun gear S2.

The second carrier C2 is connected with the first sun gear S1 via the fifth gear and the sixth gear 14*a* and 14*b*, the second rotation axis 14*f*, the seventh gear 14*c*, the second middle gear 14*e*, as well as the eighth gear 14*d*, by which the rotating directions of C2 and S1 are opposite to each other. Besides, the teeth numbers of the fifth gear to the eighth gear 14*a* to 14*d* are set in a way that the absolute value of the rotation speed of the second carrier C2 is greater than the absolute value of the rotation speed of the first sun gear S1. Furthermore, the gear ratio of the first gear 13*a* to the second gear 13*b* and the gear ratio of the fifth gear 14*a* to the sixth gear 14*b* are set to the same value, and the gear ratio of the third gear 13*c* to the fourth gear 13*d* and the gear ratio of the seventh gear 14*c* to the eighth gear 14*d* are set to the same value.

As mentioned above, the first ring gear and the second ring gear R1 and R2 are connected respectively with the first output axis 3*a* of the first rotary electric machine 3 and the second output axis 4*a* of the second rotary electric machine 4 to rotate integrally. Besides, the first carrier C1 and the second sun gear S2 are connected with each other by the first connecting mechanism 13 in a way that the rotating directions of C1 and S2 are opposite to each other, and the absolute value of the rotation speed of C1 is greater than the absolute value of the rotation speed of S2. Furthermore, the second carrier C2 and the first sun gear S1 are connected with each other by the second connecting mechanism 14 in a way that the rotating directions of C2 and S1 are opposite to each other, and the absolute value of the rotation speed of C2 is greater than the absolute value of the rotation speed of S1.

Besides, similar to the situation of the twelfth embodiment, the first carrier C1 is connected with the left wheel WL via the first gear 13*a*, the first output gear 7 and the left driving axis SL, and the second carrier C2 is connected with the right wheel WR via the fifth gear 14*a*, the second output gear 8 and the right driving axis SR. In this way, the rotation power transferred to the first gear and the fifth gear 13*a* and 14*a* which are integral with the first carrier and the second carrier C1 and C2 respectively are transferred to the left wheel and the right wheel WL and WR at the same deceleration ratio in a decelerating state.

As described in the first embodiment, the rotation speeds of the first sun gear S1, the first carrier C1 and the first ring gear R1 satisfy a collinear relationship, and the rotation speeds of the second sun gear S2, the second carrier C2 and the second ring gear R2 satisfy a collinear relationship. Besides, without regard for the speed variation and the shift of rotating direction caused by the first gear 13*a* and the first output gear 7 as well as the fifth gear 14*a* and the second output gear 8, the rotation speed of the first carrier C1 is equal to the rotation speed of the left wheel WL, and the rotation speed of the second carrier C2 is equal to the rotation speed of the right wheel WR. According to these facts and the structure of the power apparatus 1O described above, the relationship of rotation speeds among various rotation elements is as shown in FIG. 36 for example.

Figure 36:
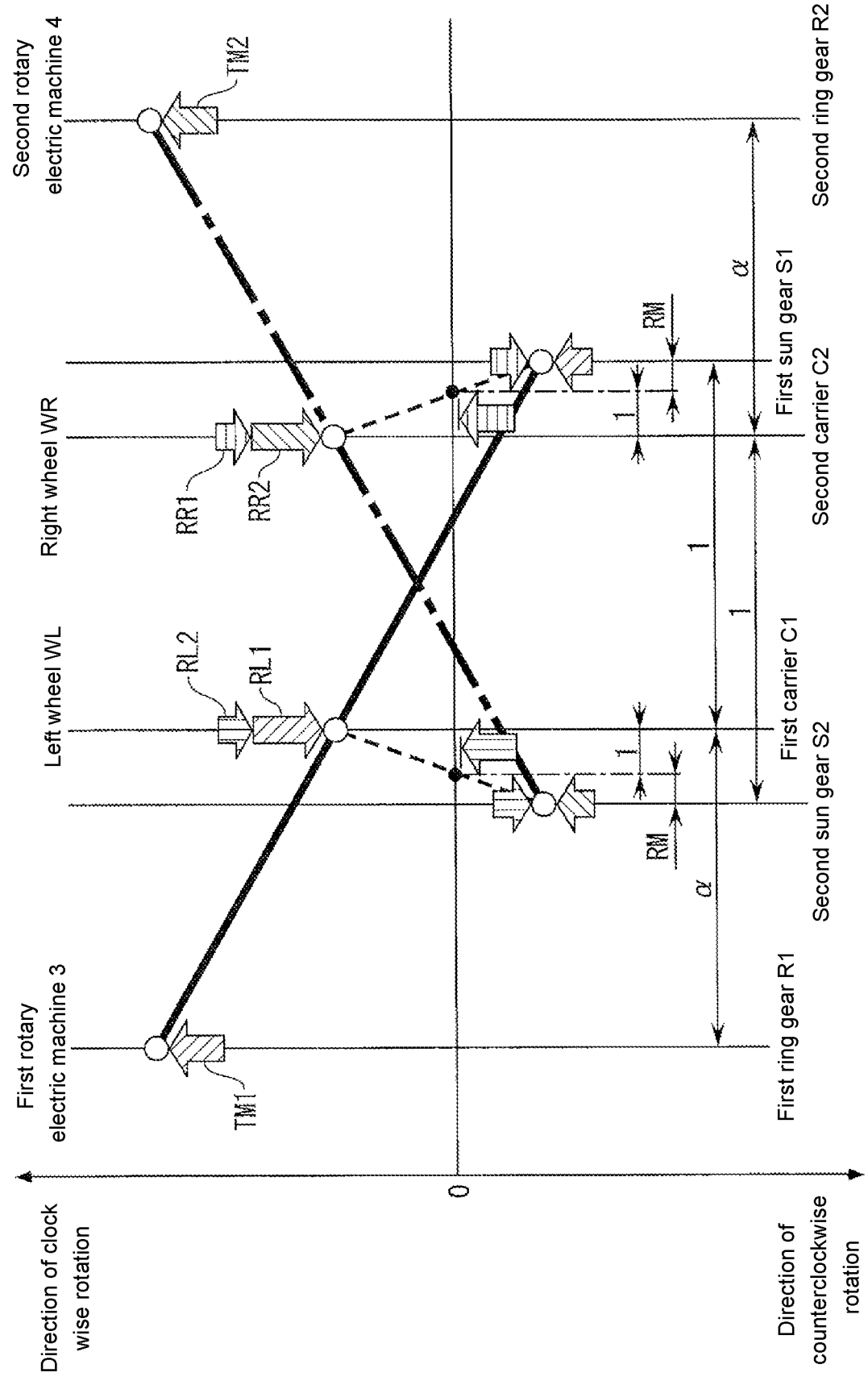
FIG. 36 is a collinear diagram showing a relationship of rotation speeds among various rotation elements of the power apparatus in FIG. 35 and a balancing relationship of torques with regard to a motor-assisted control.

In FIG. 36, different from the twelfth embodiment and similar to the ninth embodiment, a is the ratio of the teeth number of the first sun gear S1/the teeth number of the first ring gear R1, and is the ratio of the teeth number of the second sun gear S2/the teeth number of the second ring gear R2. RM is as described in the twelfth embodiment. As seen from FIG. 36, the left wheel and the right wheel WL and WR can be in a reciprocal differential rotation. Besides, similar to the twelfth embodiment, the first rotary electric machine and the second rotary electric machine 3 and 4 are controlled by the ECU 2, by which various operations of the power apparatus 1O are performed.

In addition, FIG. 36 shows an example of the relationship of rotation speeds among various rotation elements and the balancing relationship of torques in the motor-assisted control implemented as in the twelfth embodiment during the straight running of the vehicle. As shown in FIG. 36, similar to the situation of the twelfth embodiment (FIG. 26), the rotating directions of the first rotary electric machine and the second rotary electric machine 3 and 4 are the same directions as the rotating directions of the first carrier and the second carrier C1 and C2 which are connected with the left wheel and the right wheel WL and WR respectively.

As seen from the comparison of FIG. 36 and FIG. 26 which is used to describe the twelfth embodiment, similar to the situation of the twelfth embodiment, the left wheel transferred torque TWL (the torque transferred to the left wheel WL) and the right wheel transferred torque TWR (the torque transferred to the right wheel WR) are represented by the formulas (31) and (32), and the first motor output torque and the second motor output torque TM1 and TM2 are represented by the formulas (33) and (34) respectively.

Besides, the electric power supplied to the first rotary electric machine and the second rotary electric machine 3 and 4 are controlled based on the formulas (33) and (34) in a way that the left wheel transferred torque and the right wheel transferred torque TWL and TWR become the same required torque. According to the above, the rotation power of the first rotary electric machine and the second rotary electric machine 3 and 4 are transferred to the left wheel and the right wheel WL and WR via the first planet gear unit and the second planet gear unit PS1 and PS2, by which the left wheel and the right wheel WL and WR are driven.

Besides, as seen from the comparison of FIG. 36 and FIG. 26 to FIG. 28, operations in the EV driving control, the zero torque control, the decelerating regeneration control, the first torque distribution control to the fourth torque distribution control for increasing and decreasing the left-yaw moment and right-yaw moment are similar to the situation of the twelfth embodiment. As mentioned above, according to the sixteenth embodiment, the effect of the twelfth embodiment can also be achieved.

In addition, in the sixteenth embodiment, the first output gear and the second output gear 7 and 8 engage with the first gear and the fifth gear 13a and 14a respectively, by which the first carrier and the second carrier C1 and C2 are connected with the left wheel and the right wheel WL and WR respectively; however, it may be that the first output gear and the second output gear 7 and 8 engage with the eighth gear and the fourth gear 14d and 13d respectively, by which the first sun gear and the second sun gear S1 and S2 are connected with the left wheel and the right wheel WL and WR.

Besides, as for the sixteenth embodiment, as described in the third embodiment, the first carrier and the second carrier C1 and C2 or the first sun gear and the second sun gear S1 and S2 may be connected with the left wheel and the right wheel WL and WR respectively by the first input gear 9 and the first idler gear, as well as the second input gear 10 and the second idler gear.

Figure 37:
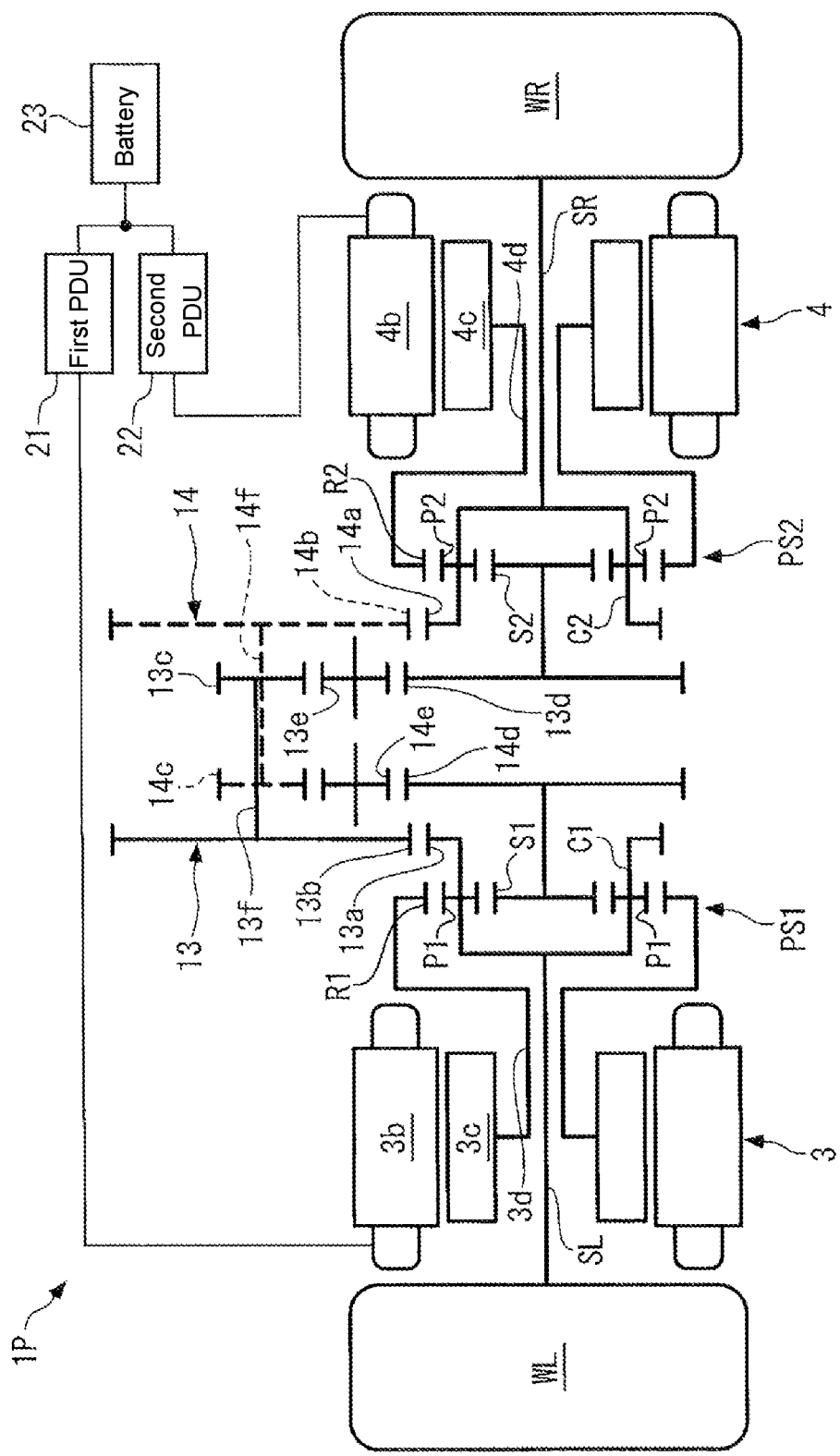
FIG. 37 is a skeleton diagram showing a power apparatus according to a seventeenth embodiment of the disclosure as well as the left wheel and the right wheel of a vehicle to which the power apparatus is applied.

Next, a power apparatus 1P according to the seventeenth embodiment of the disclosure is described with reference to FIG. 37. Compared with the sixteenth embodiment, the difference of the power apparatus 1P is that the first rotary electric machine and the second rotary electric machine 3 and 4 are formed in a hollow shape as described in the fourth embodiment, and while the first output gear and the second output gear 7 and 8 are omitted, the first carrier and the second carrier C1 and C2 are connected respectively with the left driving axis and the right driving axis SL and SR to rotate integrally. In other words, the power apparatus 1P is formed by using the first connecting mechanism and the second connecting mechanism 13 and 14 in the power apparatus 1J of the eleventh embodiment (FIG. 24), instead of using the first connecting mechanism and the second connecting mechanism 5 and 6. In FIG. 37, the same symbols are given to structural elements similar to the first embodiment, the fourth embodiment and the sixteenth embodiment. In the following part, the description is centered on the aspect different from the sixteenth embodiment.

As shown in FIG. 37, different from the sixteenth embodiment but similar to the eleventh embodiment, the first rotary electric machine and the second rotary electric machine 3 and 4 as well as the first planet gear unit and the second planet gear unit PS1 and PS2 are disposed coaxially with the left driving axis and the right driving axis SL and SR. The structures of the first rotary electric machine and the second rotary electric machine 3 and 4 are as described in the eleventh embodiment.

Besides, similar to the eleventh embodiment, the first output axis and the second output axis 3d and 3e are connected with the first ring gear and the second ring gear R1 and R2 respectively to rotate integrally, and the left driving axis SL is relatively rotatably disposed on the inner side of the first output axis 3d and the first rotary electric machine 3, while the right driving axis SR is relatively rotatably disposed on the inner side of the second output axis 4d and the second rotary electric machine 4. The first carrier and the second carrier C1 and C2 are formed as in the eleventh embodiment, and are disposed integrally with the left driving axis and the right driving axis SL and SR. The connecting relationship among other rotation elements is similar to the sixteenth embodiment.

As seen from the above structure, the relationship of rotation speeds among various rotation elements in the power apparatus 1P is similar to the situation of the sixteenth embodiment, and is as shown in FIG. 36 for example. Besides, similar to the situation of the sixteenth embodiment, the first rotary electric machine and the second rotary electric machine 3 and 4 are controlled by the ECU 2 (see FIG. 3), by which various operations of the power apparatus 1P are performed. As mentioned above, according to the seventeenth embodiment, the effect of the twelfth embodiment can also be achieved.

In addition, in the seventeenth embodiment, the first carrier and the second carrier C1 and C2 are disposed integrally with the left driving axis and the right driving axis SL and SR respectively, but the connection may also be done by the first input gear 9 and the first output gear 7, and the second input gear 10 and the second output gear 8 respectively as described in the fourth embodiment, or may be done by the first input gear 11 and the first output gear 7, and the second input gear 12 and the second output gear 8 respectively as described in the seventh embodiment or the eighth embodiment.

Besides, in the seventeenth embodiment, the first carrier and the second carrier C1 and C2 are connected with the left wheel and the right wheel WL and WR respectively, but it also may be the first sun gear and the second sun gear S1 and S2 that is connected with the left wheel and the right wheel WL and WR respectively. In this situation, the first sun gear and the second sun gear S1 and S2 may be disposed integrally with the left driving axis and the right driving axis SL and SR, or the connection may be done by the first input gear 9 (11) and the first output gear 7, and the second input gear 10 (12) and the second output gear 8 as described in the fifth embodiment or the sixth embodiment. In the situation in which the first input gear and the second input gear 11 and 12 are used for the connection, 11 and 12 may be rotatably supported on the first rotation axis and the second rotation axis 13f and 14f respectively.

Besides, in the ninth embodiment to the eleventh embodiment, the sixteenth embodiment and the seventeenth embodiment, the first ring gear and the second ring gear R1 and R2 are connected with the first rotary electric machine and the second rotary electric machine 3 and 4 respectively to rotate integrally, but the connection may also be done via gears and so on in a way that the rotation speeds or the rotating directions are made to be different from each other.

Furthermore, in the twelfth embodiment to the seventeenth embodiment, the first gear and the second gear 13a and 13b directly engage with each other, and the first middle gear 13e engages with the third gear and the fourth gear 13c and 13d; on the contrary, the third gear and the fourth gear 13c and 13d may directly engage with each other, and the first middle gear 13e may engage with the first gear and the second gear 13a and 13b. Similarly, in the twelfth embodiment to the seventeenth embodiment, the fifth gear and the sixth gear 14a and 14b directly engage with each other, and the second middle gear 14e engages with the seventh gear and the eighth gear 14c and 14d; on the contrary, the seventh gear and the eighth gear 14c and 14d may directly engage with each other, and the second middle gear 14e may engage with fifth gear and the sixth gear 14a and 14b.

Besides, in the twelfth embodiment to the seventeenth embodiment, the first connecting mechanism 13 is formed in a way that the absolute value of the rotation speed of the first carrier C1 is greater than the absolute value of the rotation speed of the second ring gear R2; on the contrary, the first connecting mechanism 13 may also be formed in a way that the absolute value of the rotation speed of the second ring gear R2 is greater than the absolute value of the rotation speed of the first carrier C1, or in a way that the absolute values of the rotation speeds of R2 and C1 are equal to each other.

The same is true with the second connecting mechanism 14. That is, the second connecting mechanism 14 is formed in a way that the absolute value of the rotation speed of the second carrier C2 is greater than the absolute value of the rotation speed of the first ring gear R1; on the contrary, the second connecting mechanism 14 may also be formed in a way that the absolute value of the rotation speed of the first ring gear R1 is greater than the absolute value of the rotation speed of the second carrier C2, or in a way that the absolute value of the rotation speed of R1 and C2 are equal to each other.

Besides, in the twelfth embodiment to the seventeenth embodiment, the gear ratio of the first gear 13a to the second gear 13b and the gear ratio of the fifth gear 14a to the sixth gear 14b are set to be the same value, and the gear ratio of the third gear 13c to the fourth gear 13d and the gear ratio of the seventh gear 14c to the eighth gear 14d are set to be the same value, but the gear ratio may also set to be different values.

In addition, the disclosure can be implemented by various forms without being limited to the first embodiment to the seventeenth embodiment (generally referred to as "the embodiments" hereinafter) described above. For example, in the embodiments, the first planet gear unit and the second planet gear unit PS1 and PS2 are disposed coaxially with each other, but the first planet gear unit and the second planet gear unit PS1 and PS2 may also be disposed in a way that the axis lines of the two extend in parallel with each other, instead of being disposed coaxially with each other. In this situation, in the first embodiment to the eleventh embodiment, one of the second gear and the third gear 5b and 5c may be omitted, and the other of the gear 5b and 5c may engage with both the first gear and the fourth gear 5a and 5d, and one of the sixth gear and the seventh gear 6b and 6c may be omitted, and the other of the gear 6b and 6c may engage with both the fifth gear and the eighth gear 6a and 6d. Besides, in the twelfth embodiment to the seventeenth embodiment, the second gear and the third gear 13b and 13c, the first middle gear 13d, the sixth gear and the seventh gear 14b and 14c as well as the second middle gear 14d may be omitted, the first gear and the fourth gear 13a and 13d may engage with each other, and the fifth gear and the eighth gear 14a and 14d may engage with each other.

Besides, in the embodiments, the gear ratio of the first sun gear S1 to the first ring gear R1 and the gear ratio of the second sun gear S2 to the second ring gear R2 are set to the same value, but the gear ratio may also set to different values. Furthermore, in the embodiments, the gear-type first connecting mechanism and second connecting mechanism 5, 13, 6 and 14 are used as the first connecting mechanism and the second connecting mechanism in the disclosure, but other proper connecting mechanisms, for example, a connecting mechanism formed by pulleys and belts, a connecting mechanism formed by chains and belts, or a traction drive connecting mechanism using a plurality of rollers, and so on may be used.

Besides, in the embodiments, the single-pinion first planet gear unit and second planet gear unit PS1 and PS2 are used as the first differential unit and the second differential unit in the disclosure, but other proper differential units comprising three rotation elements whose rotation speeds satisfy a collinear relationship, for example, a bevel-gear differential unit (differential gear), a double-pinion planet gear unit, or a planet gear unit comprising two sun gears, two integral pinion gears engaging with the two sun gears respectively, and a carrier rotatably and revolvably supporting the two pinion gears, may be used. Or a traction drive differential unit, which uses rollers to form the various gears of the single-pinion planet gear unit, the differential gear, the double-pinion planet gear unit, or the planet gear unit comprising two sun gears, may be used.

Furthermore, in the embodiments, the first rotary electric machine and the second rotary electric machine 3 and 4 are formed to be capable of generating electric power, but the two may also be formed incapable of generating electric power, besides, the two are formed to be capable of clockwise rotation and counterclockwise rotation, but the two may also be formed to be capable of rotating in only one direction. Besides, in the embodiments, the first rotary electric machine and the second rotary electric machine 3 and 4 are used as the first power source and the second power source in the disclosure, but other power sources which are capable of outputting rotation power, such as an oil hydraulic motor, may be used.

Furthermore, in the embodiments, the first driven unit and the second driven unit in the disclosure are the left wheel and the right wheel WL and WR (or WR and WL), but the first driven unit and the second driven unit may also be the front wheel and rear wheel (the rear wheel and front wheel) of a four-wheel drive vehicle, or be the screw of a ship. Besides, detailed structures can be altered within the scope of the spirit of the disclosure.

What is claimed is:

1. A power apparatus, which drives a first driven unit and a second driven unit, comprising:

a first power source, which is configured to output rotation power;

a second power source, which is configured to output rotation power;

a first differential unit, comprising a first rotation element, a second rotation element and a third rotation element, wherein the first rotation element and the third rotation element transfer power to each other, and the first rotation element is mechanically connected with the first power source;

a second differential unit, comprising a fourth rotation element, a fifth rotation element and a sixth rotation element, wherein the fourth rotation element and the sixth rotation element transfer power to each other, and the fourth rotation element is mechanically connected with the second power source;

a first connecting mechanism, which mechanically connects the second rotation element with the sixth rotation element in a way that a rotating direction of the second rotation element is the same as a rotating direction of the sixth rotation element, and the rotation speed of the second rotation element is greater than the rotation speed of the sixth rotation element; and a second connecting mechanism, which mechanically connects the third rotation element with the fifth rotation element in a way that a rotating direction of the third rotation element is the same as a rotating direction of the fifth rotation element, and the rotation speed of the fifth rotation element is greater than the rotation speed of the third rotation element; wherein either the second rotation element and the fifth rotation element or the third rotation element and the sixth rotation element are mechanically connected with the first driven unit and the second driven unit respectively, the first differential unit is a single-pinion planet gear unit, and comprises a first sun gear as the first rotation element, a first carrier as the second rotation element and a first ring gear as the third rotation element, the second differential unit is a single-pinion planet gear unit, and has a second sun gear as the fourth rotation element, a second carrier as the fifth rotation element and a second ring gear as the sixth rotation element, the first connecting mechanism comprises a first gear connected with the first carrier by an integrally rotating manner, a second gear engaging with the first gear, a third gear connected with the second gear in an integrally rotating manner, and a fourth gear which engages with the third gear and is disposed integrally with a periphery surface of the second ring gear, and the second connecting mechanism comprises a fifth gear connected with the second carrier in an integrally rotating manner, a sixth gear engaging with the fifth gear, a seventh gear connected with the sixth gear in an integrally rotating manner, and an eighth gear which engages with the seventh gear and is disposed integrally with a periphery surface of the first ring gear.

2. A power apparatus, which drives a first driven unit and a second driven unit, comprising:

a first power source, which is configured to output rotation power;

a second power source, which is configured to output rotation power;

a first differential unit, comprising a first rotation element, a second rotation element and a third rotation element, wherein the first rotation element and the third rotation element transfer power to each other, and the first rotation element is mechanically connected with the first power source;

a second differential unit, comprising a fourth rotation element, a fifth rotation element and a sixth rotation element, wherein the fourth rotation element and the sixth rotation element transfer power to each other, and the fourth rotation element is mechanically connected with the second power source;

a first connecting mechanism, which mechanically connects the second rotation element with the sixth rotation element in a way that a rotating direction of the second rotation element is the same as a rotating direction of the sixth rotation element, and the rotation speed of the second rotation element is greater than the rotation speed of the sixth rotation element;

a second connecting mechanism, which mechanically connects the third rotation element with the fifth rotation element in a way that a rotating direction of the third rotation element is the same as a rotating direction of the fifth rotation element, and the rotation speed of the fifth rotation element is greater than the rotation speed of the third rotation element; and a transferring mechanism which transfers the rotation power from the second rotation element and the fifth rotation element or the third rotation element and the sixth rotation element to the first driven unit and the second driven unit respectively in a state of variable speed, wherein either the second rotation element and the fifth rotation element or the third rotation element and the sixth rotation element are mechanically connected with the first driven unit and the second driven unit respectively.

3. The power apparatus according to claim 1, further comprising a transferring mechanism which transfers the rotation power from the second rotation element and the fifth rotation element or the third rotation element and the sixth rotation element to the first driven unit and the second driven unit respectively in a state of variable speed.

4. The power apparatus according to claim 3, wherein the first power source and the second power source is hollow-shaped, the transferring mechanism comprises a first driving axis and a second driving axis connected with the first driven unit and the second driven unit respectively in an integrally rotating manner, a first output gear and a second output gear disposed integrally with the first driving axis and the second driving axis respectively, and a first input gear and a second input gear engaging on the first output gear and the second output gear respectively, the first power source and the second power source, the first driving axis and the second driving axis, and the first differential unit and the second differential unit are coaxially disposed, and the first driving axis and the second driving axis are relatively rotatably disposed on an inner side of the first power source and the second power source respectively, the first input gear is disposed coaxially with either the second gear and the third gear or the sixth gear and the seventh gear, and the second input gear is disposed coaxially with the other of the second gear and the third gear or the sixth gear and the seventh gear.

* * * * *